US012695750B1

(12) United States Patent
Pak

(10) Patent No.: US 12,695,750 B1
(45) Date of Patent: Jul. 28, 2026

(54) SYSTEM AND METHOD FOR PROXY-BASED CREDENTIAL CUSTODY WITH DISTRIBUTED VALIDATION

(71) Applicant: Michael Pak, Portland, OR (US)

(72) Inventor: Michael Pak, Portland, OR (US)

( * ) Notice: Subject to any disclaimer, the term of this patent is extended or adjusted under 35 U.S.C. 154(b) by 0 days.

(21) Appl. No.: 19/387,313

(22) Filed: Nov. 12, 2025

Related U.S. Application Data

(60) Provisional application No. 63/882,181, filed on Sep. 15, 2025.

(51) Int. Cl.

| | |
|---|---|
| *H04L 29/06* | (2006.01) |
| *G06F 21/00* | (2013.01) |
| *G06F 21/57* | (2013.01) |
| *H04L 9/08* | (2006.01) |
| *H04L 9/32* | (2006.01) |
| *H04L 9/40* | (2022.01) |

(52) U.S. Cl.
CPC .......... *H04L 63/0884* (2013.01); *G06F 21/57* (2013.01); *H04L 9/085* (2013.01); *H04L 9/3278* (2013.01); *H04L 63/0281* (2013.01)

(58) Field of Classification Search
CPC ... H04L 63/0884; H04L 9/085; H04L 9/3278; H04L 63/0281; G06F 21/57
See application file for complete search history.

(56) References Cited

U.S. PATENT DOCUMENTS

| | | | | |
|---|---|---|---|---|
| 10,305,914 | B1 * | 5/2019 | Brin ...................... | H04L 9/3236 |
| 2024/0037542 | A1 * | 2/2024 | Lanman ................. | G06F 21/40 |
| 2025/0068673 | A1 * | 2/2025 | McLaren ............. | G06F 16/685 |
| 2025/0373451 | A1 * | 12/2025 | Jungerman ........... | H04L 9/3268 |

FOREIGN PATENT DOCUMENTS

| | | | | | |
|---|---|---|---|---|---|
| WO | WO-2008057970 | A2 * | 5/2008 | ......... | G06F 21/6218 |
| WO | WO-2025072523 | A1 * | 4/2025 | ........... | H04L 63/102 |

* cited by examiner

*Primary Examiner* — Lisa C Lewis
(74) *Attorney, Agent, or Firm* — Zilka-Kotab, P.C.

(57) ABSTRACT

The present disclosure provides a distributed credential custody system that fundamentally separates credential possession from credential usage. The system eliminates the primary vulnerability of conventional API security by storing actual access credentials within a secure credential management system while providing clients only with opaque credential handles that cannot be independently used for authentication. Multiple independent authenticators perform distributed validation using hardware-anchored mechanisms, with each authenticator contributing weighted partial decryptions based on their assurance levels. The credential management system reconstructs plaintext credentials only after achieving threshold consensus from authenticators, then provides reconstructed credentials to a proxy. This architecture prevents credential theft from client systems while maintaining compatibility with existing authentication protocols, enabling organizations to implement zero-trust principles without requiring modifications to client applications or backend services. The distributed trust model ensures no single component can independently access complete credentials, providing enhanced security through cryptographic isolation and policy-driven authentication that adapts to real-time risk assessment.

19 Claims, 18 Drawing Sheets

100A

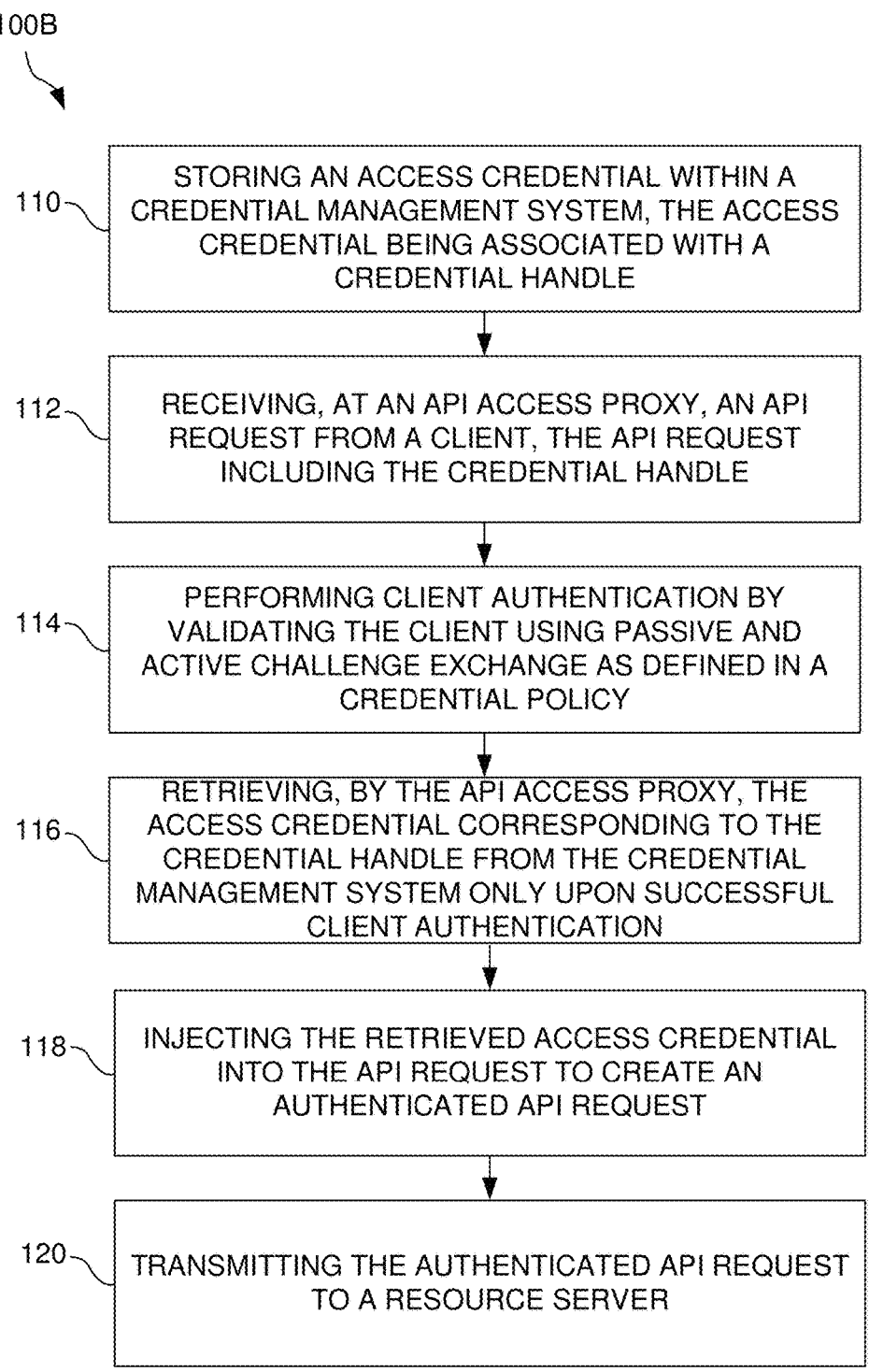

100B

110 — STORING AN ACCESS CREDENTIAL WITHIN A CREDENTIAL MANAGEMENT SYSTEM, THE ACCESS CREDENTIAL BEING ASSOCIATED WITH A CREDENTIAL HANDLE

112 — RECEIVING, AT AN API ACCESS PROXY, AN API REQUEST FROM A CLIENT, THE API REQUEST INCLUDING THE CREDENTIAL HANDLE

114 — PERFORMING CLIENT AUTHENTICATION BY VALIDATING THE CLIENT USING PASSIVE AND ACTIVE CHALLENGE EXCHANGE AS DEFINED IN A CREDENTIAL POLICY

116 — RETRIEVING, BY THE API ACCESS PROXY, THE ACCESS CREDENTIAL CORRESPONDING TO THE CREDENTIAL HANDLE FROM THE CREDENTIAL MANAGEMENT SYSTEM ONLY UPON SUCCESSFUL CLIENT AUTHENTICATION

118 — INJECTING THE RETRIEVED ACCESS CREDENTIAL INTO THE API REQUEST TO CREATE AN AUTHENTICATED API REQUEST

120 — TRANSMITTING THE AUTHENTICATED API REQUEST TO A RESOURCE SERVER

FIG. 1B

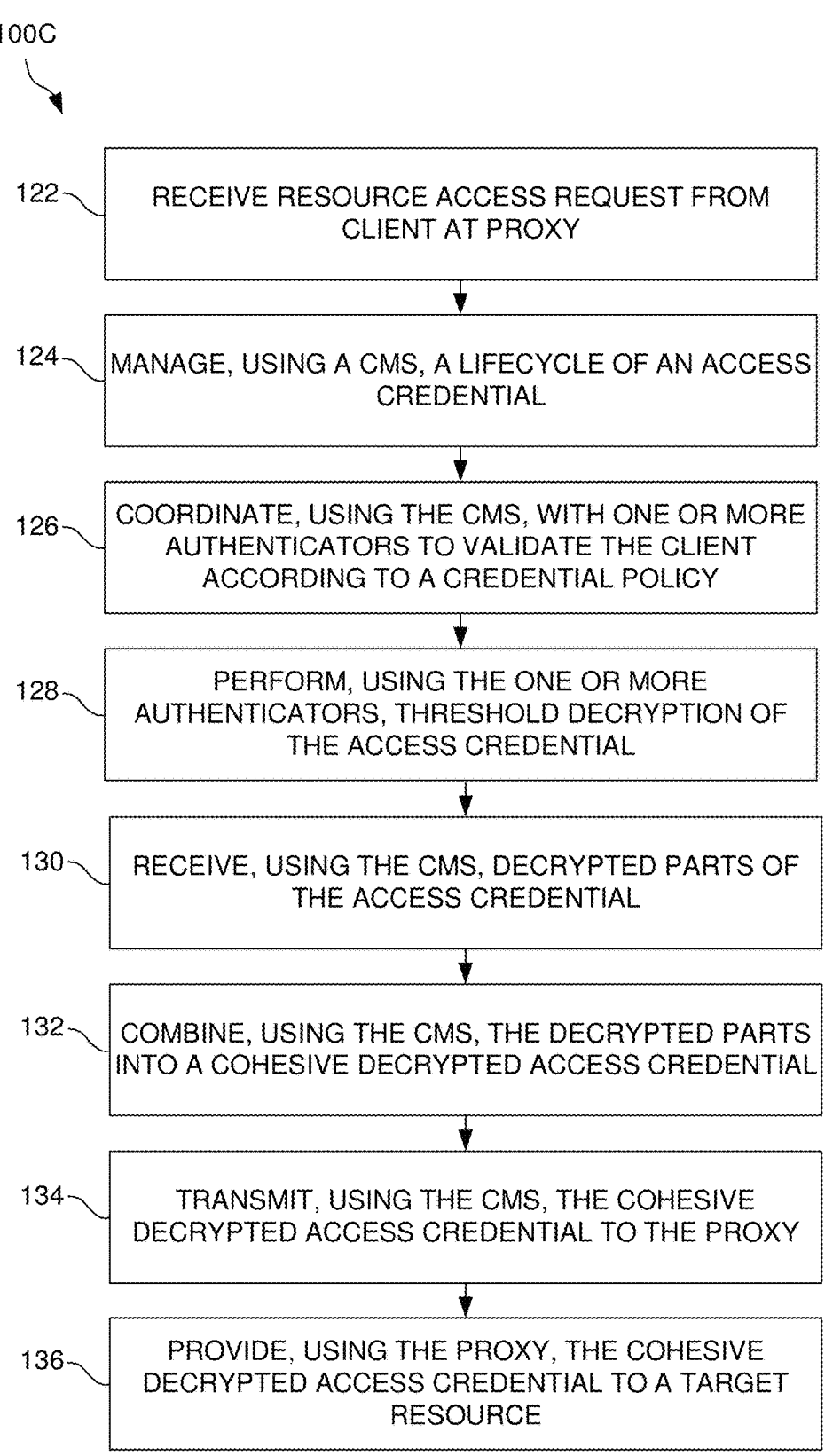

100C

122 — RECEIVE RESOURCE ACCESS REQUEST FROM CLIENT AT PROXY

124 — MANAGE, USING A CMS, A LIFECYCLE OF AN ACCESS CREDENTIAL

126 — COORDINATE, USING THE CMS, WITH ONE OR MORE AUTHENTICATORS TO VALIDATE THE CLIENT ACCORDING TO A CREDENTIAL POLICY

128 — PERFORM, USING THE ONE OR MORE AUTHENTICATORS, THRESHOLD DECRYPTION OF THE ACCESS CREDENTIAL

130 — RECEIVE, USING THE CMS, DECRYPTED PARTS OF THE ACCESS CREDENTIAL

132 — COMBINE, USING THE CMS, THE DECRYPTED PARTS INTO A COHESIVE DECRYPTED ACCESS CREDENTIAL

134 — TRANSMIT, USING THE CMS, THE COHESIVE DECRYPTED ACCESS CREDENTIAL TO THE PROXY

136 — PROVIDE, USING THE PROXY, THE COHESIVE DECRYPTED ACCESS CREDENTIAL TO A TARGET RESOURCE

FIG. 1C

CONVENTIONAL SYSTEM
200

IMPROVED SYSTEM
300

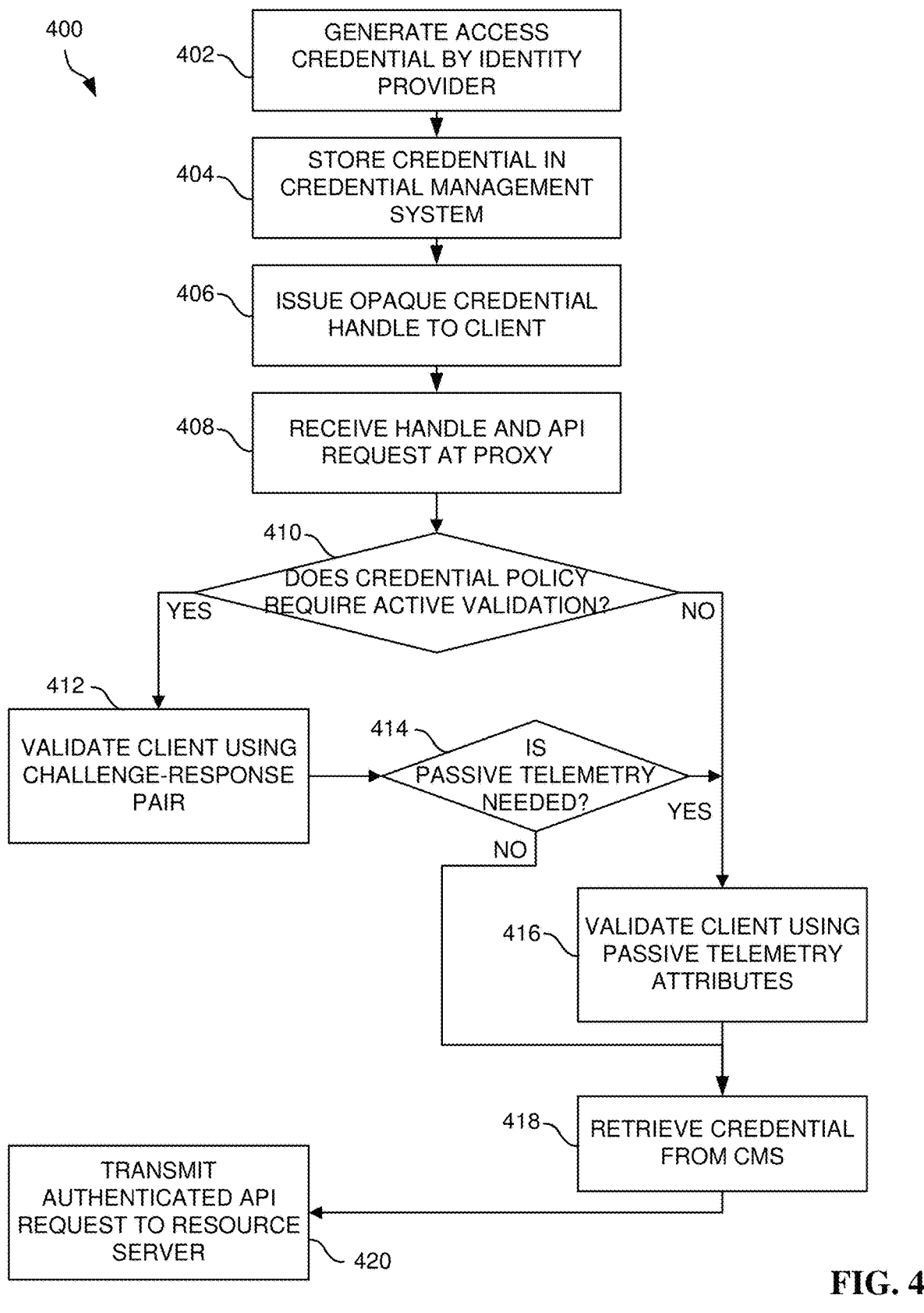

400

402 — GENERATE ACCESS CREDENTIAL BY IDENTITY PROVIDER

404 — STORE CREDENTIAL IN CREDENTIAL MANAGEMENT SYSTEM

406 — ISSUE OPAQUE CREDENTIAL HANDLE TO CLIENT

408 — RECEIVE HANDLE AND API REQUEST AT PROXY

410 — DOES CREDENTIAL POLICY REQUIRE ACTIVE VALIDATION?

YES          NO

412 — VALIDATE CLIENT USING CHALLENGE-RESPONSE PAIR

414 — IS PASSIVE TELEMETRY NEEDED?

YES          NO

416 — VALIDATE CLIENT USING PASSIVE TELEMETRY ATTRIBUTES

418 — RETRIEVE CREDENTIAL FROM CMS

TRANSMIT AUTHENTICATED API REQUEST TO RESOURCE SERVER — 420

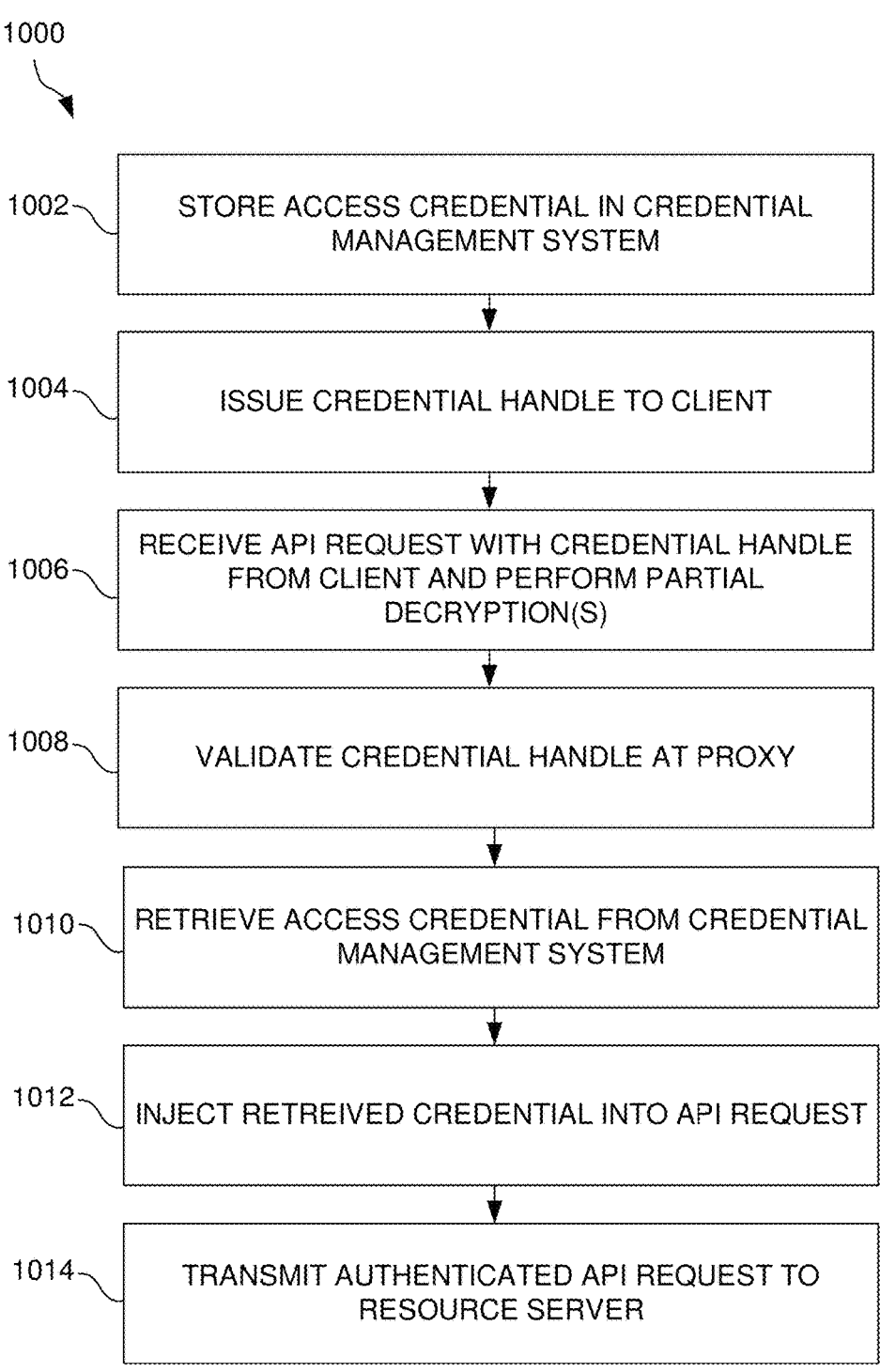

1002 — STORE ACCESS CREDENTIAL IN CREDENTIAL MANAGEMENT SYSTEM

1004 — ISSUE CREDENTIAL HANDLE TO CLIENT

1006 — RECEIVE API REQUEST WITH CREDENTIAL HANDLE FROM CLIENT AND PERFORM PARTIAL DECRYPTION(S)

1008 — VALIDATE CREDENTIAL HANDLE AT PROXY

1010 — RETRIEVE ACCESS CREDENTIAL FROM CREDENTIAL MANAGEMENT SYSTEM

1012 — INJECT RETREIVED CREDENTIAL INTO API REQUEST

1014 — TRANSMIT AUTHENTICATED API REQUEST TO RESOURCE SERVER

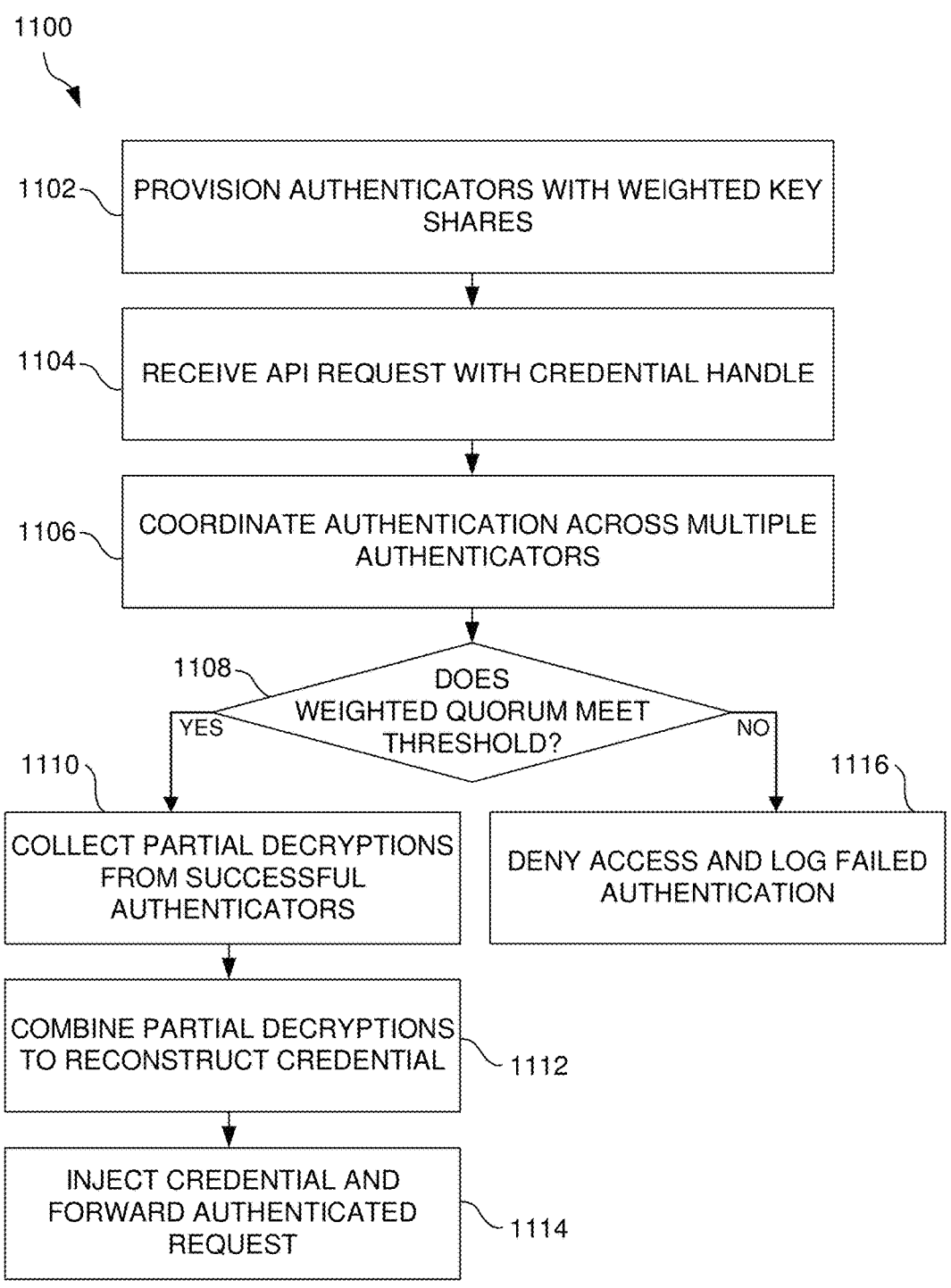

1102 — PROVISION AUTHENTICATORS WITH WEIGHTED KEY SHARES

1104 — RECEIVE API REQUEST WITH CREDENTIAL HANDLE

1106 — COORDINATE AUTHENTICATION ACROSS MULTIPLE AUTHENTICATORS

1108 — DOES WEIGHTED QUORUM MEET THRESHOLD?

YES

NO

1110 — COLLECT PARTIAL DECRYPTIONS FROM SUCCESSFUL AUTHENTICATORS

1116 — DENY ACCESS AND LOG FAILED AUTHENTICATION

COMBINE PARTIAL DECRYPTIONS TO RECONSTRUCT CREDENTIAL — 1112

INJECT CREDENTIAL AND FORWARD AUTHENTICATED REQUEST — 1114

FIG. 11

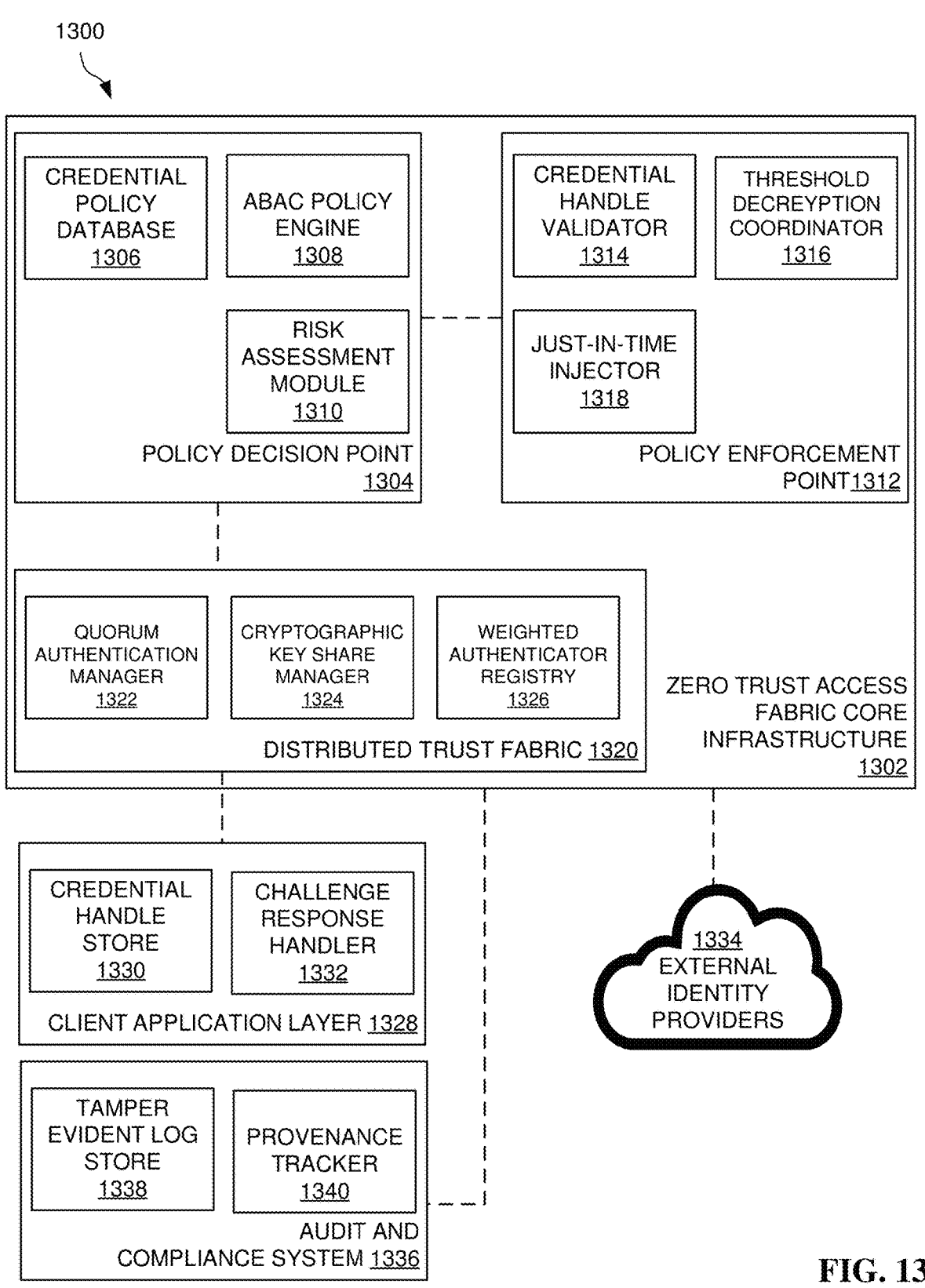

1300

CREDENTIAL POLICY DATABASE 1306

ABAC POLICY ENGINE 1308

RISK ASSESSMENT MODULE 1310

POLICY DECISION POINT 1304

CREDENTIAL HANDLE VALIDATOR 1314

THRESHOLD DECREYPTION COORDINATOR 1316

JUST-IN-TIME INJECTOR 1318

POLICY ENFORCEMENT POINT 1312

QUORUM AUTHENTICATION MANAGER 1322

CRYPTOGRAPHIC KEY SHARE MANAGER 1324

WEIGHTED AUTHENTICATOR REGISTRY 1326

DISTRIBUTED TRUST FABRIC 1320

ZERO TRUST ACCESS FABRIC CORE INFRASTRUCTURE 1302

CREDENTIAL HANDLE STORE 1330

CHALLENGE RESPONSE HANDLER 1332

CLIENT APPLICATION LAYER 1328

1334 EXTERNAL IDENTITY PROVIDERS

TAMPER EVIDENT LOG STORE 1338

PROVENANCE TRACKER 1340

AUDIT AND COMPLIANCE SYSTEM 1336

SERVER

1504

TELEVISION

1510

PDA

NETWORK(S)

1502

1508

COMPUTER

1506

MOBILE
TELEPHONE

SYSTEM AND METHOD FOR PROXY-BASED CREDENTIAL CUSTODY WITH DISTRIBUTED VALIDATION

CROSS-REFERENCE TO RELATED APPLICATIONS

This application claims priority to U.S. Provisional Application No. 63/882,181, titled SYSTEM AND METHOD FOR API ACCESS CONTROL USING CREDENTIAL HANDLES AND PROXY-BASED AUTHENTICATION, filed Sep. 15, 2025, which is hereby incorporated by reference in its entirety.

FIELD OF THE INVENTION

The present disclosure relates to application programming interface (API) security systems, and more particularly to a system and method for securing API access by separating credential possession from credential usage.

BACKGROUND

The field of application programming interface (API) security faces a significant challenge in protecting access credentials from theft and unauthorized use. Access credentials, including API keys, SSH keys, OAuth tokens, and other authentication materials, function as secrets or bearer credentials that grant access to systems, APIs, and resources. When these credentials are compromised, attackers can access, modify, or exfiltrate data with the same level of control as legitimate users. This problem has become increasingly prevalent due to the widespread adoption of cloud services and API-driven architectures, where credential theft has been identified as a root cause of numerous mass data breaches affecting organizations across various industries.

Existing systems attempting to address this problem encounter several obstacles that limit their effectiveness in providing comprehensive protection. Current approaches such as token binding, proof-of-possession extensions, and certificate-bound tokens still require clients to store and handle bearer tokens directly, maintaining the fundamental vulnerability. These systems also struggle with implementing zero-trust principles, as they often rely on implicit trust based on network location or prior authentication state rather than requiring explicit verification for each access request. Additionally, existing attribute-based access control implementations are typically passive and vendor-centric, lacking standardized protocols and comprehensive challenge-response mechanisms that can provide device-anchored authentication.

For example, in conventional OAuth implementations, clients must store access tokens locally, creating opportunities for credential theft through application memory dumps, configuration file exposure, or host system compromise. Another example is traditional API key management, where keys are frequently embedded in source code, scripts, or databases without adequate protection, making them vulnerable to discovery during code reviews or system breaches. Current proxy-based solutions may transform or filter tokens but do not eliminate the fundamental issue of clients possessing usable credentials, and existing key management systems focus on cryptographic keys rather than providing comprehensive lifecycle management for API access credentials with integrated authentication mechanisms.

As such, there is thus a need for addressing these and/or other issues associated with the prior art.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

In some aspects, the techniques described herein relate to a system for secure API access control, the system including: a proxy configured to receive a resource access request from a client, the resource access request including a credential reference; a credential management system (CMS) configured to manage lifecycle of an access credential corresponding to the credential reference and coordinate with one or more authenticators to validate the client according to a credential policy, wherein each authenticator independently evaluates the client using at least one of passive validation or active challenge-response mechanisms; the one or more authenticators configured to perform threshold decryption of the access credential upon successful validation of the client; the CMS further configured to receive decrypted parts of the access credential and combine the decrypted parts into a cohesive decrypted access credential; the CMS further configured to transmit the cohesive decrypted access credential to the proxy; and the proxy further configured to provide the cohesive decrypted access credential to a target resource, wherein the proxy operates as an intermediary that maintains exclusive access to the access credential during an injection process, and wherein the client never possesses or handles the access credential.

In some aspects, the techniques described herein relate to a system, wherein the credential reference is an opaque identifier that lacks cryptographic value and cannot be independently used for API access.

In some aspects, the techniques described herein relate to a system, wherein the active challenge-response mechanisms include proof of possession of a challenge-response pair generated by at least one of: a Physical Unclonable Function embedded in the client or a designated PUF response; or an immutable root-of-trust embedded in the client or a designated immutable root-of-trust response system.

In some aspects, the techniques described herein relate to a system, wherein the Physical Unclonable Function and/or immutable root-of-trust produces a device-unique response derived from inherent physical variations in hardware of the client.

In some aspects, the techniques described herein relate to a system, wherein the active challenge-response mechanisms include proof of possession of a challenge-response pair generated by a Trusted Execution Environment and/or immutable root-of-trust embedded in the client or a designated system.

In some aspects, the techniques described herein relate to a system, wherein the Trusted Execution Environment and/or immutable root-of-trust produces a cryptographically signed response proving possession of device-bound keys and integrity of code running inside a secure enclave.

In some aspects, the techniques described herein relate to a system, wherein the passive validation includes validating the client using telemetry-based attributes including at least one of IP address, time of day, call frequency, application protocol, client software version, or configuration.

In some aspects, the techniques described herein relate to a system, wherein: the credential policy defines throttling enforcement parameters that limit data volume access for the client; and the proxy is further configured to measure volume of response data for throttling enforcement.

In some aspects, the techniques described herein relate to a system, wherein the CMS is further configured to rotate the credential reference upon expiration or renewal of the access credential.

In some aspects, the techniques described herein relate to a system, wherein: the CMS maintains audit logs of credential reference usage and validation events; and failed client validations cause automatic revocation of the credential reference.

In some aspects, the techniques described herein relate to a system, wherein each authenticator is assigned an integer weight representing its assurance level, and the CMS determines satisfaction of a threshold policy when a cumulative assurance weight greater than or equal to a predetermined threshold is achieved.

In some aspects, the techniques described herein relate to a system, wherein the threshold decryption requires combining partial decryptions from at least t authenticators out of n available authenticators, where t and n are configurable based on the credential policy.

In some aspects, the techniques described herein relate to a system, wherein the access credential is governed by an attribute-based access control policy specifying contextual attributes including at least one of identity, device integrity, geolocation, IP reputation score, behavioral history, and environmental and client telemetry.

In some aspects, the techniques described herein relate to a system, wherein one or more authenticators are hardware-anchored using at least one of a Physical Unclonable Function, Trusted Platform Module, immutable root-of-trust, or Trusted Execution Environment.

In some aspects, the techniques described herein relate to a system, wherein the CMS dynamically adjusts authentication requirements based on real-time risk indicators including at least one of device drift, network anomalies, and behavioral deviation.

In some aspects, the techniques described herein relate to a system, wherein: the access credential remains encrypted at rest within the CMS; and the access credential is decrypted only transiently within secure memory of a protected execution boundary during the combine time by the CMS after successfully completing the threshold decryption process.

In some aspects, the techniques described herein relate to a system, wherein the protected execution boundary includes at least one of a Trusted Execution Environment or a Hardware Security Module.

In some aspects, the techniques described herein relate to a system, wherein: all authentication approvals and decryption events are cryptographically signed and hash-chained to form a tamper-evident audit log; and the CMS maintains provenance tracking that records which authenticators approved access and which key shares were used for each credential reconstruction.

In some aspects, the techniques described herein relate to a system, wherein the proxy presents the cohesive decrypted access credential to the target resource in standard protocol formats compatible with existing backend services without requiring modifications to the target resource.

In some aspects, the techniques described herein relate to a system, wherein: the system remains functional despite failure or unavailability of up to n minus t authenticators, where n is the total number of authenticators and t is the threshold number required for successful validation; and operational control of the CMS, proxy, and authenticators is distributed among distinct administrative domains to prevent single points of control.

The foregoing general description of the illustrative embodiments and the following detailed description thereof are merely exemplary aspects of the teachings of this disclosure and are not restrictive.

BRIEF DESCRIPTION OF THE DRAWINGS

FIG. 1B illustrates a flowchart of a method for securing API access through credential handle proxying and distributed authentication, according to aspects of the present disclosure.

FIG. 1C illustrates a flowchart of a method for securing API access through distributed credential management and threshold-based authentication, in accordance with one embodiment.

FIG. 4 illustrates a flowchart for a method for managing API access credentials with validation pathways, according to aspects of the present disclosure.

FIG. 10 illustrates a method for securing API access through credential handle proxying with distributed authentication, according to aspects of the present disclosure.

FIG. 11 illustrates a flowchart for a method for securing API access through weighted quorum authentication and distributed credential decryption, according to an embodiment of the present disclosure.

FIG. 13 illustrates a block diagram of a zero trust access architecture for credential management and authentication, according to an embodiment of the present disclosure.

DETAILED DESCRIPTION

Figure 1A:
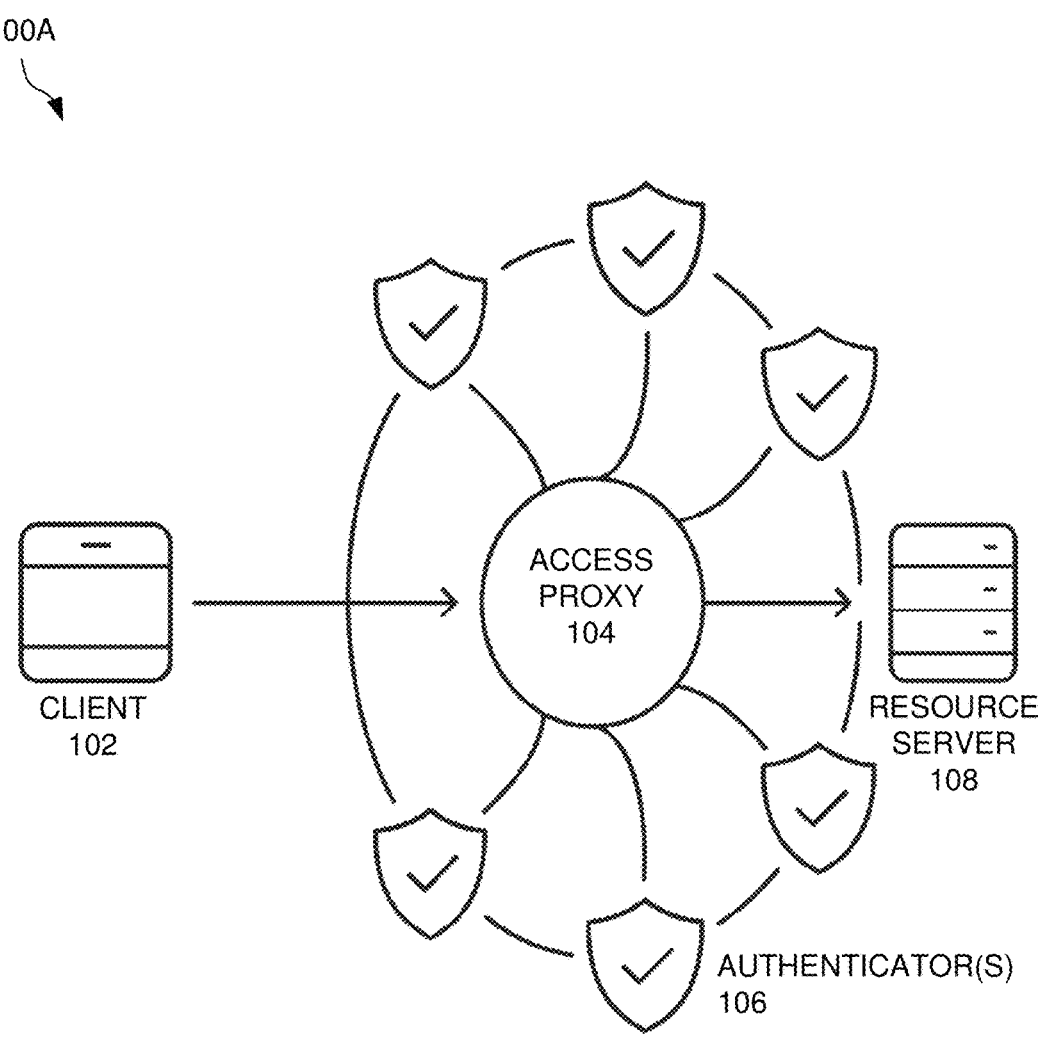
FIG. 1A illustrates a system for API access control using credential handles and proxy-based authentication, according to aspects of the present disclosure.

The present disclosure relates to the field of application programming interface (API) security systems, specifically focusing on distributed credential management and threshold-based authentication mechanisms for protecting access to cloud services, APIs, and distributed computing resources. As organizations increasingly adopt API-driven architectures, cloud-based services, and AI workloads with ephemeral agents and autonomous systems, the security of access credentials has become a critical component of enterprise cybersecurity infrastructure that must address both traditional credential theft and emerging threats from dynamic, multi-stage AI pipelines that multiply secret touch-points and exposure risks.

Current API security implementations face significant vulnerabilities related to credential theft, unauthorized access, and centralized trust dependencies that create single points of failure. Existing systems require clients to store and handle bearer tokens, API keys, SSH keys, passwords, and other access credentials directly, creating opportunities for credential compromise through application memory dumps, configuration file exposure, host system breaches, source code repositories, prompt injection attacks, and AI agent tool chains that can leak credentials into logs, chat histories, vector stores, or external services. These conventional approaches also struggle with implementing comprehensive zero-trust principles, as they often rely on implicit trust based on network location or prior authentication state rather than requiring explicit verification for each access request through distributed consensus mechanisms. Additionally, current attribute-based access control implementations are typically passive and vendor-centric, lacking standardized protocols, comprehensive challenge-response mechanisms, and hardware-anchored authentication that can provide device-bound security assurance while supporting weighted quorum policies that reflect organizational governance requirements.

The present disclosure addresses these security vulnerabilities by introducing a distributed credential custody system that fundamentally separates credential possession from credential usage through threshold cryptography, weighted quorum authentication, and proxy-based credential injection. The system stores actual access credentials within a secure credential management system while providing clients only with opaque credential handles that lack cryptographic value and cannot be independently used for API access without corresponding validation through distributed authentication infrastructure. Multiple independent authenticators perform client validation using hardware-anchored mechanisms including Physical Unclonable Functions, immutable root-of-trust (ROT), Trusted Platform Modules, Trusted Execution Environments, and biometric verification, with each authenticator contributing weighted partial decryptions based on their assurance levels to enable policy-driven authentication that requires threshold consensus before credential reconstruction and just-in-time injection, thereby eliminating the risk of credential theft from client systems while ensuring no single component can independently access complete credentials.

Furthermore, the present disclosure incorporates a comprehensive policy-driven authentication framework that supports both passive telemetry-based validation using network fingerprinting, behavioral analysis, and environmental attributes, and active challenge-response mechanisms utilizing hardware roots-of-trust, cryptographic attestation, and proof-of-possession protocols (amongst other mechanisms, as detailed herein), enabling organizations to implement true zero-trust principles with device-anchored security and continuous verification.

Additionally, the system maintains compatibility with existing OAuth2, JWT, SSH key, API key, and password authentication standards while requiring minimal or no refactoring of existing client and server software through transparent credential handle substitution and standard protocol format presentation. The credential management system provides centralized lifecycle control for credential rotation, revocation, and policy management while supporting distributed deployment across multiple geographic regions, integration with cloud service provider systems, third-party service implementations, federated authentication scenarios, and comprehensive compliance frameworks including NIST, FIPS, CMMC, PCI DSS, HIPAA, and GDPR requirements for enhanced scalability, availability, and regulatory adherence across diverse enterprise and cloud environments.

Definitions and Use of Figures

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale, and that elements of similar structures or functions are sometimes represented by like reference characters throughout the figures. It should also be noted that the figures are only intended to facilitate the description of the disclosed embodiments they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Exemplary Embodiments

The following description sets forth exemplary aspects of the present disclosure. It should be recognized, however, that such description is not intended as a limitation on the scope of the present disclosure. Rather, the description also encompasses combinations and modifications to those exemplary aspects described herein.

FIG. 1A illustrates a system 100A for API access control using credential handles and proxy-based authentication, in accordance with one embodiment. As an option, the system 100A may be implemented in the context of any one or more of the embodiments set forth in any previous and/or subsequent Figures and/or description thereof. Of course, however, the system 100A may be implemented in the context of any desired environment. Further, the aforementioned definitions may equally apply to the description below.

The system 100A includes a client 102 that may initiate, in one example, API requests for accessing protected resources through credential handle-based authentication mechanisms. The client 102 may store opaque credential handles rather than actual access credentials, thereby eliminating the risk of credential theft from client-side storage systems. The client 102 may communicate with other system components through secure network channels while maintaining compatibility with existing API client implementations and authentication protocols.

The client 102 may operate across various computing platforms including mobile devices, desktop computers, server applications, and embedded systems without requiring platform-specific modifications to support the credential handle architecture. Additionally, the client 102 may retrieve credential handles from designated storage systems and include these handles in API requests without possessing knowledge of the underlying access credentials or authentication mechanisms. Still yet, the client 102 may participate in challenge-response authentication processes when required by credential policies while maintaining separation from actual credential material throughout the authentication workflow.

The system 100A further includes an access proxy 104 positioned between the client 102 and downstream resource servers to serve as an intermediary component for credential validation and injection operations. In some cases, the access proxy 104 may intercept and/or otherwise receive API requests from the client 102 and coordinate authentication processes before forwarding requests to target resource servers. Further, the access proxy 104 may maintain exclusive custody of reconstructed access credentials during the brief period required for credential injection into authenticated API requests.

In one embodiment, the access proxy 104 may implement just-in-time credential injection mechanisms that insert appropriate authentication tokens, API keys, or certificates into API requests only after successful client validation through distributed authentication processes. Additionally, the access proxy 104 may support multiple credential types including OAuth2 tokens, JWT tokens, SSH keys, and proprietary API keys while maintaining compatibility with existing server-side authentication mechanisms. Further, the access proxy 104 may operate in various deployment configurations including network-inline proxies, sidecar containers, and host-based agents depending on organizational security requirements and infrastructure constraints.

In various embodiments, the system may support diverse deployment models including transparent network proxies that provide physical separation from client hosts, sidecar proxy implementations that operate within the same host environment as client applications, and agent-based deployments that run directly on client systems while maintaining hardware-backed security boundaries through Trusted Execution Environments. The deployment flexibility may enable organizations to select appropriate architectural approaches based on security requirements, operational constraints, and infrastructure capabilities while maintaining consistent credential custody and authentication properties across different implementation scenarios.

The system 100A includes one or more authenticator(s) 106 that may perform independent client validation operations according to credential policies and authentication requirements. The authenticator(s) 106 may evaluate client requests using passive validation methods such as IP address verification, geographic location analysis, behavioral pattern recognition, etc., and/or may also implement active challenge-response mechanisms utilizing hardware-based authentication factors including Physical Unclonable Functions, Trusted Execution Environments, etc.

In one embodiment, the authenticator(s) 106 may operate as distributed components that collectively participate in quorum-based authentication decisions while maintaining independence from each other. Such an arrangement may prevent single points of failure. For example, the authenticator(s) 106 may hold secret key shares that enable threshold decryption of access credentials stored within the credential management system. Additionally, the authenticator(s) 106 may assign different trust weights based on the assurance level of their respective authentication mechanisms, enabling policy-driven authentication thresholds that reflect organizational security requirements.

The system 100A further includes a resource server 108 that may receive authenticated API requests from the access proxy 104 and provide responses to authorized requests according to standard server-side processing mechanisms. In particular, the resource server 108 may implement conventional authentication and authorization mechanisms without requiring modifications to accommodate the proxy-based credential architecture. The API requests may be processed containing injected credentials in the same manner as requests received directly from clients in traditional authentication models. In this manner, the API processing (from an external perspective) may operate in a manner similar to conventional systems but with enhanced security, as the credentials are received from an access proxy 104 (rather than a client), and/or provided to the access proxy 104 via the one or more authenticator(s) 106. In various embodiments, the system 100A may implement fault-tolerant t-of-n quorum authentication mechanisms that enable continued operation when individual authenticators become unavailable or compromised, requiring only that at least t authenticators remain functional out of the total n deployed authenticators, while comprehensive logging, monitoring, and alarm systems detect and mitigate authenticator faults and compromise scenarios to maintain system integrity and availability.

It is to be understood that the resource server 108 may represent various types of backend services including cloud APIs, database servers, web applications, and microservices that require authenticated access for protected operations. Audit logs may be maintained of access attempts and implement rate limiting and other security controls while remaining unaware of the credential handle architecture implemented by upstream components. Further, multiple authentication protocols and credential formats may be used depending on the specific service requirements and integration needs.

The system 100A supports multiple simultaneous authentication methods per credential handle, enabling organizations to implement layered security approaches that combine different authentication factors for enhanced assurance. The access proxy 104 may coordinate with multiple authenticator(s) 106 simultaneously to evaluate different aspects of client identity and context before making authorization decisions. The system 100A may require successful validation from a configurable subset of available authenticator(s) 106 based on weighted quorum policies that reflect the relative trust levels of different authentication mechanisms.

The multiple authentication method capability may enable the system 100A to adapt authentication requirements based on risk assessment, client context, API call context, and resource sensitivity without requiring changes to client applications or credential handles. Additionally, the authenticator(s) 106 may operate in parallel to reduce authentication latency while providing redundancy and fault tolerance for authentication operations. Further, the system 100A may support dynamic authentication policy updates that modify quorum requirements and authenticator weights without disrupting ongoing API access operations.

In various embodiments, the system 100A may implement latency optimization techniques that minimize authentication delays for high-throughput API access scenarios through strategic caching mechanisms and network positioning strategies. Passive authentication mechanisms such as application protocol fingerprinting may operate with minimal latency impact unless external systems are involved for operations like IP reputation checks through external services, while active authentication involving challenge-response and client integrity measurement may be more dependent on network latency characteristics. Additionally, the system 100A may optimize performance by implementing client-server authentication as an initial establishment phase (which may represent a small percentage of the entire client-server communication lifecycle), enabling authenticators to cache remote server and system responses locally to avoid challenging remote systems constantly (such as every second) while maintaining acceptable security risk levels through periodic re-validation intervals such as every minute. Additionally, for high-performance deployments, the access security system may be positioned within intra-network environments to minimize network latency and maximize authentication throughput while maintaining distributed security properties and fault tolerance capabilities.

The system 100A demonstrates a resolution to credential theft vulnerabilities present in conventional API authentication systems by eliminating client-side credential storage and implementing distributed authentication mechanisms. For example, traditional API security approaches require clients to store and present access credentials directly, creating opportunities for credential compromise through memory dumps, configuration file exposure, source code leaks, etc . . . . The system 100A addresses these vulnerabilities by maintaining actual credentials within a secure credential management infrastructure while providing clients only with opaque handles that cannot be used independently for authentication purposes.

The distributed authentication architecture implemented by the system 100A provides enhanced security compared to centralized authentication systems that rely on single points of trust for credential validation. Additionally, authentication authority distributed across multiple independent authenticator(s) 106 may reduce the impact of individual component compromise and enable fine-grained policy enforcement through weighted quorum mechanisms. As such, the separation of credential possession from credential usage implemented may ensure that credential theft from client systems cannot result in unauthorized access to protected resources.

FIG. 1B illustrates a method 100B for securing API access through credential handle proxying and distributed authentication, in accordance with one embodiment. As an option, the method 100B may be implemented in the context of any one or more of the embodiments set forth in any previous and/or subsequent Figures and/or description thereof. Of course, however, the method 100B may be implemented in the context of any desired environment. Further, the aforementioned definitions may equally apply to the description below.

In step 110, an access credential may be stored within a credential management system, where the access credential may be associated with a credential handle. In one embodiment, the credential handle may lack cryptographic value and may not be independently used for API access. The credential management system may maintain the access credential in encrypted form using cryptographic protection mechanisms comparable to those applied in hardware security modules and key management systems. The credential management system may associate the access credential with policy definitions that specify authentication requirements, validation methods, and access conditions for subsequent credential retrieval operations.

The storage operation in step 110 may involve transferring the access credential from external identity providers or credential servers into the secure custody of the credential management system rather than providing direct client access to credential material. In this manner, the credential may be stored separate from client (and/or that which can be access by the client). As an example, the credential management system may implement advanced security features including trusted execution environments for hardware-based credential protection and threshold cryptography mechanisms that distribute credential access authority across multiple independent authenticators. In one embodiment, the association between the access credential and the credential handle may be maintained through secure mapping mechanisms that prevent unauthorized correlation between handles and their corresponding credential values.

In step 112, an API request may be received at an API access proxy from a client, where the API request may include the credential handle rather than the actual access credential. The API access proxy may intercept the incoming request and extract the credential handle along with associated request metadata including client identity information, network context, and authentication parameters. The API access proxy may validate the format and structure of the credential handle to ensure compliance with established handle specifications before proceeding with authentication operations.

The reception operation in step 112 may support various API request formats including REST, GraphQL, and RPC protocols while maintaining compatibility with existing client implementations that require minimal modifications to adopt the credential handle architecture. Additionally, the API access proxy may collect additional context information during request reception including, but not limited to, client IP address, geographic location, request timing, and behavioral patterns that may be utilized by downstream authentication components. The credential handle included in the API request may contain metadata that assists the credential management system in identifying the appropriate credential and associated policies without exposing sensitive authentication information.

In step 114, client authentication may be performed by validating the client using, for example, passive and active challenge exchange mechanisms as defined in a credential policy associated with the credential handle. The authentication process may involve coordinating with multiple independent authenticators that evaluate different aspects of client identity and context according to the policy requirements. The credential policy may specify threshold requirements for authentication success, including weighted quorum mechanisms that assign different trust levels to various authentication factors.

The validation operation in step 114 may implement both passive telemetry-based authentication using attributes such as IP address, geographic location, behavioral patterns, etc., as well as active challenge-response mechanisms utilizing hardware-based authentication factors including Physical Unclonable Functions, Trusted Execution Environments, etc. The authenticators may operate independently to prevent single points of failure while collectively contributing to the authentication decision through distributed consensus mechanisms. The challenge exchange process may involve cryptographic proof-of-possession mechanisms that verify client (or designated client-side system) control of device-bound authentication factors without exposing sensitive key material.

Further, in various embodiments, the system may implement comprehensive hardware-anchored authentication mechanisms that leverage Physical Unclonable Functions, Trusted Platform Modules, Trusted Execution Environments, Device Identifier Composition Engine specifications, Caliptra Root-of-Trust implementations, and Security Protocol and Data Model protocols to provide immutable hardware-based trust foundations. These hardware security technologies may generate cryptographic attestations and verifiable system measurements that enable device authentication, integrity verification, and secure communications while establishing continuous trust chains from silicon-level hardware components through application-level credential operations.

In step 116, the access credential corresponding to the credential handle may be retrieved by the API access proxy from the credential management system only upon successful client authentication through the distributed validation process. The retrieval operation may involve threshold decryption mechanisms where multiple authenticators contribute partial decryptions that are combined to reconstruct the plaintext access credential within a secure processing boundary. The credential management system may coordinate the collection of authentication approvals and partial decryptions from the required subset of authenticators before releasing the reconstructed credential to the API access proxy.

In various embodiments, the credential retrieval process in step 116 may ensure that the access credential exists in plaintext form only within the secure memory boundaries of the API access proxy and only for the duration required to complete the credential injection operation. The credential management system may implement just-in-time decryption mechanisms that reconstruct credentials on-demand rather than maintaining persistent plaintext copies that could be subject to unauthorized access. The retrieval operation may include audit logging mechanisms that record authentication decisions, participating authenticators, and credential usage events for compliance and forensic analysis purposes.

In step 118, the retrieved access credential may be injected into the API request to create an authenticated API request that contains the appropriate authentication tokens, API keys, or certificates required by the target resource server. The injection process may replace the credential handle with the actual access credential in the appropriate request headers, parameters, or body sections according to the authentication protocol requirements. The API access proxy may maintain the original request structure and content while performing the credential substitution to ensure compatibility with existing server-side authentication mechanisms.

The injection operation in step 118 may support multiple credential formats including OAuth2 bearer tokens, JWT tokens, SSH keys, and proprietary API keys depending on the requirements of the target resource server and the authentication protocols in use. The API access proxy may implement secure memory management practices that ensure the access credential is immediately cleared from memory after successful injection to minimize the exposure window for potential credential compromise. In one embodiment, the credential injection process may include validation mechanisms that verify the integrity and format of the reconstructed credential before inclusion in the outbound API request.

In step 120, the authenticated API request may be transmitted to a resource server for processing according to standard server-side authentication and authorization mechanisms. The resource server may receive the authenticated request containing the injected access credential and process the request in the same manner as conventional API requests that include credentials provided directly by clients. The transmission process may utilize secure communication channels including TLS encryption and certificate pinning to protect the authenticated request during network transit.

Further, in some embodiments, the transmission operation in step 120 may include response handling mechanisms where the API access proxy receives the server response and forwards the response back to the client while maintaining audit trails of the complete request-response cycle. The resource server may remain unaware of the credential handle architecture and proxy-based authentication mechanisms, enabling seamless integration with existing API infrastructure without requiring server-side modifications. The authenticated API request may include all original request content and parameters while containing the appropriate access credential for successful authentication with the target resource server.

The method 100B may support credential rotation scenarios where the underlying access credential may be updated or replaced without affecting the credential handle, enabling seamless credential lifecycle management without requiring client-side modifications. The credential management system may implement automated rotation mechanisms that generate new access credentials and update the credential-to-handle mappings while maintaining continuous API access availability for client applications. As such, the rotation process may occur transparently to client applications since the credential handles remain stable even when the underlying access credentials are replaced with updated versions.

The seamless rotation capability may enable organizations to implement proactive credential security practices including regular credential refresh cycles, compromise response procedures, and compliance-driven credential updates without disrupting client operations or requiring coordinated deployment activities. The credential management system may coordinate rotation activities across multiple credential instances and geographic regions while ensuring that all API access proxy components receive updated credential material before the previous credentials expire. The rotation process may include validation mechanisms that verify the functionality of new credentials before completing the rotation cycle and retiring the previous credential versions.

Taking a step back, the method 100B demonstrates a resolution to credential exposure vulnerabilities present in conventional API authentication workflows by eliminating the need for clients to store, handle, and transmit actual access credentials during API operations. Traditional authentication methods require clients to maintain persistent copies of access credentials that may be compromised through various attack vectors including memory dumps, configuration file exposure, and source code repository leaks. The present method addresses these vulnerabilities by maintaining actual credentials within secure infrastructure boundaries while enabling clients to perform API operations using opaque handles that provide no authentication value if compromised. Further, the distributed authentication approach provides enhanced security compared to centralized authentication systems that rely on single points of trust for credential validation and release decisions. As such, the present method distributes authentication authority across multiple independent components that must collectively approve credential access through threshold mechanisms, reducing the impact of individual component compromise and enabling fine-grained policy enforcement. The separation of credential storage, authentication, and injection operations across different system components provides defense-in-depth security architecture that limits the scope of potential security breaches.

FIG. 1C illustrates a method 100C for securing API access through distributed credential management and threshold-based authentication, in accordance with one embodiment. As an option, the method 100C may be implemented in the context of any one or more of the embodiments set forth in any previous and/or subsequent Figures and/or description thereof. Of course, however, the method 100C may be implemented in the context of any desired environment. Further, the aforementioned definitions may equally apply to the description below.

As shown, the method 100C demonstrates securing API access through distributed credential management and threshold-based authentication. Such a flow provides an alternative implementation approach to the method 100B described in FIG. 1B and may be utilized in conjunction with other authentication methods disclosed herein to provide enhanced security assurance through comprehensive distributed validation mechanisms. While the method 100B focuses on basic credential handle proxying with client authentication through passive and active challenge exchanges, the method 100C extends this foundation by implementing sophisticated threshold decryption coordination across multiple independent authenticators, weighted quorum orchestration protocols, and adaptive risk assessment mechanisms that dynamically adjust authentication requirements based on real-time threat analysis and behavioral pattern recognition.

In step 122, a resource access request is received from a client at a proxy component, where the proxy extracts credential references and validates their format against established handle specifications. The proxy may implement contextual risk analysis that evaluates client behavioral patterns, device characteristics, and environmental factors to inform adaptive threshold determination mechanisms for subsequent authentication processing.

In step 124, credential lifecycle management is performed using a credential management system (CMS) that maintains encrypted credentials while coordinating with policy databases for authentication evaluation. The CMS may implement automated credential rotation mechanisms that update credential-to-handle mappings without disrupting ongoing client operations and requiring code or configuration change.

In step 126, the CMS coordinates with multiple authenticators to validate clients according to credential policies through weighted quorum orchestration protocols. The coordination process may implement adaptive threshold mechanisms that dynamically adjust authentication requirements based on velocity analysis, device drift detection, and behavioral deviation patterns.

In step 128, threshold decryption is performed using distributed authenticators through secret key share coordination mechanisms. Each authenticator contributes weighted partial decryptions that reflect their assurance levels while maintaining cryptographic isolation to prevent individual component compromise from enabling complete credential reconstruction.

In step 130, the CMS receives decrypted credential parts through secure cryptographic coordination while implementing validation mechanisms that verify partial decryption integrity and authenticity. The collection process may include timeout mechanisms and retry logic to handle network delays while maintaining threshold requirements throughout distributed coordination activities.

In step 132, decrypted parts are combined into cohesive credentials using threshold cryptographic algorithms within secure processing boundaries. The reconstruction implements just-in-time credential generation with cryptographic auditability mechanisms that record participating authenticator identities and reconstruction timestamps in tamper-evident log structures.

In step 134, reconstructed credentials are transmitted from the CMS to the proxy through cryptographically mutually authenticated secure communication channels with time-limited transmission windows that minimize plaintext credential exposure periods. The transmission includes comprehensive audit logging of credential delivery events and proxy coordination activities.

In step 136, the proxy provides credentials to target resources through just-in-time injection mechanisms that support multiple credential formats while implementing secure memory management practices. The provision process includes response handling mechanisms that maintain audit trails of complete request-response cycles.

It is to be appreciated that organizations may implement the method 100C as a standalone comprehensive authentication solution or integrate specific steps with other disclosed methods to create hybrid authentication frameworks that combine the operational simplicity of basic credential handle proxying with the enhanced security assurance provided by distributed threshold cryptography, enabling flexible deployment scenarios that can adapt to varying security requirements, compliance obligations, and operational constraints while maintaining the fundamental principle of separating credential possession from credential usage across all authentication pathways.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
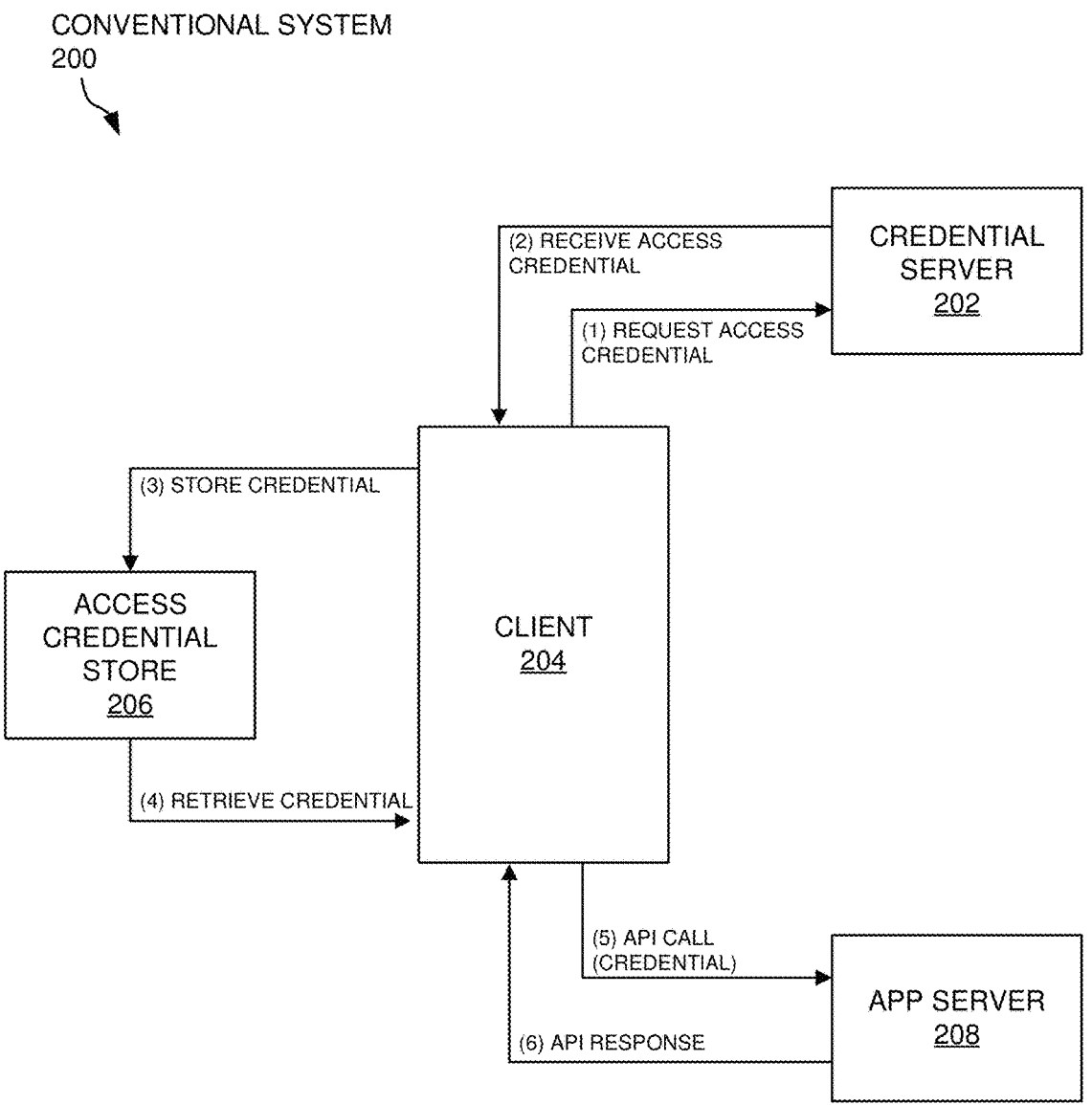
FIG. 2 illustrates a conventional system for API access with credential storage, according to aspects of the present disclosure.

FIG. 2 illustrates a conventional system 200 for API access with credential storage, in accordance with one embodiment. As an option, the conventional system 200 may be implemented in the context of any one or more of the embodiments set forth in any previous and/or subsequent Figures and/or description thereof. Of course, however, the conventional system 200 may be implemented in the context of any desired environment. Further, the aforementioned definitions may equally apply to the description below.

The conventional system 200 includes a credential server 202 that provides access credentials to requesting entities through standard authentication protocols and identity provider mechanisms. The credential server 202 validates client identity through conventional authentication mechanisms before issuing credentials directly to client systems for subsequent use in API operations. A client 204 may be included that communicates with the credential server 202 to request and obtain access credentials for subsequent API operations and resource access requests. The client 204 stores received credentials directly for persistent access to protected resources. Generally, the client 204 retrieves stored credentials from local storage systems when preparing API requests and includes these credentials in authentication headers and request parameters as required by target services. An access credential store 206 may be used to maintain access credentials for client applications using various storage mechanisms. Additionally, the conventional system 200 may include an app server 208 that receives API requests from the client 204 and validates the provided credentials before granting access to protected resources and services. The app server 208 implements standard authentication and authorization mechanisms. The app server 208 operates under the assumption that presented credentials are legitimate and have been properly protected by client systems, without implementing additional verification mechanisms to detect compromised and replayed credentials.

Taking a step back, the conventional system 200 demonstrates significant security vulnerabilities related to client-side credential storage and the distributed nature of credential custody across multiple system components. Traditional credential management approaches require clients to maintain persistent copies of access credentials that may be compromised through various attack vectors including memory dumps, configuration file exposure, source code repository leaks, and host system breaches. The conventional system 200 creates multiple points of credential exposure across the client 204, access credential store 206, and associated storage mechanisms, increasing the overall attack surface for credential theft and unauthorized access.

Additionally, the centralized credential issuance model implemented by the credential server 202 in the conventional system 200 creates multiple single points of failure where compromise of the credential server 202, the client 204, and/or the access credential store 206 may result in widespread credential exposure and unauthorized access across multiple client systems and applications.

As such, the conventional system 200 demonstrates the context of existing weaknesses and vulnerabilities in traditional credential management approaches that are addressed by the present invention. In particular, the conventional system 200 represents typical prior art implementations where clients store and handle access credentials directly, creating multiple points of exposure including client-side storage systems, configuration files, and application memory that may be compromised through various attack vectors. These conventional approaches create fundamental security vulnerabilities including credential theft from client systems, lack of centralized credential lifecycle control, and absence of comprehensive authentication mechanisms. Such issues and vulnerabilities are expressly resolved by the present disclosure through distributed credential custody, proxy-based authentication, threshold decryption technologies, and associated technologies described herein.

Figure 3:
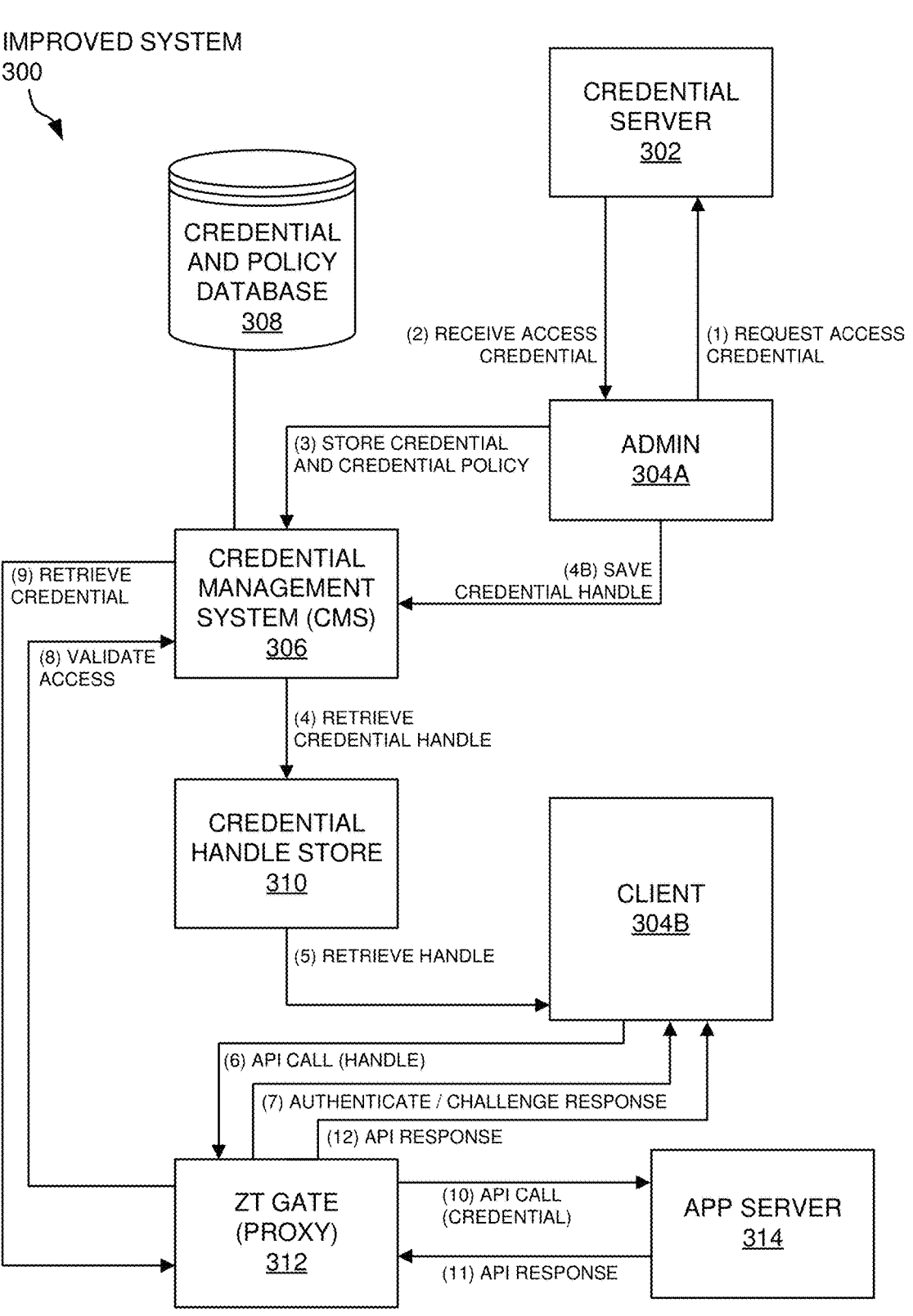
FIG. 3 illustrates an improved system for API access control using credential handles and proxy-based authentication, according to an embodiment of the present disclosure.

FIG. 3 illustrates an improved system 300 for API access control using credential handles and proxy-based authentication, in accordance with one embodiment. As an option, the improved system 300 may be implemented in the context of any one or more of the embodiments set forth in any previous and/or subsequent Figures and/or description thereof. Of course, however, the improved system 300 may be implemented in the context of any desired environment. Further, the aforementioned definitions may equally apply to the description below.

As shown, the improved system 300 builds upon the conventional system 200 of FIG. 2 by eliminating client-side credential storage vulnerabilities through a distributed architecture where clients receive only opaque credential handles while actual credentials remain securely managed within a dedicated credential management system 306 (described hereinbelow) and are injected just-in-time by a zero trust gate proxy 312.

The improved system 300 includes a credential server 302 that may provide access credentials to requesting entities through established authentication protocols while maintaining compatibility with existing identity provider systems and enterprise authentication infrastructure. The credential server 302 may operate using standard identity provider protocols including OAuth2, OpenID Connect, and SAML while supporting various credential types such as API keys, SSH keys, bearer tokens, and JWT tokens based on client authentication requirements. Additionally, the credential server 302 may transfer issued credentials to downstream credential management infrastructure rather than providing direct access to client systems, thereby implementing a custody transfer model that enhances credential security.

In various embodiments, the credential server 302 may integrate with existing enterprise identity management systems including Active Directory, LDAP directories, and cloud-based identity providers to leverage established authentication workflows and user directories. Credential lifecycle management functions may be implemented including issuance, renewal, and revocation while coordinating with the credential management system to ensure secure credential custody throughout the credential lifecycle. Further, federated authentication scenarios may be provided where credentials are issued based on external identity provider assertions and trust relationships established through standard federation protocols.

The improved system 300 further includes an admin 304A that may communicate with the credential server 302 to obtain access credentials for subsequent registration within the credential management infrastructure through administrative workflows and policy configuration processes. Such credential requests may be initiated through standard authentication flows and receive credential handles from credential storage systems rather than obtaining direct access to actual credential values. Further, credential policies may be configured within policy databases to define specific validation requirements including challenge-response mechanisms, telemetry-based validation parameters, and throttling enforcement rules.

In various embodiments, the admin 304A may operate with elevated privileges that enable credential provisioning, policy management, and system configuration activities while maintaining separation from client-facing operations and API access workflows. Additionally, the admin 304A may coordinate with multiple system components to establish credential-to-handle mappings, configure authentication policies, and manage the lifecycle of credential handles distributed to client applications. Administrative workflows may be implemented that support bulk credential provisioning, policy updates, and credential rotation activities across multiple client populations and geographic regions.

The improved system 300 includes a client 304B that may operate independently from administrative functions. In one embodiment, it may focus on API access operations using previously provisioned credential handles through standard client application workflows. In one embodiment, the client 304B may retrieve credential handles from designated storage systems and initiate API requests through proxy components while participating in challenge-response authentication processes when required by credential policies. Additionally, the client 304B may maintain compatibility with existing API client implementations while utilizing opaque credential handles instead of actual access credentials throughout API operations.

In this manner, the client 304B may operate across various computing platforms including mobile devices, desktop computers, server applications, and embedded systems without requiring platform-specific modifications to support the credential handle architecture. Further, the client 304B may store only credential handles rather than actual access credentials, thereby eliminating the risk of credential theft from client-side storage systems and reducing the attack surface for credential compromise. As such, the client 304B may participate in distributed authentication processes coordinated by proxy components while remaining unaware of the underlying credential management and threshold decryption mechanisms.

The improved system 300 further includes a credential management system 306 that may maintain centralized custody of access credentials and associated policies while providing secure access control mechanisms through cryptographic protection and policy-based authorization. Access credentials may be stored using encryption mechanisms comparable to those applied in hardware security modules and key management systems to ensure credential confidentiality and integrity. Additionally, the credential management system 306 may coordinate authentication processes across multiple independent authenticators and implement threshold decryption mechanisms that distribute credential access authority.

In one embodiment, the credential management system 306 may be implemented by independent service providers as third-party cloud services, enabling organizations to outsource credential management while maintaining security through cryptographic isolation and policy-based access controls. The third-party implementation model may provide organizations with managed credential services that reduce operational overhead while maintaining security through cryptographic mechanisms that prevent service providers from accessing plaintext credential material. Additionally, the credential management system 306 may implement privacy enhancing cryptography such as homomorphic encryption to provide data-in-use privacy for stored credentials and policy data, ensuring that credential material remains protected even during processing operations.

In some embodiments, when the credential management system 306 is operated by a third party, the system may implement proxy-based credential reconstruction where authenticators encrypt their partial decryption shares using the proxy's public key, enabling the third-party CMS to coordinate threshold operations without accessing plaintext credential material by simply passing the encrypted parts to the proxy for final combination. In this manner, the CMS may not require visibility into actual credential content, as authenticator-provided parts remain cryptographically protected throughout the coordination process and can only be decrypted and combined within the trusted proxy environment.

The improved system 300 includes a credential and policy database 308 in communication with the credential management system 306 that may store validation rules and authentication requirements that define how clients are authenticated before credential release through policy-driven access control mechanisms. For example, the credential and policy database 308 may maintain policies that specify authentication methods including passive telemetry-based validation using, but not limited merely to, IP address, time of day, call frequency, other environmental attributes, etc. Additionally, the credential and policy database 308 may define active challenge-response requirements that utilize, but not limited merely to, Physical Unclonable Functions, Trusted Execution Environments, etc. to provide device-anchored authentication mechanisms. In some embodiments, complex policy structures may be implemented that combine multiple authentication factors (such as through weighted quorum mechanisms and threshold requirements) that reflect organizational security standards and compliance requirements.

The improved system 300 further includes a credential handle store 310 that may maintain opaque reference identifiers for client applications without exposing actual credential values through secure handle management and distribution mechanisms. Time-limited cryptographic signatures may be implemented that expire independently of the underlying access credentials to provide enhanced security through temporal constraints and automatic handle expiration. Additionally, handle lifecycle management may be used which may include issuance, renewal, and revocation while maintaining stable handle values that enable seamless credential rotation without client-side modifications.

The credential handle store 310 may distribute credential handles to client applications through secure channels and authenticated distribution mechanisms that verify client identity before handle provisioning. Additionally, handle validation mechanisms may be used to verify handle authenticity, expiration status, and policy compliance before allowing handle usage in API requests. In some embodiments, the credential handle store 310 may support distributed deployment across multiple geographic regions with handle replication and synchronization mechanisms that ensure consistent handle availability and reduce access latency for geographically dispersed client populations.

The improved system 300 includes a zero trust gate proxy 312 that may serve as an intermediary component that validates client requests (such as via the CMS 306) and injects appropriate credentials into API calls (such as but not limited to through just-in-time credential insertion mechanisms). The zero trust gate proxy 312 may intercept API requests from client applications and coordinate authentication processes with the credential management system before forwarding authenticated requests to target resource servers. The zero trust gate proxy 312 may perform challenge-response validation with client systems to verify device identity and possession of appropriate authentication factors before retrieving credentials from the credential management system.

The zero trust gate proxy 312 may implement just-in-time credential injection mechanisms that insert reconstructed credentials into API requests using appropriate authentication headers and request parameters while preserving original request content and maintaining compatibility with existing server-side authentication mechanisms. Additionally, the zero trust gate proxy 312 may maintain exclusive custody of actual access credentials during the brief period required for credential injection operations while implementing secure memory management practices that immediately clear credentials after successful injection. Further, the system may be modified to include a distributed deployment across multiple geographic regions with load balancing and failover capabilities that ensure continuous API access availability and reduced latency for client applications.

The improved system 300 further includes an app server 314 that may receive authenticated API requests from the zero trust gate proxy 312 and provide responses through standard server-side processing mechanisms without requiring modifications to accommodate the proxy-based architecture. The app server 314 may implement conventional authentication and authorization mechanisms including bearer token validation, API key verification, and certificate-based authentication, amongst other possible mechanisms, depending on the credential type and authentication protocol requirements. Such API requests may be processed containing injected credentials in the same manner as requests received directly from clients in traditional authentication models.

The app server 314 may represent various types of backend services including cloud APIs, database servers, web applications, and microservices that require authenticated access for protected operations and resource access. It is envisioned that any type of backend service and/or API system may be represented by the app server 314.

The architectural separation between the admin 304A and client 304B roles in the improved system 300 may provide enhanced security through role-based access control and separation of duties principles that limit the scope of administrative privileges and reduce the risk of credential misuse. The admin 304A may operate with credentials and privileges that enable system configuration and credential provisioning activities while the client 304B may operate with limited privileges that enable only API access operations using provisioned credential handles. The separation of administrative and client functions may enable organizations to implement different security controls, authentication requirements, and access policies for each role based on their respective security requirements and operational needs. Additionally, the role distinction establishes a clear producer-consumer relationship where the admin 304A functions as the producer with capabilities to create, replace, edit, and delete credential handles and policies, while the client 304B operates as the consumer who can only utilize the credential handles and configurations that the admin 304A has prepared and provisioned.

The component coordination mechanisms implemented by the improved system 300 may enable seamless credential custody transfer from the credential server 302 through the credential management system 306 to the zero trust gate proxy 312 without exposing credential material to client systems or intermediate storage locations. The credential management system 306 may coordinate with the credential and policy database 308 to evaluate authentication requests and determine credential release authorization based on policy compliance and authentication success. The zero trust gate proxy 312 may coordinate with multiple system components to perform comprehensive client validation, retrieve appropriate credentials after successful authentication, and inject credentials into API requests while maintaining audit trails and policy enforcement.

In comparing FIG. 3 to FIG. 2, as described hereinabove, FIG. 3 illustrates an improved system 300 for API access control using credential handles and proxy-based authentication that addresses the fundamental vulnerabilities present in the conventional system 200 of FIG. 2. Unlike the conventional system 200 where clients store and handle actual access credentials directly, the improved system 300 implements a credential custody separation architecture where clients receive only opaque credential handles from a credential handle store 310 while actual credentials remain securely stored within a credential management system 306. The improved system 300 introduces a zero trust gate proxy 312 that validates clients through configurable authentication mechanisms and injects credentials just-in-time, eliminating the client-side credential exposure risks demonstrated in FIG. 2 while maintaining compatibility with existing authentication protocols and requiring minimal modifications to client and server software.

The improved system 300 demonstrates a resolution to credential exposure vulnerabilities present in conventional API authentication systems by implementing credential custody mechanisms that eliminate client-side credential storage and provide centralized credential management with distributed authentication capabilities. Traditional API security approaches require clients to store and present access credentials directly, creating opportunities for credential compromise through memory dumps, configuration file exposure, and source code leaks that may result in widespread unauthorized access. The improved system 300 addresses these vulnerabilities by maintaining actual credentials within secure infrastructure boundaries while enabling clients to perform API operations using opaque handles that provide no authentication value if compromised.

The distributed authentication and credential custody architecture implemented by the improved system 300 may provide enhanced security compared to centralized authentication systems that rely on single points of trust for credential validation and storage. The improved system 300 may distribute authentication authority across multiple independent components while maintaining centralized credential custody within the credential management system 306, reducing the impact of individual component compromise and enabling fine-grained policy enforcement through threshold mechanisms. The separation of credential possession from credential usage implemented by the improved system 300 may ensure that credential theft from client systems cannot result in unauthorized access to protected resources since credential handles lack authentication value without corresponding validation through the credential management infrastructure.

In various embodiments, the improved system 300 may be extended to support additional deployment models including hybrid cloud configurations where the credential management system 306 operates across multiple cloud providers and on-premises infrastructure to provide enhanced availability and vendor independence. The zero trust gate proxy 312 may be deployed in various configurations including network-inline proxies, sidecar containers, and host-based agents depending on organizational security requirements and infrastructure constraints.

FIG. 4 illustrates a method 400 for managing API access credentials with validation pathways, in accordance with one embodiment. As an option, the method 400 may be implemented in the context of any one or more of the embodiments set forth in any previous and/or subsequent Figures and/or description thereof. Of course, however, the method 400 may be implemented in the context of any desired environment. Further, the aforementioned definitions may equally apply to the description below.

The method 400 begins with a step 402, where an access credential may be generated by a credential server. The method 400 then proceeds to a step 404, where the credential may be stored in a credential management system. The credential management system may coordinate with a credential and policy database to maintain validation rules and authentication requirements. Following storage, the method 400 moves to a step 406, where an opaque credential handle may be issued to a client. The method 400 then advances to a step 408, where the handle and API request may be received at a proxy.

The method 400 then reaches a decision 410, where the system determines whether the credential policy requires active validation. If active validation is required (Yes branch), the method 400 proceeds to a step 412, where the client may be validated using a challenge-response pair. After successful challenge-response validation, the method 400 moves to a decision 414, where the system determines whether passive telemetry validation is needed. If passive telemetry validation is required (Yes or No branch from decision 414), the method 400 proceeds to a step 416, where the client may be validated using passive telemetry attributes. If passive telemetry validation is not required (No branch from decision 414), the method 400 proceeds directly to a step 420.

At the step 416, the client may be validated using passive telemetry attributes. Following passive validation at step 416, the method 400 moves to a step 418, where the credential may be retrieved from the credential management system after active and passive validations. Following credential retrieval at step 418, the method 400 advances to a step 420, where the authenticated API request may be transmitted to a resource server.

In view of the flow indicated for FIG. 4, further details are provided hereinbelow with respect to one or more of the steps provided.

Step 402 involves the generation of an access credential by a credential server through established identity provider protocols and authentication mechanisms that support various credential types including API keys, OAuth tokens, JWT tokens, and SSH keys based on organizational requirements and client authentication needs. The credential generation process may implement standard authentication schemes including OAuth2, OpenID Connect, and SAML while integrating with existing enterprise identity management systems including Active Directory, LDAP directories, and cloud-based identity providers to leverage established authentication workflows and user directories. The credential server may validate requesting entity identity through conventional authentication mechanisms before generating credentials that will subsequently be transferred into secure custody rather than being provided directly to client systems.

Step 404 involves the secure storage of the generated access credential within a credential management system through secure custody transfer mechanisms and cryptographic protection protocols that ensure credential material remains protected during the transition from the credential server to the secure storage infrastructure. The storage operation may implement advanced security features including trusted execution environments for hardware-based credential protection and threshold cryptography mechanisms that distribute credential access authority across multiple independent authenticators while associating the access credential with policy definitions that specify authentication requirements, validation methods, and access conditions for subsequent credential retrieval operations. The credential management system may coordinate with policy databases to establish validation rules and authentication requirements that define how clients are authenticated before credential release through distributed authentication processes, ensuring that actual credentials remain within protected infrastructure boundaries rather than being exposed to client systems or intermediate storage locations.

Step 406 involves the issuance of an opaque credential handle to a client through secure handle generation and distribution mechanisms that provide reference identifiers without exposing actual credential values or authentication parameters. The credential handle generation process may implement cryptographic binding mechanisms that associate handles with specific client identities, device characteristics, and temporal constraints while maintaining the opaque nature of the handle material that lacks cryptographic value and cannot be independently used for API access without corresponding validation through the credential management infrastructure. The handle distribution process may utilize secure channels and authenticated delivery mechanisms that verify client identity before handle provisioning while maintaining audit trails of handle issuance events and policy compliance verification, enabling clients to reference stored credentials through opaque identifiers that provide no authentication value if compromised while supporting seamless credential rotation without requiring client-side modifications.

In various embodiments, the credential reference may be implemented as an opaque identifier that lacks cryptographic value and cannot be independently used for API access without corresponding validation through the credential management infrastructure. The opaque nature of the credential reference may ensure that even if the reference is compromised or intercepted, it provides no authentication value to unauthorized parties and cannot be reverse-engineered to reveal underlying credential information or authentication parameters.

Additionally, in various embodiments, the credential management system may be configured to rotate the credential reference upon expiration or renewal of the underlying access credential while maintaining stable reference values that enable seamless credential lifecycle management without requiring client-side modifications. The rotation process may occur transparently to client applications since the credential references remain consistent even when underlying access credentials are updated with new versions.

In various embodiments, the credential management system may implement comprehensive rotation policies that trigger credential updates under various security conditions including evidence or suspicion of credential compromise affecting the credential itself, associated servers, or any systems with direct or indirect exposure such as API key generators and credential storage infrastructure. Additionally, rotation may be initiated upon discovery of weak or broken cryptographic primitives including compromised random number generators, employee departures where personnel may have had plaintext credential access, and risk-based assessments that determine high-risk sensitive systems require more frequent automated rotation cycles such as monthly or quarterly intervals. Furthermore, the system may rotate credentials when they are no longer needed or require refreshing, such as when credentials shared with third parties become obsolete, when access patterns indicate potential misuse, or when compliance requirements mandate periodic credential renewal regardless of security incidents. It is to be appreciated that other scenarios may exist which may require a rotation, as determined by a system administrator (or even prompted by an audit or analysis by an AI system).

Step 408 involves the reception of an API request containing the credential handle from the client at a proxy component through standard API request processing mechanisms and authentication protocols that support various request formats including REST, GraphQL, and RPC while maintaining compatibility with existing client implementations. The API request reception process may involve intercepting incoming requests and extracting the credential handle along with associated request metadata including client identity information, network context, and authentication parameters for subsequent validation and policy evaluation by downstream authentication components. The proxy may validate the format and structure of the credential handle to ensure compliance with established handle specifications and temporal constraints before proceeding with authentication operations, while collecting additional context information including client IP address, geographic location, request timing, and behavioral patterns that contribute to comprehensive client validation and risk assessment during the distributed authentication workflow. Decision 410 involves determining whether the credential policy requires active validation through challenge-response mechanisms and hardware-based authentication factors by evaluating policy requirements stored in the credential and policy database to determine the appropriate authentication pathway based on credential sensitivity, client context, and organizational security requirements. The decision process may evaluate multiple factors including client identity, device posture, geographic location, and risk assessment scores to determine whether active validation mechanisms are required for the specific access request while implementing risk-based authentication logic that dynamically adjusts authentication requirements based on real-time threat intelligence, behavioral analysis, and contextual factors that may indicate elevated security risks. The policy-driven decision process may support adaptive authentication mechanisms that automatically escalate authentication requirements when anomalous access patterns, suspicious client behavior, and elevated risk indicators are detected during the request evaluation process, enabling organizations to implement flexible authentication policies that balance security assurance with operational efficiency.

In various embodiments, the system may implement dynamic policy adjustment mechanisms that automatically modify credential policies, authenticator inclusion and exclusion criteria, authenticator weight assignments, and authentication parameters based on evolving threat intelligence, discovered vulnerabilities, and organizational policy changes through rule-based systems, artificial intelligence algorithms, or hybrid approaches that combine both methodologies. While challenge-response mechanisms provide higher confidence levels compared to passive telemetry and fingerprint authentications, the system recognizes that such mechanisms may require customer adoption, installation, or enablement of specific technologies, prompting the dynamic policy engine to balance authentication assurance requirements against deployment feasibility and user experience considerations when automatically adjusting authentication pathways and requirements in response to changing security conditions and threat landscapes.

Step 412 involves validating the client using challenge-response pairs through hardware-based authentication mechanisms and cryptographic proof-of-possession protocols that utilize Physical Unclonable Functions, Trusted Execution Environments, and other hardware-based authentication factors to provide device-anchored security assurance. The challenge-response validation process may involve generating cryptographic challenges that require client possession of device-bound authentication factors and private key material to produce valid responses that demonstrate legitimate client identity and authorization while implementing proof-of-possession mechanisms that verify client control of device-bound authentication factors without exposing sensitive key material to network transmission and potential interception. The active validation process may include temporal constraints and replay protection mechanisms that ensure challenge freshness and prevent unauthorized reuse of authentication responses across multiple access attempts, while supporting multiple authentication factor types including biometric verification, hardware security modules, and blockchain-based identity verification to provide enhanced assurance for high-security environments.

Decision 414 involves determining whether passive telemetry validation is needed based on policy requirements and authentication completeness criteria by evaluating whether additional passive validation factors are required to satisfy the complete authentication policy or whether the active challenge-response validation provides sufficient assurance for credential release. The decision process may evaluate the strength and assurance level of the completed active authentication factors when determining whether supplementary passive validation is required while implementing authentication factor composition logic that combines active and passive validation results to achieve policy-defined assurance levels and authentication strength requirements. The passive validation determination may consider the weighted contribution of completed authentication factors against policy-defined threshold requirements to determine whether additional passive validation mechanisms are needed to satisfy the complete authentication policy, enabling organizations to implement layered authentication approaches that optimize security assurance while maintaining operational efficiency.

In various embodiments, the passive validation mechanisms may comprise validating the client using telemetry-based attributes including at least one of IP address, time of day, and call frequency analysis. The telemetry-based validation may implement behavioral pattern recognition that establishes baseline client characteristics and identifies anomalous access attempts that may indicate credential compromise or unauthorized usage while operating transparently without requiring explicit client interaction.

Step 416 involves validating the client using passive telemetry attributes through comprehensive contextual analysis and behavioral verification mechanisms that evaluate multiple contextual factors including IP address verification, geographic location analysis, behavioral pattern recognition, network characteristics, access timing patterns, and device fingerprinting to provide comprehensive client identity verification without requiring explicit client interaction. The passive validation process may integrate with threat intelligence feeds and reputation databases to identify clients originating from known malicious networks, compromised systems, and high-risk geographic locations while implementing machine learning algorithms that establish baseline client behavior patterns and identify deviations that may require additional authentication factors and security controls. The telemetry-based authentication may implement adaptive scoring mechanisms that assign risk levels to client requests based on the combination of passive attributes and historical access patterns to inform authentication decisions and policy enforcement, enabling high-throughput API access scenarios where active challenge-response mechanisms may introduce unacceptable latency while still providing meaningful security assurance through contextual analysis.

Step 418 involves retrieving the access credential from the credential management system after active and passive validations through threshold decryption mechanisms and distributed authentication coordination. The validation credential retrieval may implement just-in-time decryption mechanisms that reconstruct credentials on-demand rather than maintaining persistent plaintext copies that could be subject to unauthorized access and compromise while including audit logging mechanisms that record authentication decisions, participating validation components, and credential usage events for compliance monitoring and forensic analysis purposes. The retrieval operation may ensure that the access credential exists in plaintext form only within secure memory boundaries and only for the duration required to complete the credential injection operation into the client's API request, enabling organizations to implement authentication policies that provide appropriate security assurance for routine API operations and trusted client populations without requiring the enhanced assurance provided by active challenge-response mechanisms.

Step 420 involves transmitting the authenticated API request to a resource server through standard API forwarding mechanisms and secure communication protocols that utilize secure communication channels including TLS encryption and certificate pinning to protect the authenticated request during network transit while maintaining comprehensive logging of API access events and credential usage patterns. The transmission process may involve injecting the retrieved access credential into the client's original API request using appropriate authentication headers, parameters, and body sections according to the authentication protocol requirements while maintaining the original request structure and content for compatibility with existing server-side authentication mechanisms. The authenticated request forwarding may implement response handling mechanisms where the proxy receives the server response and forwards the response back to the client while maintaining audit trails of the complete request-response cycle, enabling the resource server to remain unaware of the credential handle architecture and proxy-based authentication mechanisms while processing requests using standard authentication and authorization procedures.

Figure 5:
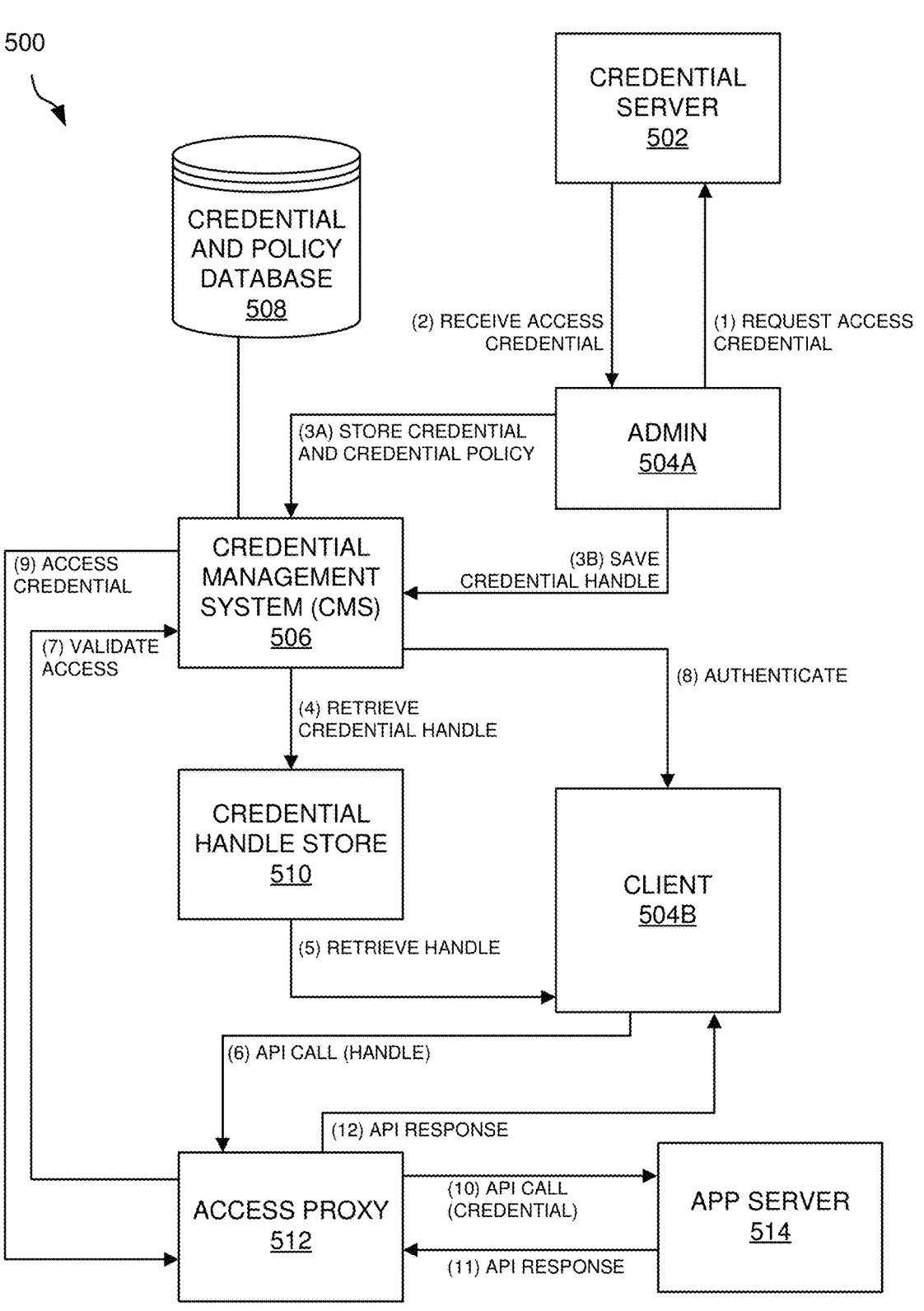
FIG. 5 illustrates a system for API access control using credential handles and proxy-based authentication, according to an embodiment of the present disclosure.

FIG. 5 illustrates a system 500 for API access control using credential handles and proxy-based authentication, in accordance with one embodiment. As an option, the system 500 may be implemented in the context of any one or more of the embodiments set forth in any previous and/or subsequent Figures and/or description thereof. Of course, however, the system 500 may be implemented in the context of any desired environment. Further, the aforementioned definitions may equally apply to the description below.

FIG. 5 differs from FIG. 3 primarily in two key enhancements. First, FIG. 5 displays advanced capabilities of the access proxy 512 compared to the zero trust gate proxy 312, and the introduction of a direct authentication step between the credential management system 506 and client 504B that was not present in FIG. 3. While the zero trust gate proxy 312 in FIG. 3 focuses on basic credential validation and injection, the access proxy 512 in FIG. 5 extends functionality to implement comprehensive data volume monitoring and throttling enforcement mechanisms that measure response data volumes and prevent excessive resource consumption according to credential policies.

Second, FIG. 5 introduces an alternative step (8) as a direct authentication step where the credential management system 506 authenticates the client 504B, representing an alternative streamlined authentication process compared to FIG. 3 where the equivalent interaction involved challenge-response mechanisms between system components. In some embodiments, this direct authentication approach in FIG. 5 simplifies the validation workflow while maintaining security assurance, demonstrating an evolution from the challenge-based authentication model presented in FIG. 3 to a more efficient direct authentication mechanism that still ensures proper client validation before credential release and injection by the enhanced access proxy 512.

All other components in FIG. 5 mirror the functionality previously described for FIG. 3, with the credential server 502 corresponding to credential server 302, admin 504A corresponding to admin 304A, client 504B corresponding to client 304B, credential management system 506 corresponding to credential management system 306, credential and policy database 508 corresponding to credential and policy database 308, credential handle store 510 corresponding to credential handle store 310, and app server 514 corresponding to app server 314.

With respect to further details, the access proxy 512 may serve as an advanced intermediary component that extends beyond basic credential injection to implement comprehensive access control and data governance capabilities through real-time monitoring and policy enforcement mechanisms. For example, the access proxy 512 coordinates with the credential management system 506 to perform client authentication and credential retrieval while simultaneously measuring data transfer volumes including request payload sizes, response data amounts, and cumulative usage over configurable time periods to enforce throttling policies that prevent excessive resource consumption and unauthorized data exfiltration attempts. The access proxy 512 implements just-in-time credential injection mechanisms that replace credential handles with actual access credentials in appropriate authentication headers and parameters while maintaining secure memory management practices that immediately clear credential material after successful injection, and supports various deployment configurations including network-inline proxies, sidecar containers, and host-based agents depending on organizational security requirements. Additionally, the access proxy 512 maintains comprehensive audit trails of authentication events, credential usage patterns, data transfer volumes, and throttling enforcement actions while providing compatibility with existing server-side authentication mechanisms and API infrastructure, enabling organizations to implement fine-grained access control policies that govern both authentication assurance and data access limitations at the client-credential pair level.

In various embodiments, the access proxy 512 may implement comprehensive throttling mechanisms that extend beyond basic data volume measurement to include frequency-based controls monitoring API calls per minute, hour, or day, IP address-specific limitations, date-time based restrictions, quorum score-based throttling that considers authentication assurance levels, a combination of one or more foregoing items, etc., and additional factors such as client software versions, protocol versions, and network protocol cipher suites. The throttling enforcement may be configured through throttling switches embedded within credential policies, enabling organizations to define multi-dimensional access control parameters that adapt to various operational and security requirements, while client responses to throttling enforcement may be protocol and application-specific (such as returning "HTTP 503 Service Unavailable" responses for web APIs when clients approach or exceed their allocated limits). Further additional options may include request queuing, reduced priority processing, or graduated response mechanisms that provide warnings before implementing full throttling restrictions.

It is to be appreciated that, in various embodiments, the credential policy may define throttling enforcement parameters that limit data volume access for specific clients, and the proxy may be further configured to measure volume of response data for comprehensive throttling enforcement. The throttling mechanisms may implement real-time monitoring of data transfer volumes including request payload sizes, response data amounts, and cumulative usage over specified time periods to prevent excessive resource consumption and unauthorized data exfiltration attempts.

Still yet, in other embodiments, the proxy may collect and forward comprehensive client metadata including device characteristics, network attributes, behavioral patterns, and environmental context information to the CMS to enhance authentication decision-making and risk assessment capabilities. This metadata forwarding enables the CMS to perform more informed authentication evaluations by providing authenticators with relevant client context that supports both passive validation mechanisms and adaptive threshold determination based on real-time client characteristics.

Figure 6:
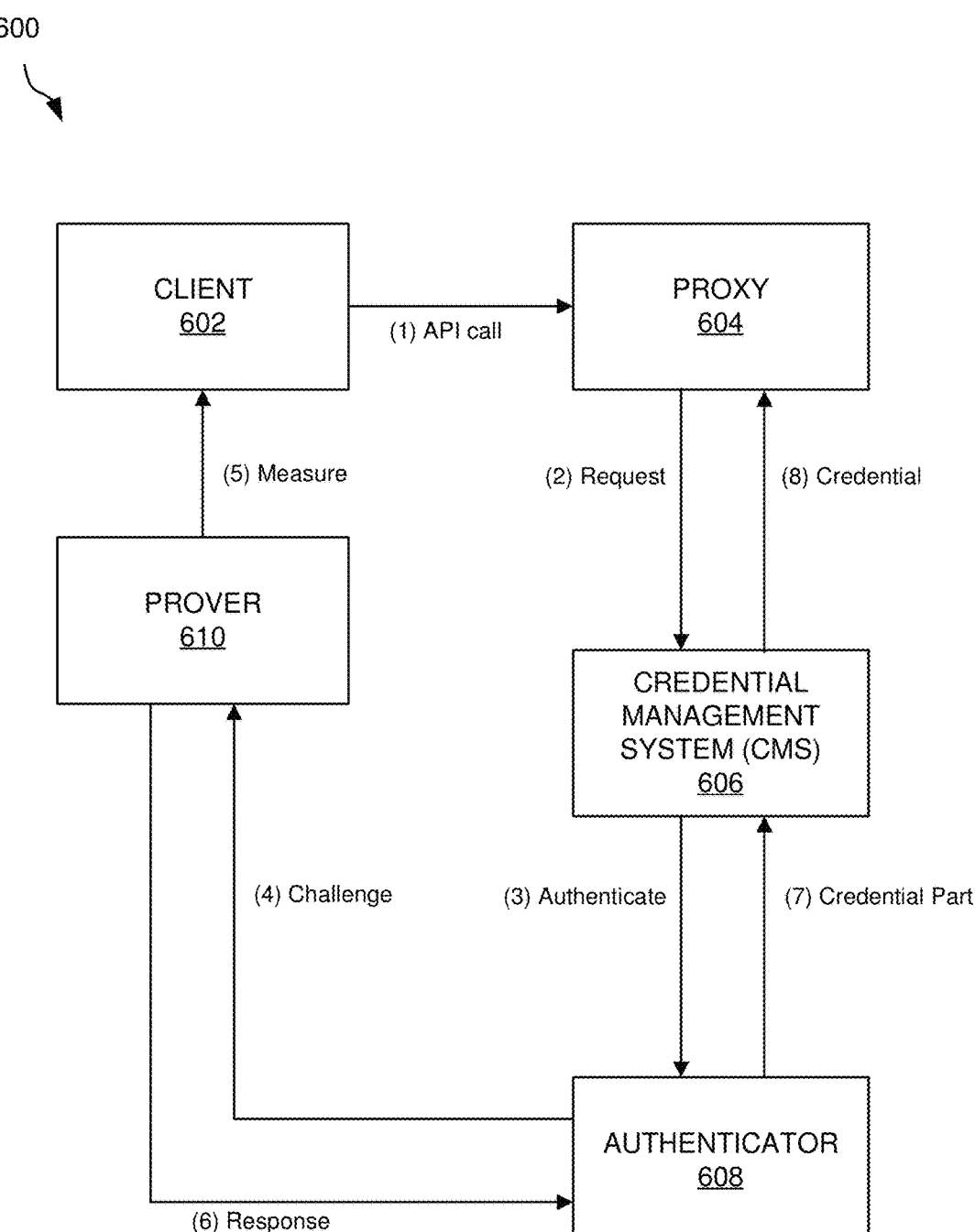
FIG. 6 illustrates a sequence diagram representing a system for API access control using credential handles and distributed authentication, according to aspects of the present disclosure.

FIG. 6 illustrates a system 600 for API access control using credential handles and distributed authentication, in accordance with one embodiment. As an option, the system 600 may be implemented in the context of any one or more of the embodiments set forth in any previous and/or subsequent Figures and/or description thereof. Of course, however, the system 600 may be implemented in the context of any desired environment. Further, the aforementioned definitions may equally apply to the description below.

The system 600 includes a client 602 that may initiate API access requests using credential handles rather than actual access credentials through standard client application workflows and authentication mechanisms. The client 602 may store only opaque credential handles that lack cryptographic value and cannot be independently used for API access without corresponding validation through distributed authentication infrastructure. Additionally, the client 602 (or client host, hosting infrastructure) may participate in challenge-response authentication processes when required by credential policies while maintaining separation from actual credential material throughout the authentication workflow and credential reconstruction operations.

The client 602 may operate across various computing platforms including mobile devices, desktop computers, server applications, and embedded systems without requiring platform-specific modifications to support the distributed authentication architecture and threshold decryption mechanisms. For example, the client 602 may communicate with proxy components through secure network channels while maintaining compatibility with existing API client implementations and authentication protocols. The client 602 may remain unaware of the underlying distributed authentication coordination and threshold decryption processes implemented by downstream system components during credential reconstruction and injection operations.

The system 600 further includes a proxy 604 that may serve as an intermediary component between client applications and credential management infrastructure while coordinating distributed authentication processes and credential injection operations. For example, API requests may be intercepted by the proxy 604 from the client 602 and coordinate authentication processes with credential management components before injecting appropriate credentials and forwarding authenticated requests to target resource servers. The proxy 604 may implement just-in-time credential injection mechanisms that insert reconstructed credentials into API requests using appropriate authentication headers and parameters while maintaining compatibility with existing server-side authentication mechanisms.

The proxy 604 may maintain exclusive custody of reconstructed access credentials during the brief period required for credential injection operations while implementing secure memory management practices that immediately clear credential material after successful injection into authenticated API requests. The proxy 604 may coordinate with multiple system components to perform comprehensive client validation, retrieve appropriate credentials after successful distributed authentication, and inject credentials into API requests while maintaining audit trails and policy enforcement throughout the authentication and authorization workflow. Additionally, various deployment configurations may be supported including network-inline proxies, sidecar containers, and host-based agents depending on organizational security requirements and infrastructure constraints.

The system 600 includes a credential management system 606 that operates similarly to the credential management system 306 described within the context of FIG. 3, as an example, but extends functionality to coordinate distributed authentication processes and threshold decryption operations across multiple independent authenticators. Like the credential management system 306, the credential management system 606 maintains centralized custody of access credentials and associated policies while implementing enhanced threshold decryption mechanisms that combine partial decryptions from multiple authentication sources for just-in-time credential reconstruction.

Building upon the authentication coordination capabilities described for the credential management system 306 in FIG. 3, the credential management system 606 orchestrates authentication workflows across distributed authenticator components while implementing weighted quorum mechanisms and threshold requirements, extending the audit capabilities by maintaining comprehensive trails of threshold decryption operations and distributed authentication decisions across multiple authenticator components.

The system 600 further includes an authenticator 608 that functions as an enhanced version of the authenticator(s) 106 described in FIG. 1A, performing independent client validation operations while contributing partial decryptions to threshold reconstruction processes and coordinating with prover components to perform comprehensive client measurement and validation processes that extend beyond basic validation mechanisms. The authenticator 608 implements hardware-based authentication factors including Physical Unclonable Functions, immutable root-of-trust, and Trusted Execution Environments while adding secret key share management capabilities that enable participation in distributed threshold decryption operations, representing an advancement over the basic authentication mechanisms by initiating client validation processes that enhance challenge-response capabilities through issuing authentication challenges that incorporate device-specific parameters and temporal constraints to prevent replay attacks.

The system 600 includes a prover 610 that introduces a new component not present in previous systems, performing client measurement operations and generating challenge responses on behalf of client systems during distributed authentication processes while implementing comprehensive measurement and attestation mechanisms including Trusted Platform Module attestation and Physical Unclonable Function challenge-response generation. The prover 610 responds to authentication challenges by performing comprehensive client measurement operations that extend beyond basic client validation, implementing hardware attestation and device fingerprinting capabilities while generating challenge responses using device-bound cryptographic material and hardware-based authentication factors, then returning authentication responses to the authenticator 608 for validation according to established cryptographic protocols.

The distributed authentication sequence begins with the client 602 initiating API calls using credential handles, while the proxy 604 extends functionality by implementing enhanced credential request forwarding and distributed authentication coordination capabilities. Following client measurement and challenge response validation, the authenticator 608 performs partial decryption operations corresponding to its assigned weight within the weighted quorum mechanisms, utilizing secret key shares held exclusively by the authenticator component while ensuring that no single authenticator possesses sufficient information to independently reconstruct complete access credentials, producing partial decryption shares that contribute to the credential reconstruction process coordinated by the credential management system 606.

The credential management system 606 collects partial decryption shares from multiple participating authenticators and evaluates whether the collected shares satisfy threshold requirements, considering both the number of successful authenticators and their weighted contributions based on assigned trust levels and authentication assurance capabilities. Upon satisfying threshold requirements, the credential management system 606 combines the collected partial decryption shares to reconstruct the complete plaintext access credential through cryptographic threshold reconstruction algorithms within secure processing boundaries including trusted execution environments and hardware security modules, implementing just-in-time credential reconstruction mechanisms that generate plaintext credentials on-demand before returning the assembled access credential to the proxy 604 for immediate injection into the client's API request.

The sequence of interactions ensures that the client 602 never receives or handles actual access credentials throughout the entire authentication and API access workflow, maintaining strict separation between credential possession and credential usage while the distributed authentication architecture provides enhanced security through threshold mechanisms that require successful validation from multiple independent authenticators before credential reconstruction and release, with the coordination between the authenticator 608 and prover 610 enabling comprehensive client validation that combines passive telemetry analysis with active challenge-response mechanisms to provide robust authentication assurance and device-anchored security verification.

The system 600 demonstrates a resolution to centralized authentication vulnerabilities and single points of failure present in conventional credential management systems by implementing distributed authentication mechanisms and threshold cryptography that distribute trust across multiple independent components, while introducing an innovative authenticator-to-prover interaction model that represents a significant advancement over existing art. Traditional authentication systems typically rely on centralized credential storage and validation mechanisms that create single points of failure where compromise of the central authority may result in widespread credential exposure and unauthorized access, and furthermore lack the sophisticated client measurement and attestation capabilities provided by the authenticator 608 and prover 610 coordination. The system 600 addresses these vulnerabilities by distributing authentication authority across multiple independent authenticators while maintaining centralized coordination through the credential management system 606 that orchestrates distributed authentication processes without possessing complete cryptographic authority for credential reconstruction, and uniquely enhances this distributed model through the authenticator 608 issuing device-specific challenges to the prover 610, which performs comprehensive client measurement operations including hardware attestation and device fingerprinting before generating cryptographically verifiable challenge responses that provide hardware-anchored authentication assurance not available in conventional systems that lack this specialized component interaction and comprehensive client validation framework.

Figure 7:
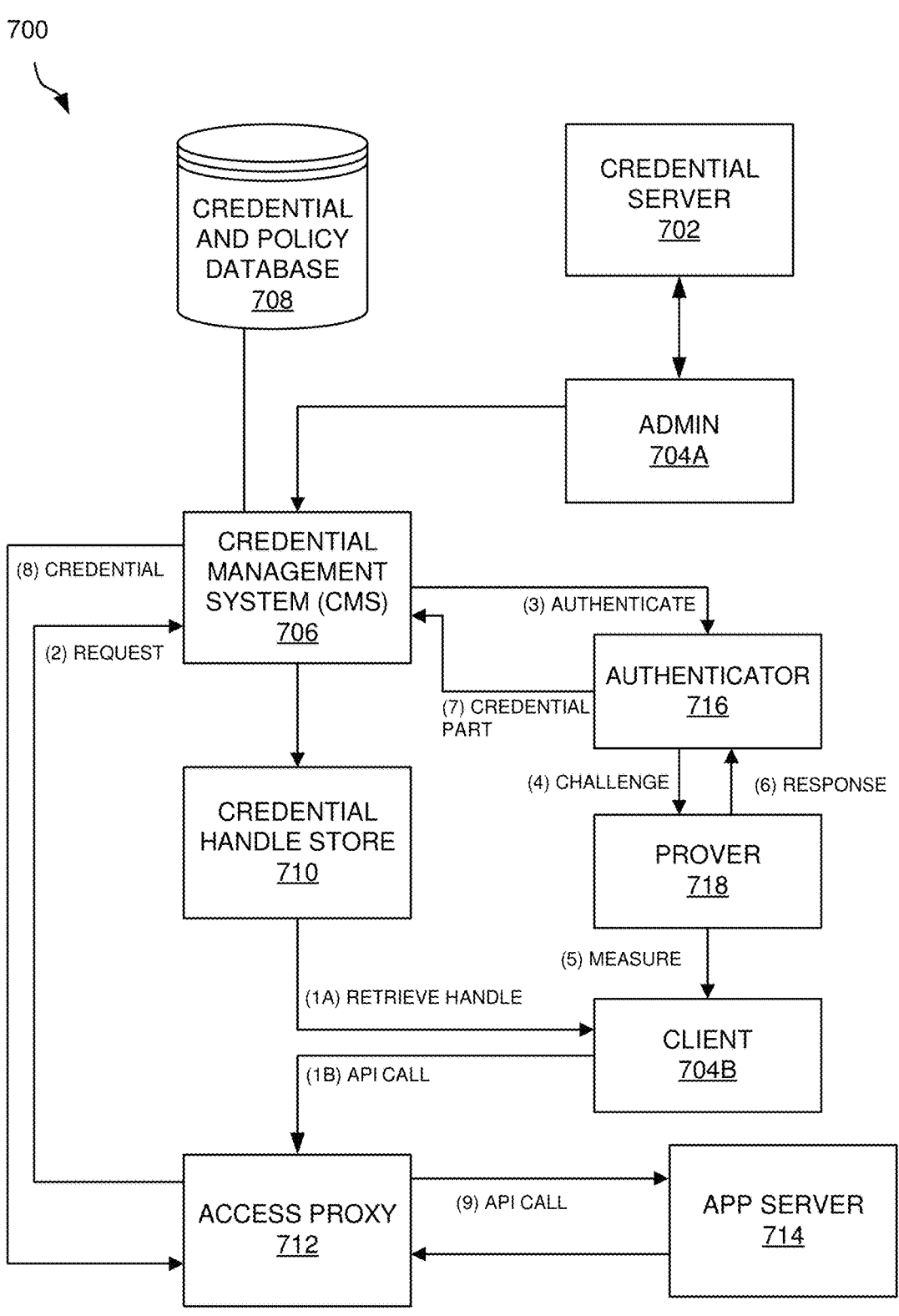
FIG. 7 illustrates a sequence diagram representing a system for API access control using credential handles and proxy-based authentication, according to an embodiment of the present disclosure.

FIG. 7 illustrates a system 700 for API access control using credential handles and proxy-based authentication, in accordance with one embodiment. As an option, the system 700 may be implemented in the context of any one or more of the embodiments set forth in any previous and/or subsequent Figures and/or description thereof. Of course, however, the system 700 may be implemented in the context of any desired environment. Further, the aforementioned definitions may equally apply to the description below The system 700 implements a comprehensive credential management and authentication workflow where the core system components correspond directly to those presented in FIG. 5, with credential server 702 corresponding to credential server 502, admin 704A corresponding to admin 504A, credential management system 706 corresponding to credential management system 506, credential and policy database 708 corresponding to credential and policy database 508, credential handle store 710 corresponding to credential handle store 510, client 704B corresponding to client 504B, access proxy 712 corresponding to access proxy 512, and app server 714 corresponding to app server 514.

In comparing FIG. 7 to FIG. 5, FIG. 7 builds upon the comprehensive system architecture presented in FIG. 5 by integrating the advanced authenticator 716 and prover 718 components introduced in FIG. 6 into the complete operational workflow, demonstrating how distributed authentication with hardware-anchored validation can be seamlessly incorporated into the full credential management lifecycle. While FIG. 5 shows a streamlined authentication step (8) between the credential management system 506 and client 504B, FIG. 7 expands this interaction into a sophisticated multi-component authentication process where the credential management system 706 coordinates with the authenticator 716 in step (3), which then issues challenges to the prover 718 in step (4) for comprehensive client measurement in step (5) before receiving challenge responses in step (6) and returning credential parts in step (7). This enhancement transforms the simplified authentication model of FIG. 5 into a robust distributed validation framework that maintains all the core functionality including credential provisioning, handle distribution, and data volume monitoring while adding the hardware-anchored security assurance and threshold decryption capabilities demonstrated in FIG. 6, thereby providing organizations with a complete end-to-end solution that combines operational workflow management with advanced cryptographic authentication mechanisms and device-bound security verification.

In operation, the system 700 implements a comprehensive credential management and authentication workflow that begins with the credential server 702 providing an access credential to the admin 704A, followed by the admin 704A storing the credential within the credential management system 706 while establishing appropriate policy associations within the credential and policy database 708. The credential management system 706 generates and stores a corresponding credential handle within the credential handle store 710, which provides the handle to the client 704B for subsequent API operations. When the client 704B retrieves a handle in step (1A) and initiates an API call in step (1B), the request includes the credential handle and is received by the access proxy 712, which sends a validation request in step (2) to the credential management system 706. The credential management system 706 then initiates distributed authentication by sending an authentication request in step (3) to the authenticator 716, providing encrypted credential shares and authentication parameters. The authenticator 716 performs comprehensive client validation by issuing a challenge in step (4) to the prover 718, which conducts detailed client measurement operations in step (5) including hardware attestation and device fingerprinting before returning a cryptographically verifiable challenge response in step (6) to the authenticator 716. Upon successful validation, the authenticator 716 performs threshold decryption operations and returns credential parts in step (7) to the credential management system 706, which assembles the complete access credential and returns it in step (8) to the access proxy 712. The access proxy 712 injects the retrieved access credential into the API request and transmits the authenticated request in step (9) to the app server 714, which processes the request and returns a response that is forwarded back to the client 704B, demonstrating the integration of hardware-anchored distributed authentication within the complete credential custody and API access workflow.

Taking a step back, the integration of the authenticator 716 and prover 718 components in FIG. 7 represents a non-obvious improvement over prior art by introducing a novel separation of authentication authority from client measurement operations that fundamentally transforms conventional authentication architectures which typically combine validation logic and client interaction within single monolithic components. Prior art authentication systems generally implement direct client-to-authenticator interactions where authentication components both issue challenges and evaluate responses within the same system boundary, creating potential vulnerabilities and limiting the granularity of security controls, whereas the authenticator 716 and prover 718 architecture establishes an innovative division of responsibilities where the authenticator 716 maintains cryptographic authority and policy enforcement while the prover 718 specializes in comprehensive client measurement operations including hardware attestation, device fingerprinting, challenge-response generation, etc . . . .

This architectural separation enables enhanced security assurance through specialized component functions that would not be obvious to practitioners familiar with conventional authentication systems, as it requires the non-intuitive insight that distributing authentication operations across dedicated measurement and validation components can provide superior hardware-anchored security while maintaining threshold decryption capabilities, thereby creating a synergistic improvement where the combined authenticator-prover interaction delivers comprehensive client validation capabilities that exceed the sum of their individual functions and cannot be achieved through simple modifications of existing centralized authentication approaches.

Figure 8:
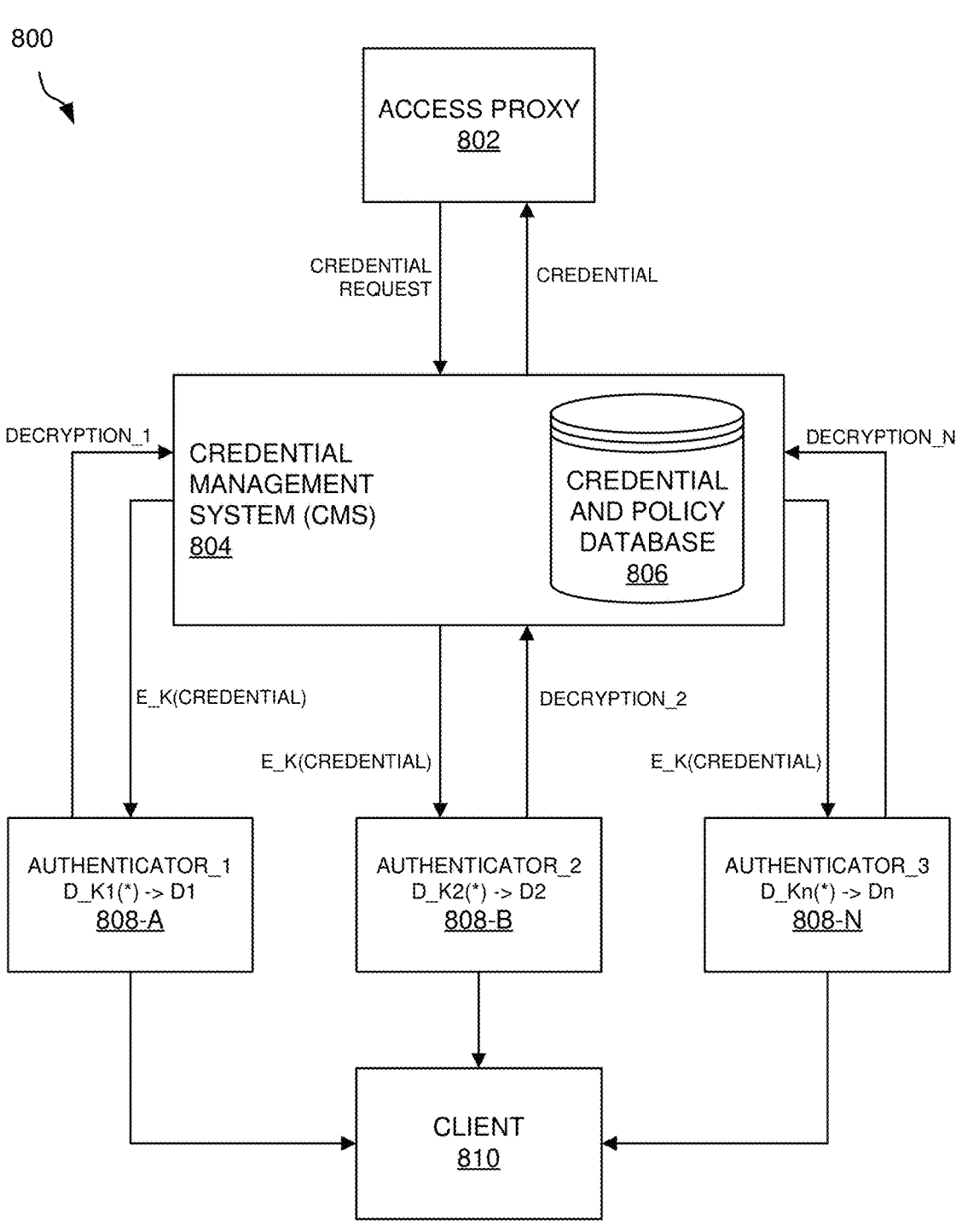
FIG. 8 illustrates a system for distributed credential authentication and management, according to aspects of the present disclosure.

FIG. 8 illustrates a system 800 for distributed credential authentication and management, in accordance with one embodiment. As an option, the system 800 may be implemented in the context of any one or more of the embodiments set forth in any previous and/or subsequent Figures and/or description thereof. Of course, however, the system 800 may be implemented in the context of any desired environment. Further, the aforementioned definitions may equally apply to the description below.

Unlike the single authenticator components shown in FIGS. 6 and 7, the system 800 demonstrates how multiple authenticators including a first authenticator 808-A, second authenticator 808-B, and nth authenticator 808-N operate in parallel to provide scalable distributed authentication capabilities while maintaining independent validation operations and threshold decryption contributions. In particular, the system 800 shows the close-up interaction between the access proxy 802, credential management system 804, and the distributed authenticator network, illustrating how the credential management system 804 coordinates authentication requests across multiple authenticators simultaneously while collecting partial decryption shares from successful authenticators to reconstruct complete access credentials, thereby demonstrating the scalable microservice architecture that enables organizations to deploy any number of authenticators based on policy requirements and operational needs while maintaining consistent security properties and weighted quorum mechanisms across the distributed authentication infrastructure.

The access proxy 802 serves as an intermediary component that extends the functionality described in previous figures by coordinating with distributed authenticator networks to perform comprehensive client validation through quorum-based authentication mechanisms, while the credential management system 804 orchestrates authentication processes across multiple independent authenticators using the threshold decryption and weighted quorum mechanisms previously detailed. The credential and policy database 806 stores weighted quorum policies that assign integer weights to individual authenticators based on their assurance levels, enabling fine-grained policy enforcement through cumulative weight calculations rather than simple authenticator counts, thereby allowing organizations to implement authentication policies that reflect the relative security assurance provided by different authentication factors and mechanisms.

In various embodiments, the determination of specific integer weights for authenticators may depend on organizational factors including compliance requirements, risk appetite, compute-network infrastructure capabilities, performance requirements, usability considerations, and resilience needs balanced against authenticator-specific characteristics such as reliability, latency, and throughput capabilities. Rather than implementing standardized weight ranges or universal guidelines for different authentication factor types, organizations may need to conduct individualized assessments that consider their unique operational environments, security requirements, and technical constraints to establish weight assignments that appropriately reflect the relative security assurance and operational characteristics of each authenticator within their specific deployment context, recognizing that there is no one-size-fits-all approach to authenticator weight determination across diverse organizational environments and use cases.

The system 800 further includes multiple independent authenticators arranged in a distributed architecture. The first authenticator 808-A, second authenticator 808-B, and nth authenticator 808-N each perform independent client validation operations and contribute partial decryptions to the threshold reconstruction process according to their assigned weights within the distributed authentication framework. Each authenticator may be assigned a specific integer weight that represents its assurance level and authentication capabilities within the weighted quorum policy framework implemented by the credential management system 804.

In one embodiment, the authenticators 808-A, 808-B, and 808-N implement different authentication mechanisms to provide diversity in authentication factors and reduce the risk of common-mode failures across the distributed authenticator network. The first authenticator 808-A may implement hardware-based validation and biometric verification, while the second authenticator 808-B may utilize different authentication mechanisms such as cryptographic proof-of-possession protocols. The nth authenticator 808-N represents the scalable nature of the distributed authenticator network, where any number of authenticators may be deployed based on organizational requirements and authentication policy specifications.

All authenticators operate as independent microservice components that may be deployed in pools of authenticator instances to handle high-volume authentication loads and provide scalability for distributed authentication operations. The microservice architecture enables each authenticator to be independently scaled, updated, and maintained while maintaining consistent authentication capabilities and weight assignments within the distributed authentication framework. This scalable deployment model enables organizations to deploy multiple authenticator instances based on authentication load requirements and performance characteristics while maintaining consistent authentication behavior and weight contributions to the cumulative weight calculation used by the credential management system 804 to determine threshold satisfaction and authentication approval.

In various embodiments, organizations may establish cumulative weight thresholds for different credential sensitivity levels through comprehensive analysis that considers both the security assurance factors of individual authenticators and broader risk assessment criteria, where hardware-anchored challenge-response authenticators typically receive higher or deciding weights compared to passive authenticators due to their enhanced security properties. However, the threshold methodology may also account for operational factors such as network latency and potential disruptions that could affect active authentication availability, leading organizations to distribute equivalent cumulative weights among multiple passive authenticators as backup mechanisms to ensure authentication continuity while maintaining appropriate security assurance levels for different credential sensitivity classifications and changing threat conditions.

Further, the system 800 includes a client 810 that may initiate API requests using credential handles rather than actual access credentials through standard client application workflows and authentication mechanisms. The client 810 may store only opaque credential handles that lack cryptographic value and cannot be independently used for API access without corresponding validation through the distributed authenticator network coordinated by the credential management system 804.

The distributed authenticator network implemented by the system 800 may operate through coordinated interactions between multiple independent authenticators that collectively evaluate client authentication requests according to weighted quorum policies stored in the credential and policy database 806. The credential management system 804 may distribute authentication requests to appropriate authenticators based on policy requirements and availability while collecting authentication approvals and partial decryptions from successful authenticators. The weighted quorum mechanism may enable the credential management system 804 to determine authentication approval based on cumulative authenticator weights rather than simple authenticator counts, providing fine-grained policy control that reflects the relative assurance levels of different authentication mechanisms.

The microservice architecture implemented by the authenticators may enable scalable deployment of authenticator pools that may handle high-volume authentication loads while providing redundancy and fault tolerance for authentication operations. Each authenticator may be deployed as an independent microservice that may be scaled horizontally based on authentication demand and performance requirements while maintaining consistent authentication behavior and weight contributions. The microservice deployment model may enable organizations to implement heterogeneous authenticator networks that combine different authentication technologies, vendors, and deployment environments while maintaining unified coordination through the credential management system 804.

The weighted quorum authentication mechanism may assign integer weights to individual authenticators based on their assurance levels, authentication capabilities, and organizational trust policies, enabling fine-grained authentication control that reflects the relative security value of different authentication factors. The credential management system 804 may evaluate cumulative authenticator weights against threshold policies to determine when sufficient authentication assurance has been achieved for credential reconstruction and release. The weighted approach may enable organizations to implement authentication policies that require specific combinations of authentication factors, such as requiring both hardware-based authentication and behavioral analysis, while providing flexibility in authenticator selection and deployment.

The threshold satisfaction mechanism may determine authentication approval when the cumulative assurance weight from successful authenticators meets or exceeds the threshold value T defined in the credential policy, enabling organizations to implement authentication policies that reflect their specific security requirements and risk tolerance. The weighted quorum approach may provide enhanced security compared to simple majority voting mechanisms by ensuring that high-assurance authenticators contribute more significantly to authentication decisions while still enabling authentication success when appropriate combinations of lower-assurance authenticators are available. The threshold mechanism may support dynamic policy adjustments that modify weight assignments and threshold values based on risk assessment, threat intelligence, and contextual factors without requiring changes to individual authenticator implementations.

The scalability characteristics of the distributed authenticator network may enable organizations to deploy authentication infrastructure that scales with their API access requirements while maintaining consistent security assurance and policy enforcement capabilities. The microservice architecture may support independent scaling of individual authenticator types based on their specific performance characteristics and authentication load patterns while maintaining overall system availability and authentication throughput. The distributed deployment model may enable geographic distribution of authenticators to reduce authentication latency and provide regional compliance capabilities while maintaining unified policy enforcement and credential management coordination.

The fault tolerance capabilities provided by the distributed authenticator network may ensure that authentication operations continue even when individual authenticators become unavailable, provided that the remaining available authenticators can satisfy the weighted quorum requirements defined in the credential policy. The system 800 may implement automatic failover mechanisms that redirect authentication requests to available authenticators while maintaining threshold satisfaction and authentication assurance levels. The redundancy provided by multiple authenticators may enable organizations to perform maintenance, updates, and security patches on individual authenticators without disrupting overall authentication availability and API access operations.

In various embodiments, the distributed threshold decryption process operates through coordinated partial decryption operations where each authenticator may hold distinct secret key shares that correspond to different segments of the encrypted access credential, enabling the first authenticator 808-A to perform partial decryptions of encrypted access credential using its assigned cryptographic shares, while the second authenticator 808-B simultaneously performs partial decryption of encrypted access credential using its independent secret key shares, and the nth authenticator 808-N contributes partial decryption of the access credential as required by the threshold policy. The credential management system 804 orchestrates this distributed decryption process by distributing encrypted credential to appropriate authenticators based on their weighted assignments and collecting the resulting partial decryptions, ensuring that no single authenticator possesses sufficient cryptographic material to independently reconstruct the complete access credential while enabling the mathematical combination of partial decryption results to reconstruct the plaintext credential only when the required threshold of authenticators successfully validates the client and contributes their respective key segments. This segmented approach provides enhanced security through cryptographic isolation where each authenticator's compromise would only expose a mathematically insufficient portion of the credential material, while the weighted contribution system enables policy-driven reconstruction that reflects the relative trust levels and assurance capabilities of different authenticators within the distributed authentication framework.

The system 800 demonstrates a resolution to scalability and single-point-of-failure vulnerabilities present in conventional authentication systems by implementing distributed authenticator networks that provide horizontal scalability and fault tolerance through weighted quorum mechanisms. Traditional authentication systems typically rely on centralized authentication components that create bottlenecks and single points of failure where component unavailability may disrupt authentication operations across the entire system. The system 800 addresses these vulnerabilities by distributing authentication authority across multiple independent authenticators that may be scaled independently based on load requirements while maintaining authentication availability through fault-tolerant quorum mechanisms.

In various embodiments, the system may implement high-availability and fault-tolerance mechanisms including geographic distribution of system components, automatic failover capabilities, load balancing across multiple authenticators and credential management systems, and resilient operation that maintains authentication availability even when individual components become unavailable or compromised. The fault-tolerance may enable the system to continue operating with up to n minus t authenticator failures while maintaining security properties and threshold requirements, thereby providing operational resilience against component outages, network partitions, and targeted attacks on individual system elements.

As such, in various embodiments, the system may remain functional despite failure or unavailability of up to n minus t authenticators, where n represents the total number of authenticators and t represents the threshold number required for successful validation. The fault-tolerant operation may provide operational resilience against component outages while maintaining security properties, and operational control of the credential management system, proxy, and authenticators may be distributed among distinct administrative domains to prevent single points of control and reduce insider threat risks.

The weighted quorum architecture implemented by the system 800 may provide enhanced security compared to conventional authentication systems that treat all authentication factors equally without considering their relative assurance levels and security characteristics. The system 800 may enable organizations to implement authentication policies that reflect the actual security value provided by different authentication mechanisms while maintaining flexibility in authenticator deployment and selection. The micro-service architecture may provide operational advantages including independent scaling, updating, and maintenance of individual authenticator components while maintaining consistent authentication behavior and policy enforcement across the distributed network.

In various embodiments, the system 800 may be extended to support advanced load balancing mechanisms that auto-matically distribute authentication requests across available authenticator pools based on current load, performance characteristics, and geographic proximity to reduce authen-tication latency and improve system throughput. The weighted quorum mechanism may incorporate dynamic weight adjustments that modify authenticator weights based on real-time performance metrics, security assessments, and threat intelligence feeds to maintain optimal authentication assurance while adapting to changing security conditions. The microservice architecture may support containerized deployment models that enable rapid scaling and deploy-ment of authenticator instances across cloud and edge com-puting environments while maintaining consistent authenti-cation capabilities.

Figure 9:
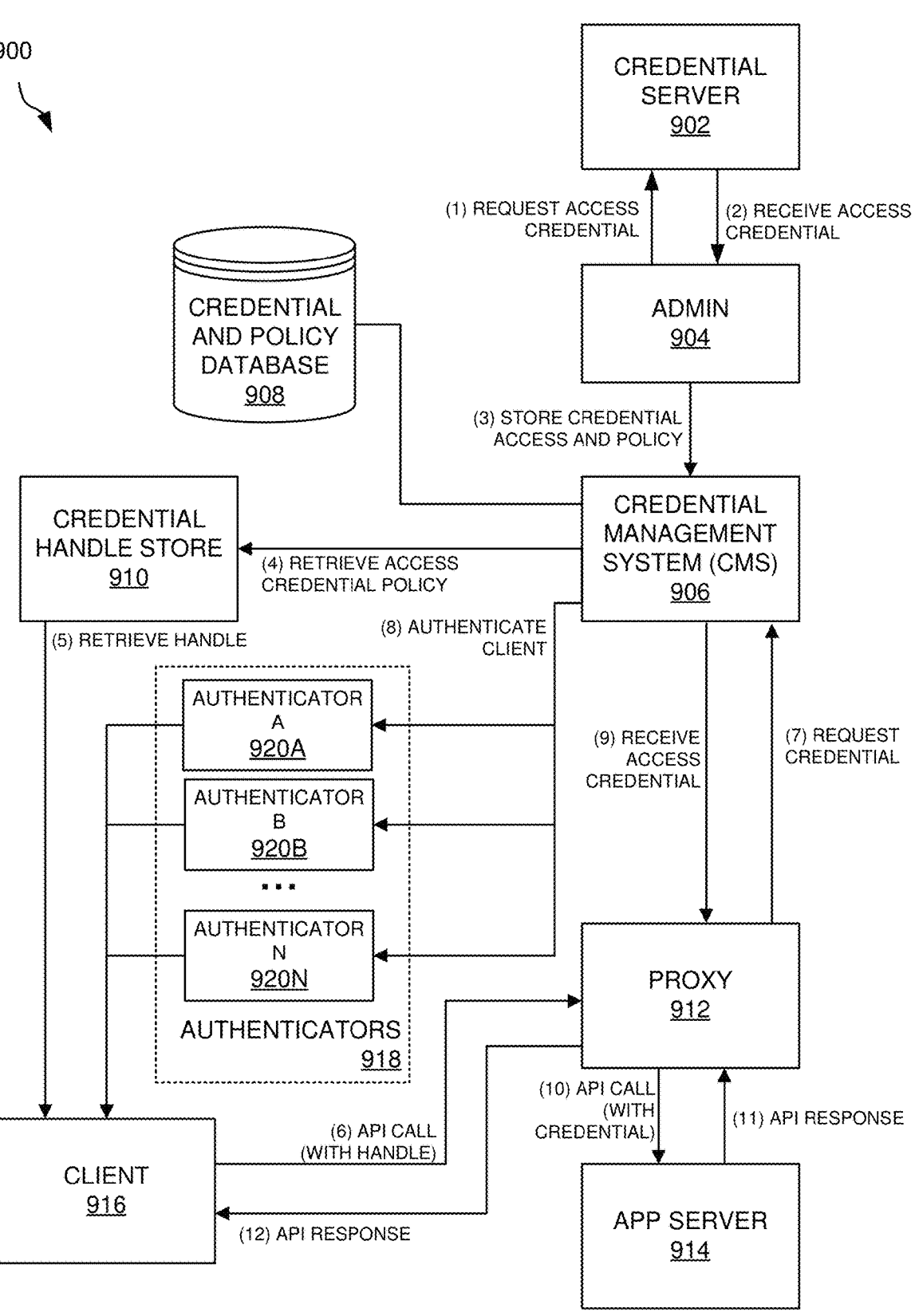
FIG. 9 illustrates a system for API access control using credential handles and distributed authentication, according to an embodiment of the present disclosure.

FIG. 9 illustrates a system 900 for API access control using credential handles and distributed authentication, in accordance with one embodiment. As an option, the system 900 may be implemented in the context of any one or more of the embodiments set forth in any previous and/or subse-quent Figures and/or description thereof. Of course, how-ever, the system 900 may be implemented in the context of any desired environment. Further, the aforementioned defi-nitions may equally apply to the description below.

In operation, the system 900 implements a comprehensive credential management workflow that begins with the cre-dential server 902 receiving a request for access credential (in step (1)) and providing (in step (2)) an access credential to the admin 904, followed by the admin 904 storing the access credential and policy within the credential manage-ment system 906 and credential and policy database 908 in step (3). The client 916 retrieves the access credential handle from the credential handle store 910 in step (4) and subse-quently initiates an API call using the credential handle in step (5), which triggers the proxy 912 to validate access by coordinating with the credential management system 906 in step (6). The credential management system 906 then dis-tributes authentication requests to the distributed authenti-cators 918, including authenticator A 920A, authenticator B 920B, and authenticator N 920N in steps (7), (8), and (9) respectively, with each authenticator performing indepen-dent client validation and contributing partial decryptions according to their assigned weights within the weighted quorum framework. Upon successful threshold authentica-tion, the credential management system 906 provides the reconstructed access credential to the proxy 912, enabling the proxy to forward the API call with the injected credential to the app server 914 in step (10), which processes the authenticated request and returns a response that is for-warded back to the client 916, thereby demonstrating the extensible authenticator architecture that supports both built-in and add-on authenticators while maintaining distrib-uted custodial decryption and weighted quorum mecha-nisms.

For example, in various embodiments, the system may support extensible authenticator architectures that include both built-in authenticators integrated within the credential management system and add-on authenticators developed by users, administrators, or third-party vendors to extend client authentication capabilities. The add-on authenticators may operate alongside built-in authenticators while main-taining approval controls through allow-list mechanisms, certificate chain registration to trusted intermediate certifi-cate authorities, and revocation capabilities that enable the credential management system to remove compromised or non-compliant authenticators from active service.

Additionally, within the context of FIG. 9, many of the core system components correspond directly to those pre-sented in FIG. 7, with credential server 902 functioning the same as credential server 702, admin 904 operating the same as admin 704A, credential management system 906 func-tioning the same as credential management system 706, credential and policy database 908 operating the same as credential and policy database 708, credential handle store 910 functioning the same as credential handle store 710, proxy 912 operating similarly to access proxy 712, app server 914 functioning the same as app server 714, and client 916 operating similarly to client 704B.

In addition, the system 900 includes authenticators 918 that may comprise multiple independent authentication modules that collectively perform distributed validation and threshold decryption operations according to credential poli-cies and weighted quorum requirements. For example, the authenticators 918 may operate as a distributed network of authentication components that evaluate client requests using various validation methods while maintaining secret key shares that enable participation in threshold decryption processes. Additionally, the system may include built-in authentication mechanisms that are part of the core creden-tial management infrastructure and add-on authenticators that extend client-authentication capabilities through third-party and user-developed components.

In various embodiments, the system 900 may implement an authenticator development and deployment ecosystem similar to mobile application stores, where developers can create custom authenticators using a Zero Trust Access Fabric Software Development Kit (ZAF SDK) and test their implementations on development and testing systems before deployment through two primary pathways. Organizations may deploy custom authenticators by having ZAF admin-istrators add developer certificates to their ZAF instances for direct plug-in authenticator installation. Alternatively, devel-opers may submit their authenticators to a centralized review authority such as "Zero Trust Union" for comprehensive security evaluation, cryptographic signing, and distribution through an "authenticator store" that enables users to down-load verified authenticator components (similar to Android and iOS application store models), thereby providing both enterprise-controlled and community-verified pathways for extending authentication capabilities within the distributed framework.

The authenticators 918 may coordinate with the credential management system 906 to receive authentication requests and contribute partial decryptions to the threshold recon-struction process while maintaining independence from each other to prevent single points of failure and ensure distrib-uted trust mechanisms. In some embodiments, the authen-ticators 918 may implement various authentication factors including hardware-based validation, biometric verification, behavioral analysis, cryptographic proof-of-possession pro-tocols, etc. that provide different levels of security assurance and contribute to the overall authentication decision through weighted contributions. Further, the authenticators 918 may support extensible architecture where organizations may deploy additional authenticator types based on their specific security requirements and authentication policy needs.

The system 900 includes multiple authenticators represented by authenticator A 920A, authenticator B 920B, and authenticator N 920N that collectively perform client validation operations and contribute partial decryptions to the threshold reconstruction process according to their respective assigned weights within the distributed authentication framework. Each authenticator may evaluate client requests using specialized authentication mechanisms while maintaining secret key shares that enable participation in distributed threshold decryption operations coordinated by the credential management system 906, with each authenticator being implemented as either a built-in authenticator that is part of the core system infrastructure or as an add-on authenticator that extends authentication capabilities through third-party or user-developed components. The authenticators may implement diverse authentication mechanisms including hardware-based validation, network fingerprinting, geographic location verification, temporal access pattern analysis, biometric verification, device attestation, behavioral pattern recognition, cryptographic challenge-response protocols, etc. that provide varying levels of security assurance and contribute to the overall authentication decision through their assigned weights within the weighted quorum framework.

In various embodiments, the system may incorporate advanced network fingerprinting capabilities that identify and authenticate endpoints based on observable network characteristics including MAC addresses, DHCP patterns, TCP option ordering, TLS JA3/JA4 fingerprints, DNS query timing, and traffic flow analysis. The network fingerprinting may operate in both passive modes that collect traits without sending probes and active modes that involve targeted probing to elicit responses for verification, enabling comprehensive device identification and behavioral baseline establishment for continuous Zero Trust verification and anomaly detection.

In various embodiments, each authenticator (authenticator A 920A, authenticator B 920B, and authenticator N 920N) operates independently while contributing to the collective authentication decision through weighted participation in the threshold decryption process, holding secret key shares that correspond to their assigned weights and enabling them to contribute the appropriate number of partial decryptions required for their weighted contribution to the credential reconstruction process. Such an architecture demonstrates the scalable and extensible nature of the distributed authenticator network where any number of authenticators may be deployed based on organizational requirements and authentication policy specifications while supporting both built-in and add-on authenticator architectures that enable specialized authentication mechanisms without requiring modifications to the core credential management infrastructure.

The distributed custodial decryption mechanism implemented by the authenticators 918 may ensure that each authenticator holds a number of secret key shares that corresponds to its assigned weight within the weighted quorum framework, enabling secure distribution of cryptographic authority across multiple independent components. The credential management system 906 may generate threshold secret key shares and distribute them to individual authenticators during the credential provisioning process. The threshold key share distribution process may utilize secure communication channels and cryptographic wrapping mechanisms that protect key material during transmission and storage within individual authenticator components.

In operation, the threshold decryption process may involve each participating authenticator using its secret key shares to perform partial decryption operations on encrypted credential material received from the credential management system 906, producing partial decryption results that contribute to the overall credential reconstruction process. The authenticators may return a number of threshold decryption shares corresponding to its quorum weight to the credential management system 906, which may combine the collected shares to reconstruct the complete plaintext access credential within a protected execution boundary including trusted execution environments and hardware security modules. The distributed custodial decryption approach may ensure that plaintext credential material is never exposed to individual authenticators and exists only within the secure processing boundaries of the credential management system 906 during the brief period required for credential reconstruction and injection.

The weighted contribution mechanism may enable authenticators with higher assigned weights to contribute multiple partial decryptions to the threshold reconstruction process, reflecting their enhanced assurance levels and authentication capabilities within the distributed authentication framework. The credential management system 906 may coordinate the collection of partial decryptions from successful authenticators and evaluate whether the cumulative contributions satisfy the threshold requirements specified in the credential policy. The threshold satisfaction determination may consider both the number of successful authenticators and their respective weight contributions, enabling fine-grained policy enforcement that reflects the relative security assurance provided by different authentication mechanisms and factors.

The add-on authenticator extensibility framework may enable organizations to develop and deploy specialized authentication components that integrate seamlessly with the existing distributed authentication infrastructure while maintaining security isolation and policy enforcement capabilities. The add-on authenticators may be developed by users or third-party providers to address specific authentication requirements including industry-specific compliance obligations, specialized hardware integration, and custom security protocols that extend beyond the capabilities of built-in authenticators. The extensibility framework may provide standardized interfaces and integration mechanisms that enable add-on authenticators to participate in the distributed authentication and threshold decryption processes while maintaining compatibility with existing credential management and policy enforcement infrastructure.

The add-on authenticator approval and trust anchor mechanisms may ensure that only approved and verified authenticator components may participate in the distributed authentication network through certificate-based validation and policy-driven access control. For example, the credential management system 906 may maintain an allow-list of approved add-on authenticators that have been validated for security compliance and operational compatibility with the distributed authentication framework. Additionally, the approval process may involve certificate chain validation, security assessment, and operational testing that verifies the authenticator's ability to perform authentication operations and contribute to threshold decryption processes while maintaining security isolation and preventing unauthorized access to sensitive credential material.

The cryptographic key sharing mechanism may distribute threshold key shares to add-on authenticators through secure provisioning processes that ensure key material protection during transmission and storage within third-party authenticator components. The key share provisioning may utilize cryptographic wrapping and secure communication protocols that protect key material from unauthorized access while enabling add-on authenticators to participate in threshold decryption operations. The key share management may include rotation and renewal mechanisms that enable periodic updates of cryptographic material without disrupting authentication operations and threshold decryption capabilities across the distributed authenticator network.

Taking a step back, the system 900 demonstrates a resolution to authentication extensibility and vendor lock-in vulnerabilities present in conventional credential management systems by implementing an open and extensible authenticator framework that enables organizations to deploy diverse authentication mechanisms while maintaining centralized policy enforcement and credential custody. Traditional authentication systems typically rely on proprietary and closed authentication mechanisms that limit organizational flexibility and create vendor dependencies that may constrain security architecture decisions and operational capabilities. The system 900 addresses these limitations by providing an extensible framework that supports both built-in and add-on authenticators while maintaining security through distributed custodial decryption and weighted quorum mechanisms.

The distributed custodial decryption architecture implemented by the system 900 may provide enhanced security compared to conventional systems that rely on centralized credential storage and single-point authentication mechanisms that create vulnerabilities to component compromise and unauthorized access. Additionally, the system 900 may distribute cryptographic authority across multiple independent authenticators while maintaining centralized coordination through the credential management system 906, reducing the impact of individual component compromise and enabling fine-grained policy enforcement through weighted threshold mechanisms. The separation of authentication validation from credential reconstruction may ensure that successful authentication by individual authenticators cannot result in unauthorized credential access without corresponding approval from the required threshold of additional authenticators and coordination through the secure processing boundaries of the credential management system 906.

FIG. 10 illustrates a method 1000 for securing API access through credential handle proxying with distributed authentication, in accordance with one embodiment. As an option, the method 1000 may be implemented in the context of any one or more of the embodiments set forth in any previous and/or subsequent Figures and/or description thereof. Of course, however, the method 1000 may be implemented in the context of any desired environment. Further, the aforementioned definitions may equally apply to the description below.

In step 1002, an access credential may be stored in a credential management system through secure custody mechanisms and cryptographic protection protocols. The credential storage process may involve transferring access credentials from external identity providers or credential servers into the secure custody of the credential management system rather than providing direct client access to credential material. The credential management system may maintain the access credential in encrypted form using cryptographic protection mechanisms comparable to those applied in hardware security modules and key management systems while associating the credential with policy definitions that specify authentication requirements and validation methods.

In step 1004, a credential handle may be issued to a client through secure handle generation and distribution mechanisms that provide opaque reference identifiers without exposing actual credential values. The credential handle issuance process may involve generating opaque reference identifiers that lack cryptographic value and cannot be independently used for API access without corresponding validation through the credential management infrastructure. The handle generation may implement cryptographic binding mechanisms that associate handles with specific client identities, device characteristics, and temporal constraints while maintaining the opaque nature of the handle material. Additionally, secure channels and authenticated delivery mechanisms may be used that verify client identity before handle provisioning while maintaining audit trails of handle issuance events and policy compliance verification. The handle issuance may implement time-limited cryptographic signatures that expire independently of the underlying access credential, providing enhanced security through temporal constraints and automatic handle expiration.

In step 1006, an API request with the credential handle may be received from the client through standard API request processing mechanisms and authentication protocols. The API request reception process may involve intercepting incoming requests and extracting the credential handle along with associated request metadata including client identity information, network context, and authentication parameters for subsequent validation and policy evaluation.

In step 1008, the credential handle may be validated at a proxy component through comprehensive authentication coordination and policy compliance verification mechanisms. The validation operation coordinates with multiple system components to perform comprehensive client validation through distributed authenticator networks that evaluate different aspects of client identity and context according to policy requirements, while implementing handle validation mechanisms that confirm the integrity and legitimacy of the credential handle and determine the appropriate authentication pathway based on credential sensitivity and organizational security requirements.

In various embodiments, the system may implement comprehensive compliance and regulatory framework support that provides systematic mappings to major standards including NIST SP 800-207 Zero Trust Architecture, NIST SP 800-53 security controls, FIPS 140-3 cryptographic module requirements, FedRAMP authorization frameworks, ISO/IEC 27001 information security management, SOC 2 trust services criteria, PCI DSS payment card security standards, HIPAA healthcare privacy regulations, GDPR data protection requirements, and CMMC cybersecurity maturity model certifications. The compliance support may include automated evidence generation, ready-made audit packages, and comprehensive documentation that enables organizations to demonstrate regulatory adherence and security control effectiveness.

In step 1010, the access credential may be retrieved from the credential management system through threshold decryption mechanisms and distributed authentication coordination processes, as has been discussed hereinabove. The credential retrieval operation involves collecting authentication approvals and partial decryptions from multiple participating authenticators according to weighted quorum policies, implementing just-in-time decryption mechanisms that reconstruct credentials on-demand within secure processing boundaries including trusted execution environments and hardware security modules while maintaining comprehensive audit logging of authentication decisions and threshold satisfaction events.

In various embodiments, the credential management system may maintain comprehensive audit logs of credential reference usage and validation events, and failed client validations may cause automatic revocation of the credential reference to prevent continued unauthorized access attempts. The audit logging may implement tamper-evident record keeping with cryptographic signatures and hash-chained entries that provide forensic capabilities for security investigation and compliance verification purposes.

In step 1012, the retrieved credential may be injected into the API request (such as through just-in-time credential insertion mechanisms and secure memory management protocols). The credential injection process replaces the credential handle with the actual access credential in appropriate request headers, parameters, and body sections according to authentication protocol requirements.

In step 1014, the authenticated API request may be transmitted to a resource server through secure communication channels and standard API forwarding mechanisms. Additionally, the transmission operation in step 1014 may include response handling mechanisms where the proxy receives the server response and forwards the response back to the client while maintaining comprehensive audit trails of the complete request-response cycle. As such, the resource server may remain unaware of the credential handle architecture and proxy-based authentication mechanisms, enabling seamless integration with existing API infrastructure without requiring server-side modifications to accommodate the enhanced authentication framework.

As has been emphasized elsewhere, the sequential process implemented by the method 1000 may ensure that clients never handle actual access credentials throughout the entire authentication and API access workflow while maintaining full API functionality through coordinated interactions between credential management infrastructure and proxy components. The credential storage and handle issuance processes may establish secure custody separation where actual credentials remain within protected infrastructure boundaries while clients receive only opaque handles that provide no authentication value if compromised. The validation and retrieval processes may implement distributed authentication mechanisms that require successful validation from multiple independent authenticators before credential reconstruction and release, ensuring that no single component possesses sufficient authority to independently access credential material.

In various embodiments, the injection and transmission processes may complete the credential custody separation by ensuring that actual credentials are inserted into API requests only at the moment of use and only within secure processing boundaries of proxy components that immediately clear credential material after successful transmission.

Additionally, it is to be appreciated that the method 1000 may provide comprehensive security assurance through threshold decryption mechanisms that distribute cryptographic authority across multiple authenticators (as discussed in the context of FIG. 8 and FIG. 9), while maintaining centralized coordination through credential management systems that orchestrate authentication workflows without possessing complete cryptographic control over credential reconstruction. The sequential workflow may enable organizations to implement zero-trust principles for API access while maintaining compatibility with existing client applications and server infrastructure through transparent credential handle substitution and just-in-time credential injection mechanisms.

FIG. 11 illustrates a method 1100 for securing API access through weighted quorum authentication and distributed credential decryption, in accordance with one embodiment. As an option, the method 1100 may be implemented in the context of any one or more of the embodiments set forth in any previous and/or subsequent Figures and/or description thereof. Of course, however, the method 1100 may be implemented in the context of any desired environment. Further, the aforementioned definitions may equally apply to the description below.

As shown, and to provide some context, the method 1100 builds upon the distributed authenticator architecture presented in FIG. 8, providing detailed operational procedures for coordinating multiple independent authenticators within the weighted quorum framework. While FIG. 8 demonstrates the structural arrangement of multiple authenticators including the first authenticator 808-A, second authenticator 808-B, and nth authenticator 808-N in communication with the credential management system 804, the method 1100 elaborates on the specific procedural steps for provisioning these authenticators with weighted key shares, coordinating authentication across the distributed network, and implementing threshold-based decision making that evaluates cumulative authenticator weights against policy-defined thresholds.

As such, the method 1100 extends the framework of FIG. 8 by detailing how the weighted quorum mechanism operates in practice, including the collection and combination of partial decryptions from successful authenticators, the evaluation of threshold satisfaction based on cumulative assurance weights, and the adaptive authentication capabilities that dynamically adjust requirements based on real-time risk assessment.

In step 1102, authenticators may be provisioned with weighted key shares through secure cryptographic distribution mechanisms and threshold key management protocols. The weighted key share provisioning process may involve generating threshold secret key shares within secure processing boundaries and distributing these shares to individual authenticators based on their assigned weight values within the weighted quorum framework. In one embodiment, the credential management system may generate secret key shares using threshold secret sharing algorithms that ensure no single authenticator possesses sufficient key material to independently reconstruct complete access credentials while enabling weighted participation in the threshold decryption process.

The key share distribution process in step 1102 may implement secure communication channels and cryptographic wrapping mechanisms that protect key material during transmission and storage within individual authenticator components while maintaining the weighted relationship between authenticator trust levels and their cryptographic authority. The weighted provisioning may assign multiple key shares to authenticators with higher weight values, enabling them to contribute proportionally more partial decryptions to the threshold reconstruction process based on their enhanced assurance levels and authentication capabilities. The key share provisioning may include rotation and renewal mechanisms that enable periodic updates of cryptographic material without disrupting authentication operations while maintaining the weighted distribution of cryptographic authority across the distributed authenticator network.

In step 1104, an API request with a credential handle may be received through standard request processing mechanisms and authentication protocol interfaces. The API request reception process may involve intercepting incoming client requests and extracting the credential handle along with associated request metadata including client identity information, network context, and authentication parameters for subsequent validation and policy evaluation. The request processing may validate the format and structure of the credential handle to ensure compliance with established handle specifications and temporal constraints before proceeding with weighted quorum authentication operations.

The request reception operation in step 1104 may collect comprehensive context information during request processing including client behavioral patterns, device characteristics, network attributes, and environmental factors that contribute to risk assessment and adaptive threshold determination mechanisms.

In step 1106, authentication may be coordinated across multiple authenticators and partial decryption is performed through distributed validation mechanisms and weighted quorum orchestration protocols. The authentication coordination process may involve distributing authentication requests to appropriate authenticators based on policy requirements and availability while collecting authentication approvals and partial decryptions from successful authenticators according to their assigned weights within the quorum framework. The coordination mechanism may implement parallel authentication processing that enables multiple authenticators to evaluate client requests simultaneously while maintaining independence and preventing single points of failure. Additionally, adaptive threshold mechanisms may be implemented that dynamically adjust authentication requirements based on real-time risk assessment results including velocity analysis, device drift detection, and anomaly identification that may indicate potential security threats and unauthorized access attempts. The coordination process may evaluate live signals including access frequency patterns, geographic location changes, device fingerprint variations, and behavioral deviations to determine whether threshold values should be increased, additional authentication factors should be required, and access should be denied based on elevated risk indicators. In one embodiment, the distributed authentication coordination may maintain comprehensive audit trails of authentication decisions, risk assessment results, and threshold adjustments that provide tamper-evident logging for compliance monitoring and forensic analysis purposes.

Upon successful client authentication, each authenticator contributes a number of partial decryptions equal to its weight, applying that many secret key shares to the encrypted access credential in accordance with the quorum policy.

In various embodiments, the credential management system may dynamically adjust authentication requirements based on real-time risk indicators including at least one of device drift detection, network anomaly identification, and behavioral deviation analysis. The dynamic adjustment capabilities may enable adaptive security policies that automatically respond to changing threat conditions while maintaining appropriate authentication assurance levels.

At decision 1108 it is determined whether the weighted quorum meets the threshold through cumulative weight evaluation and policy compliance verification mechanisms. The threshold evaluation process calculates cumulative weight contributions from successful authenticators and compares the total against the threshold value specified in the credential policy, implementing adaptive threshold logic that modifies required threshold values based on continuous risk adaptation signals including velocity anomalies, device drift indicators, and behavioral pattern deviations while incorporating cryptographic auditability mechanisms that record threshold satisfaction decisions with signed and attributable evidence in append-only, hash-chained logs.

If the weighted quorum does not meet the threshold at decision 1108, the method 1100 moves to a step 1116 where access is denied and the failed authentication is logged through comprehensive audit mechanisms and security event recording protocols. The access denial process implements immediate request termination while generating detailed security event logs that document the authentication failure, contributing authenticators, weight calculations, and threshold evaluation results, implementing cryptographic auditability mechanisms that record denial events with signed and attributable evidence in tamper-evident log structures while integrating with security information and event management systems to provide real-time alerting and automated response capabilities.

In various embodiments, when authenticator failures prevent meeting threshold requirements, the system may implement structured fallback procedures that begin with investigating whether the failure represents a false-negative authentication result through detailed analysis of authenticator responses, client context, and system logs to determine if legitimate access was incorrectly denied. If unauthorized access is confirmed during the investigation, the system may initiate credential rotation procedures to invalidate potentially compromised credentials and generate new authentication material, while if the failure is determined to be a false-negative result, the system may implement policy tuning mechanisms that adjust authenticator weights, threshold values, or validation parameters to prevent similar legitimate access denials while maintaining appropriate security assurance levels for ongoing operations.

If the weighted quorum meets the threshold at decision 1108, the method 1100 proceeds to a step 1110 where partial decryptions are collected from successful authenticators through secure cryptographic coordination and threshold reconstruction preparation mechanisms. The partial decryption collection process involves gathering cryptographic shares from authenticators that successfully validated the client according to their respective authentication mechanisms while maintaining the weighted contribution structure, implementing secure communication protocols that protect partial decryption shares during transmission and cryptographic auditability mechanisms that record the collection of partial decryptions with signed and attributable evidence including authenticator identities, cryptographic share identifiers, and timestamp information in tamper-evident log structures.

In step 1112, the partial decryptions may be combined to reconstruct the credential through threshold cryptographic algorithms and secure computation mechanisms. The credential reconstruction process may utilize cryptographic threshold reconstruction algorithms that combine partial decryptions from successful authenticators to generate the complete plaintext access credential within secure processing boundaries including trusted execution environments and hardware security modules. The reconstruction operation may implement just-in-time credential generation that produces plaintext credentials on-demand rather than maintaining persistent plaintext copies that could be subject to unauthorized access and compromise.

In various embodiments, the credential reconstruction operation in step 1112 may implement cryptographic auditability mechanisms that record the reconstruction process with signed and attributable evidence including participating authenticator identities, cryptographic share contributions, and reconstruction timestamps in append-only, hash-chained log structures that provide tamper-evident documentation of credential access events. The reconstruction process may occur within secure memory boundaries that ensure plaintext credential material remains protected during the combination operation while maintaining comprehensive audit trails of cryptographic operations and threshold satisfaction verification. The credential reconstruction may implement secure memory management practices that immediately clear intermediate cryptographic values and partial decryption shares after successful reconstruction to minimize the exposure window for sensitive cryptographic material while maintaining detailed logging of all reconstruction events and cryptographic operations for compliance monitoring and forensic analysis purposes.

In step 1114, the credential may be injected and the authenticated request may be forwarded (such as through just-in-time credential insertion mechanisms and secure API request processing protocols). The credential injection process may replace the credential handle with the reconstructed access credential in appropriate request headers, parameters, and body sections according to authentication protocol requirements while maintaining the original request structure and content for compatibility with existing server-side authentication mechanisms. The injection operation may implement secure memory management practices that ensure the access credential is immediately cleared from memory after successful injection to minimize the exposure window for potential credential compromise.

In various embodiments, each authenticator may be assigned an integer weight representing its assurance level, and the credential management system may determine satisfaction of threshold policy requirements when a cumulative assurance weight greater than or equal to a predetermined threshold value is achieved. The weighted quorum approach may enable fine-grained policy enforcement that reflects the relative security value provided by different authentication mechanisms while maintaining operational flexibility in authenticator selection and deployment.

In various embodiments, the threshold decryption process may require combining partial decryptions from at least t authenticators out of n available authenticators, where t and n are configurable parameters based on the credential policy requirements. The threshold mechanism may ensure that no single authenticator possesses sufficient cryptographic authority to independently reconstruct complete access credentials while enabling policy-driven authentication assurance through distributed consensus mechanisms.

As such, the weighted quorum authentication workflow implemented by the method 1100 may provide enhanced security through adaptive threshold mechanisms that continuously evaluate risk signals and dynamically adjust authentication requirements based on real-time threat assessment and behavioral analysis results. The continuous risk adaptation capabilities may monitor live signals including access velocity patterns, device drift indicators, and anomaly detection results to automatically raise threshold values, require additional authentication factors, and deny access when elevated security risks are detected. The adaptive threshold adjustment may enable the authentication system to respond dynamically to changing threat conditions while maintaining appropriate security assurance levels based on current risk assessment and contextual factors.

The cryptographic auditability mechanisms implemented throughout the method 1100 may ensure that all authentication decisions, threshold evaluations, and credential reconstruction operations are recorded with signed and attributable evidence in append-only, hash-chained log structures that provide tamper-evident forensic capabilities for compliance monitoring and security investigation purposes. The audit logging may capture comprehensive information about authenticator participation, weight contributions, threshold satisfaction events, and credential usage patterns while maintaining cryptographic integrity and preventing unauthorized modification of audit records. Further, the tamper-evident logging capabilities may enable organizations to demonstrate compliance with security policies and regulatory requirements while providing reliable evidence for forensic analysis and incident response activities that require detailed reconstruction of authentication events and security decisions.

Figure 12:
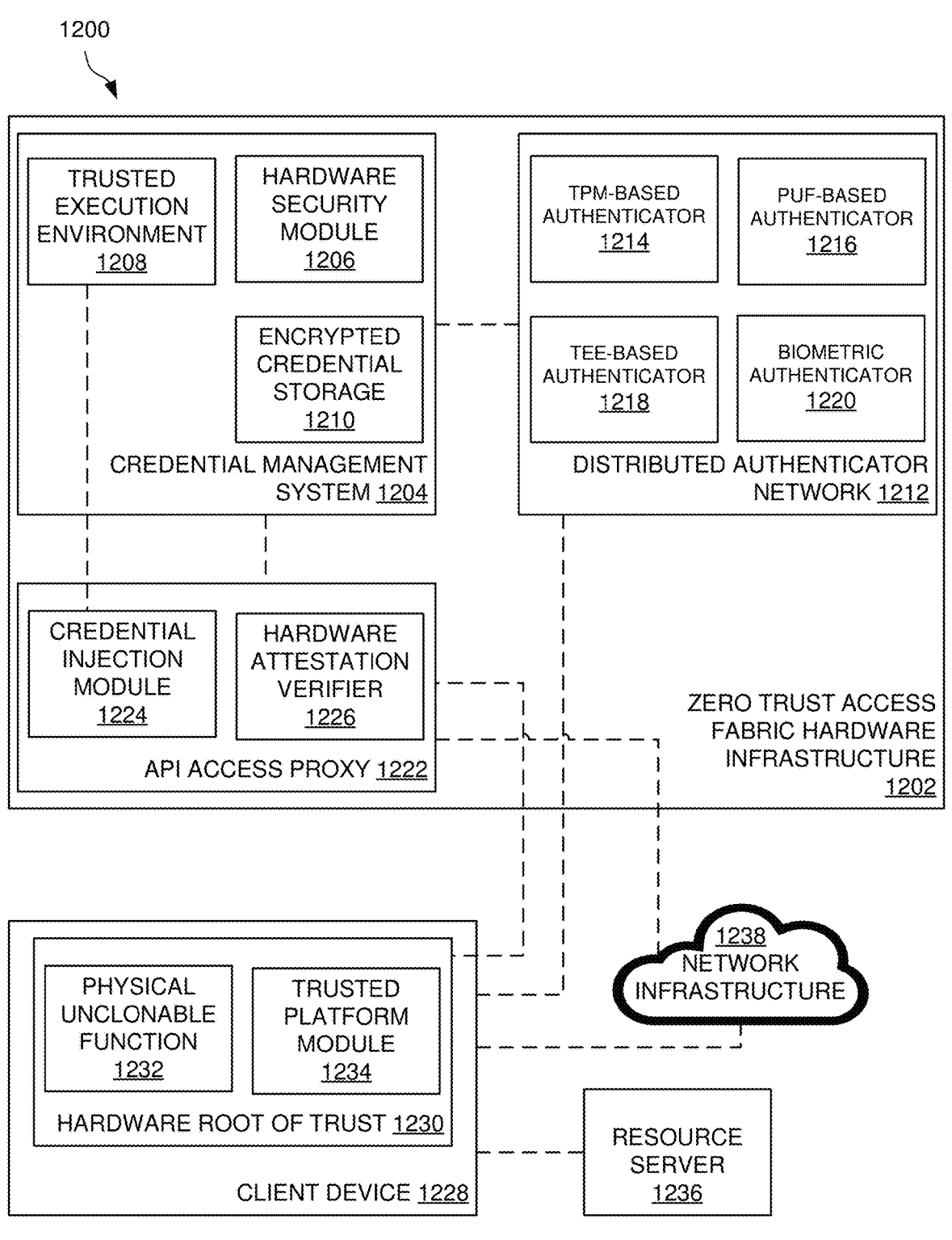
FIG. 12 illustrates a zero trust access architecture implementing hardware-anchored credential custody and distributed authentication mechanisms, according to aspects of the present disclosure.

FIG. 12 illustrates a zero trust access architecture 1200 implementing hardware-anchored credential custody and distributed authentication mechanisms, in accordance with one embodiment. As an option, the zero trust access architecture 1200 may be implemented in the context of any one or more of the embodiments set forth in any previous and/or subsequent Figures and/or description thereof. Of course, however, the zero trust access architecture 1200 may be implemented in the context of any desired environment. Further, the aforementioned definitions may equally apply to the description below.

The zero trust access architecture 1200 includes a zero trust access fabric hardware infrastructure 1202 that may provide the foundational security components for credential management and authentication operations through hardware-anchored trust mechanisms. Comprehensive hardware-based security controls may be implemented that establish immutable roots of trust and provide cryptographic isolation for sensitive credential operations. Additionally, multiple hardware security components may be coordinated to create a unified trust fabric that extends from silicon-level security primitives through application-level authentication mechanisms.

The zero trust access fabric hardware infrastructure 1202 may integrate various hardware security technologies including secure enclaves, cryptographic processors, and tamper-resistant storage systems to provide comprehensive protection for credential management operations and authentication workflows. The hardware infrastructure may implement attestation mechanisms that provide cryptographic proof of system integrity and configuration compliance throughout the credential lifecycle. The zero trust access fabric hardware infrastructure 1202 may support distributed deployment across multiple hardware platforms while maintaining consistent security properties and trust relationships through standardized hardware security interfaces and protocols.

The zero trust access architecture 1200 further includes a credential management system 1204 that may coordinate credential storage, policy enforcement, and authentication orchestration within the hardware-anchored security framework. Additionally, the credential management system 1204 may operate within secure hardware boundaries to ensure that credential operations remain protected from unauthorized access and tampering throughout the authentication workflow. Threshold cryptography mechanisms may be implemented that distribute credential access authority across multiple hardware-protected authenticators while maintaining centralized policy coordination and audit capabilities.

The credential management system 1204 may coordinate with hardware security components to implement just-in-time credential reconstruction that occurs only within trusted execution boundaries after successful authentication and policy compliance verification. Comprehensive audit trails of hardware-attested authentication events and credential operations may be maintained that provide tamper-evident documentation of security decisions and policy enforcement actions. Additionally, the credential management system 1204 may support integration with external hardware security modules and trusted computing platforms while maintaining compatibility with existing credential management workflows and authentication protocols.

The zero trust access architecture 1200 includes a hardware security module 1206 that may provide cryptographic processing capabilities and secure key storage within tamper-resistant hardware boundaries. The hardware security module 1206 may implement FIPS 140-2 Level 3 and Level 4 security requirements, as an example, that provide physical protection against tampering and unauthorized access to cryptographic material and sensitive operations. Additionally, the hardware security module 1206 may perform threshold cryptography operations including key generation, partial decryption, and cryptographic signature generation within secure hardware enclaves that prevent exposure of sensitive key material.

In some embodiments, the hardware security module 1206 may coordinate with the credential management system 1204 to provide hardware-anchored cryptographic services for threshold decryption and credential reconstruction operations while maintaining strict isolation of cryptographic keys and sensitive operations.

The zero trust access architecture 1200 further includes a trusted execution environment 1208 that provides isolated processing capabilities for sensitive credential operations and authentication workflows within hardware-protected execution boundaries. For example, the trusted execution environment 1208 implements ARM TrustZone, Intel SGX, and AMD Memory Guard technologies that create secure enclaves for credential processing operations while preventing unauthorized access from privileged software and operating system components, coordinating with the credential management system 1204 to provide secure processing capabilities for threshold decryption operations and credential injection mechanisms while implementing attestation protocols that provide cryptographic proof of enclave integrity and configuration compliance.

The zero trust access architecture 1200 includes encrypted credential storage 1210 that maintains access credentials in cryptographically protected form using hardware-anchored encryption mechanisms and secure storage protocols. In some embodiments, the encrypted credential storage 1210 implements encryption-at-rest capabilities that protect stored credentials using cryptographic keys managed within hardware security modules and trusted execution environments, supporting distributed storage architectures that replicate encrypted credential data across multiple secure storage locations while coordinating with the credential management system 1204 to provide secure credential retrieval capabilities that decrypt credential material only within trusted execution boundaries after successful authentication and policy compliance verification.

In various embodiments, the access credential may remain encrypted at rest within the credential management system, and the access credential may be decrypted only transiently within secure memory of a protected execution boundary during the threshold decryption process. The protected execution boundary may comprise at least one of a Trusted Execution Environment or a Hardware Security Module that provides cryptographic isolation for sensitive credential operations.

The zero trust access architecture 1200 further includes a distributed authenticator network 1212 that comprises multiple independent authentication components that collectively perform client validation and threshold decryption operations using hardware-anchored security mechanisms. For example, various hardware-based authentication technologies may be implemented that provide device-anchored security assurance and cryptographic proof-of-possession verification, supporting heterogeneous authenticator deployments that combine different hardware security technologies and authentication mechanisms to provide comprehensive client validation capabilities and reduce common-mode failure risks while implementing secure communication protocols that enable authenticated coordination between authenticator components and providing scalable authentication capabilities that support high-volume authentication loads.

In various embodiments, as has been discussed hereinabove, organizations may approach credential handle architecture deployment across heterogeneous environments by implementing a phased deployment strategy that begins with on-premises installations using passive authenticators, which provides significant security improvements over existing credential management practices while minimizing initial complexity and integration challenges. For cloud deployments, organizations may establish Zero Trust Access Fabric infrastructure within dedicated virtual machines operating in isolated virtual private networks to maintain security boundaries and policy consistency, while hybrid environments may require careful coordination between on-premises and cloud components to ensure seamless credential handle operations and consistent authentication policy enforcement across diverse infrastructure boundaries and deployment models.

The zero trust access architecture 1200 includes a TPM-based authenticator 1214 that utilizes Trusted Platform Module capabilities for device attestation and cryptographic operations within the distributed authentication framework. The TPM-based authenticator 1214 implements TPM 2.0 specifications, as an example, that provide hardware-anchored cryptographic capabilities including secure key generation, digital signature operations, and platform configuration measurement and attestation, performing client device validation through platform integrity measurement and attestation verification that confirms device configuration compliance and tamper-resistance properties.

The TPM-based authenticator 1214 may coordinate with the distributed authenticator network 1212 to provide hardware-anchored authentication assurance through cryptographic attestation and device-bound key operations that prevent authentication from unauthorized and compromised devices. Additionally, secure boot verification and runtime integrity measurement capabilities may be implemented that provide continuous device security assurance throughout the authentication workflow. In some embodiments, remote attestation protocols may be supported that enable verification of device integrity and configuration compliance by external authentication coordination systems while maintaining the confidentiality and integrity of device-specific cryptographic material and attestation evidence.

The zero trust access architecture 1200 further includes a PUF-based authenticator 1216 that may leverage Physical Unclonable Function technology to generate device-unique challenge-response pairs for hardware-anchored authentication operations. For example, the PUF-based authenticator 1216 may utilize manufacturing variations in semiconductor circuits to produce device-unique responses to digital challenges that cannot be cloned and replicated across different hardware devices. The PUF-based authenticator 1216 may implement challenge-response protocols that provide cryptographic proof of device possession and authenticity without requiring persistent storage of cryptographic keys and sensitive authentication material.

In various embodiments, the active challenge-response mechanisms may comprise proof of possession of a challenge-response pair generated by the PUF-based authenticator 1216 embedded in the client device. For example, the Physical Unclonable Function may produce device-unique responses derived from inherent physical variations in hardware manufacturing processes, creating cryptographic fingerprints that cannot be cloned or replicated across different hardware devices while providing immutable device identity verification.

The zero trust access architecture 1200 includes a TEE-based authenticator 1218 that may operate within Trusted Execution Environment boundaries to provide isolated authentication processing and cryptographic operations. In some embodiments, the TEE-based authenticator 1218 may implement secure enclave technologies that create hardware-protected execution environments for authentication logic and cryptographic operations while preventing unauthorized access from privileged software and operating system components. Additionally, client validation operations and threshold decryption contributions may be performed within isolated memory regions that remain protected from external observation and tampering.

In various embodiments, the active challenge-response mechanisms may comprise proof of possession of a challenge-response pair generated by the TEE-based authenticator 1218 embedded in the client device. The TEE-based authenticator 1218 may produce cryptographically signed responses that prove possession of device-bound keys and verify the integrity of code running inside a secure enclave, providing hardware-anchored authentication assurance that prevents unauthorized access from compromised client systems.

The zero trust access architecture 1200 further includes a biometric authenticator 1220 that may perform biometric verification as part of the distributed authentication process using hardware-anchored biometric processing capabilities. For example, various biometric modalities may be implemented including fingerprint recognition, facial recognition, iris scanning, and voice recognition that provide user-specific authentication factors within the hardware-anchored security framework. Further, the biometric authenticator 1220 may utilize secure biometric processors and tamper-resistant storage systems that protect biometric templates and matching algorithms from unauthorized access and reverse engineering. The biometric authenticator 1220 may coordinate with the distributed authenticator network 1212 to provide user-specific authentication assurance through hardware-protected biometric processing that prevents spoofing and replay attacks while maintaining user privacy and template security.

The zero trust access architecture 1200 includes an API access proxy 1222 that may intercept client API requests and coordinate credential injection operations within the hardware-anchored security framework. In some embodiments, the API access proxy 1222 may operate within trusted execution boundaries that provide hardware-protected processing for credential injection operations while preventing unauthorized access to reconstructed credential material and sensitive authentication information. For example, as has been discussed hereinabove, the API access proxy 1222 may implement just-in-time credential injection mechanisms that insert hardware-attested credentials into API requests only after successful authentication and policy compliance verification through the distributed authenticator network 1212. The API access proxy 1222 may support various deployment configurations including hardware-anchored sidecar containers and secure enclave processing that maintain consistent security properties and tamper-resistance characteristics across different infrastructure environments.

The zero trust access architecture 1200 further includes a credential injection module 1224 that may perform just-in-time credential insertion into authenticated API requests using hardware-protected processing capabilities. The credential injection module 1224 may operate within trusted execution environments and secure enclaves that provide cryptographic isolation for credential injection operations while preventing unauthorized access to reconstructed credential material. Additionally, the credential injection module 1224 may implement secure memory management practices that ensure credential material is immediately cleared from memory after successful injection while maintaining comprehensive audit trails of credential usage events and injection operations.

The zero trust access architecture 1200 includes a hardware attestation verifier 1226 that may validate hardware-based attestation evidence from client devices and authenticator components throughout the authentication workflow. In some embodiments, the hardware attestation verifier 1226 may implement various attestation protocols including TPM attestation, TEE attestation, and secure boot verification that provide cryptographic proof of hardware integrity and configuration compliance. The hardware attestation verifier 1226 may coordinate with the distributed authenticator network 1212 to verify attestation evidence and determine the trustworthiness of client devices and authentication components.

The zero trust access architecture 1200 further includes a client device 1228 that may initiate API access requests using credential handles while providing hardware-anchored authentication capabilities through integrated security components. The client device 1228 may implement various hardware security technologies that provide device-anchored authentication factors and tamper-resistance properties for secure interaction with the distributed authenticator network 1212. Additionally, the client device 1228 may coordinate with hardware-based authenticator components to provide cryptographic proof of device identity and integrity throughout the authentication workflow.

The client device 1228 may support multiple hardware security technologies including trusted platform modules, physical unclonable functions, and trusted execution environments that provide comprehensive device-anchored security capabilities for authentication operations. The client device 1228 may implement secure communication protocols that enable authenticated interaction with the API access proxy 1222 and distributed authenticator components while maintaining the confidentiality and integrity of authentication information and credential handles.

The zero trust access architecture 1200 includes a hardware root of trust 1230 that may provide device-anchored security capabilities and immutable trust foundations for authentication operations within the client device 1228. For example, the hardware root of trust 1230 may implement various hardware security primitives including secure boot mechanisms, cryptographic key generation, and tamper-resistant storage that establish foundational security properties for device-based authentication. The hardware root of trust 1230 may coordinate with distributed authenticator components to provide hardware-anchored authentication assurance that prevents authentication from unauthorized and compromised devices.

The zero trust access architecture 1200 further includes a physical unclonable function 1232 that may generate device-unique responses based on inherent hardware characteristics and manufacturing variations within the hardware root of trust 1230. For example, in some embodiments, the physical unclonable function 1232 may utilize semiconductor manufacturing variations to produce device-unique challenge-response pairs that cannot be cloned and replicated across different hardware devices. The physical unclonable function 1232 may provide hardware-anchored device identity that enables cryptographic proof of device possession and authenticity without requiring persistent storage of cryptographic keys and sensitive authentication material.

The physical unclonable function 1232 may coordinate with the distributed authenticator network 1212 to provide device-unique authentication responses that prevent authentication from cloned, emulated, and unauthorized devices while maintaining tamper-resistance properties. Additionally, the physical unclonable function 1232 may implement error correction mechanisms that generate stable responses from noisy hardware characteristics while maintaining device uniqueness and security properties.

The zero trust access architecture 1200 includes a trusted platform module 1234 that may perform cryptographic operations and maintain platform integrity measurements within the hardware root of trust 1230. In some embodiments, the trusted platform module 1234 may implement TPM 2.0 specifications that provide hardware-anchored cryptographic capabilities including secure key generation, digital signature operations, and platform configuration measurement and attestation. Additionally, the trusted platform module 1234 may perform platform integrity measurement and attestation verification that confirms device configuration compliance and tamper-resistance properties throughout the authentication workflow.

The zero trust access architecture 1200 further includes a resource server 1236 that may receive authenticated API requests from the API access proxy 1222 and provide responses to authorized requests according to standard server-side processing mechanisms. The resource server 1236 may implement conventional authentication and authorization mechanisms without requiring modifications to accommodate the hardware-anchored credential architecture and distributed authentication framework. The resource server 1236 may process API requests containing hardware-attested credentials in the same manner as requests received directly from clients in traditional authentication models. It is to be understood that the resource server 1236 may represent various types of backend services including cloud APIs, database servers, web applications, and microservices that require authenticated access for protected operations and resource access.

The zero trust access architecture 1200 includes a network infrastructure 1238 that may provide communication channels between the client device 1228, the API access proxy 1222, the credential management system 1204, the distributed authenticator network 1212, and the resource server 1236. For example, the network infrastructure 1238 may implement secure communication protocols including TLS encryption, certificate pinning, and mutual authentication that protect authentication information and credential operations during network transit. Additionally, the network infrastructure 1238 may support various network topologies and deployment configurations while maintaining consistent security properties and tamper-resistance characteristics for hardware-anchored authentication operations.

In some embodiments, the network infrastructure 1238 may coordinate with hardware security components to provide network-level security assurance that complements device-anchored authentication mechanisms and hardware-protected credential operations. Additionally, the network infrastructure 1238 may implement network segmentation and access control mechanisms that isolate authentication traffic and credential operations from unauthorized network access and observation.

The hardware-anchored authentication coordination implemented by the zero trust access architecture 1200 may establish comprehensive device-to-service trust relationships that extend from silicon-level security primitives through application-level authentication mechanisms.

The distributed authenticator network 1212 may leverage hardware-anchored security capabilities from multiple authenticator types to provide comprehensive client validation that combines device identity verification, platform integrity attestation, biometric authentication, and cryptographic proof-of-possession mechanisms. The coordination between the TPM-based authenticator 1214, the PUF-based authenticator 1216, the TEE-based authenticator 1218, and the biometric authenticator 1220 may provide layered authentication assurance that prevents common-mode failures and provides resilience against various attack vectors and compromise scenarios. The hardware attestation verifier 1226 may coordinate verification of attestation evidence from multiple hardware security components to ensure comprehensive trust establishment and continuous integrity monitoring throughout the authentication process.

In various embodiments, the zero trust access architecture 1200 may be extended to support additional hardware security technologies including quantum-resistant cryptographic algorithms, secure multi-party computation within hardware enclaves, and advanced attestation mechanisms that provide enhanced security assurance for high-security environments and emerging threat scenarios.

FIG. 13 illustrates a zero trust access architecture 1300 for credential management and authentication, in accordance with one embodiment. As an option, the zero trust access architecture 1300 may be implemented in the context of any one or more of the embodiments set forth in any previous and/or subsequent Figures and/or description thereof. Of course, however, the zero trust access architecture 1300 may be implemented in the context of any desired environment. Further, the aforementioned definitions may equally apply to the description below.

The zero trust access architecture 1300 includes a zero trust access fabric core infrastructure 1302 that may provide the foundational framework for secure credential handling and policy enforcement through comprehensive policy-driven access control mechanisms. In some embodiments, the zero trust access fabric core infrastructure 1302 may implement centralized policy management capabilities that coordinate credential custody operations across distributed system components while maintaining strict separation of duties and operational governance. Additionally, heterogeneous deployment environments may be used that enable organizations to implement diverse authenticator technologies and vendor solutions to provide supply-chain resilience and reduce common-mode failure risks.

The zero trust access fabric core infrastructure 1302 may coordinate policy evaluation, enforcement, and audit operations across multiple independent system components while maintaining comprehensive oversight of credential lifecycle management and authentication workflows.

In various embodiments, the system may extend credential custody capabilities beyond API credentials to encompass password authentication scenarios where user passwords are stored within the credential management system and referenced through password handles that maintain the same opaque characteristics and security properties as API credential handles. The password handle architecture may enable organizations to eliminate password storage within client applications and authentication systems while maintaining compatibility with existing password-based authentication protocols and user experience expectations through transparent password handle substitution and just-in-time password reconstruction operations.

The zero trust access architecture 1300 further includes a policy decision point 1304 that may evaluate access requests against stored policies and coordinate authentication decisions through comprehensive policy analysis and contextual evaluation mechanisms. In some embodiments, the policy decision point 1304 may implement centralized policy evaluation logic that determines authentication requirements, threshold values, and access conditions based on credential sensitivity, client context, and organizational security policies. Additionally, the policy decision point 1304 may coordinate with multiple policy databases and external policy sources to provide comprehensive policy evaluation that considers regulatory requirements, compliance obligations, and risk assessment results.

The policy decision point 1304 may implement real-time policy evaluation mechanisms that analyze client requests against dynamic policy conditions including temporal constraints, geographic restrictions, and behavioral pattern requirements while maintaining comprehensive audit trails of policy decisions and evaluation results. Further, the policy decision point 1304 may support adaptive policy mechanisms that automatically adjust authentication requirements based on risk assessment results, threat intelligence feeds, and contextual factors that may indicate elevated security risks and potential compromise scenarios. In some embodiments, the policy decision point 1304 may coordinate with distributed authentication components to implement policy-driven threshold requirements and weighted quorum mechanisms that reflect organizational security standards and compliance obligations while maintaining operational flexibility and scalability.

In various embodiments, the system may support advanced policy management capabilities including dynamic policy updates that modify authentication requirements without disrupting ongoing operations, risk-based policy adjustments that automatically adapt threshold values and authentication factors based on real-time threat intelligence and behavioral analysis, and policy versioning mechanisms that maintain backward compatibility during policy transitions while providing comprehensive change tracking and rollback capabilities for policy management and governance purposes.

The zero trust access architecture 1300 includes a credential policy database 1306 that may store policies defining authentication requirements and access conditions for credentials through comprehensive policy management and versioning mechanisms. The credential policy database 1306 may maintain policy definitions that specify authentication methods, threshold requirements, and access control conditions including passive telemetry-based validation and active challenge-response mechanisms.

The zero trust access architecture 1300 further includes an ABAC policy engine 1308 that may evaluate attribute-based access control policies to determine whether access should be granted based on contextual attributes and dynamic policy conditions. In some embodiments, the ABAC policy engine 1308 may implement comprehensive attribute evaluation logic that considers client identity, device characteristics, environmental factors, and behavioral patterns when making access control decisions. The ABAC policy engine 1308 may coordinate with external attribute sources and identity providers to collect comprehensive contextual information that informs policy evaluation and access control decisions.

In various embodiments, the access credential may be governed by attribute-based access control policies that specify contextual attributes including at least one of identity verification, device integrity assessment, geolocation analysis, behavioral history evaluation, and environmental telemetry monitoring. The attribute-based policies may enable comprehensive risk assessment that considers multiple contextual factors when making authentication and authorization decisions.

The zero trust access architecture 1300 includes a risk assessment module 1310 that may analyze risk factors and contextual signals to inform authentication decisions and policy enforcement through comprehensive threat analysis and behavioral monitoring mechanisms. In some embodiments, the risk assessment module 1310 may implement real-time risk scoring algorithms that evaluate client behavior patterns, access frequency, geographic location, and device characteristics to determine risk levels and potential security threats. Further, the risk assessment module 1310 may coordinate with external threat intelligence feeds and security monitoring systems to incorporate current threat information and attack pattern recognition into risk assessment calculations. Still yet, the risk assessment module 1310 may support machine learning algorithms that analyze historical access patterns and authentication events to establish behavioral baselines and detect anomalous activities that may indicate credential compromise and unauthorized access attempts.

In various embodiments, the system may implement advanced threat detection and adaptive authentication capabilities that analyze client behavior patterns, access frequency, geographic location changes, device fingerprint variations, and temporal access characteristics to establish behavioral baselines and identify deviations that may indicate potential security threats or unauthorized access attempts. The behavioral analysis may integrate with machine learning algorithms that automatically improve detection accuracy and policy enforcement effectiveness while maintaining privacy protection through hardware-protected processing environments and data minimization principles.

The zero trust access architecture 1300 further includes a policy enforcement point 1312 that may implement policy decisions and coordinate credential access operations through comprehensive enforcement mechanisms and authentication coordination protocols. In some embodiments, the policy enforcement point 1312 may serve as the primary enforcement component that translates policy decisions into operational authentication requirements and credential access controls. The policy enforcement point 1312 may implement just-in-time enforcement mechanisms that apply policy decisions at the moment of credential access while maintaining comprehensive audit trails of enforcement actions and policy compliance verification.

The zero trust access architecture 1300 includes a credential handle validator 1314 that may validate opaque credential handles presented by clients during API requests through comprehensive handle verification and policy compliance mechanisms. In some embodiments, the credential handle validator 1314 may implement handle authenticity verification that confirms the integrity and legitimacy of credential handles while validating expiration status and policy compliance requirements. Additionally, the credential handle validator 1314 may coordinate with credential storage systems to verify handle-to-credential mappings and ensure that handles correspond to valid credentials and appropriate access policies.

The zero trust access architecture 1300 further includes a threshold decryption coordinator 1316 that may orchestrate the collection and combination of partial decryptions from multiple authenticators to reconstruct plaintext credentials through secure cryptographic coordination mechanisms. For example, the threshold decryption coordinator 1316 may implement threshold cryptography protocols that combine partial decryptions from successful authenticators according to weighted quorum policies and threshold requirements specified in credential policies. In some embodiments, the threshold decryption coordinator 1316 may coordinate with distributed authenticator components to collect cryptographic shares and evaluate threshold satisfaction before reconstructing complete access credentials. Further, secure reconstruction mechanisms may be implemented that combine partial decryptions within protected execution boundaries including trusted execution environments and hardware security modules to ensure credential protection during reconstruction operations.

Additionally, organizations may select appropriate protected execution boundaries for credential reconstruction based primarily on the sensitivity of data that client applications and workloads are processing, where highly sensitive operations such as accessing cryptographic functions would likely require Trusted Execution Environment (TEE) protection to ensure adequate security isolation. The selection process may involve evaluating the specific data classification levels, regulatory compliance requirements, and threat models associated with the protected resources, while considering performance and security trade-offs where TEEs provide strong isolation with moderate performance overhead, Hardware Security Modules offer the highest security assurance with potential latency impacts, and confidential computing enclaves provide cloud-native protection with varying performance characteristics depending on the specific implementation and workload requirements.

The zero trust access architecture 1300 includes a just-in-time injector 1318 that may inject reconstructed credentials into API requests at the moment of use through secure credential insertion mechanisms and memory management protocols. For example, the just-in-time injector 1318 may implement credential injection operations that replace credential handles with actual access credentials in appropriate request headers, parameters, and body sections according to authentication protocol requirements. As such, the just-in-time injector 1318 may coordinate with threshold decryption components to receive reconstructed credentials and perform immediate injection operations while maintaining secure memory management practices that clear credential material after successful injection.

The zero trust access architecture 1300 further includes a distributed trust fabric 1320 that may implement decentralized authentication and cryptographic key management through comprehensive distributed trust mechanisms and vendor diversity frameworks. For example, the distributed trust fabric 1320 may coordinate authentication operations across multiple independent authenticator components while maintaining cryptographic isolation and operational separation between different vendor systems and technology platforms. In some embodiments, the distributed trust fabric 1320 may support split governance mechanisms where distinct operators manage different components of the authentication infrastructure including credential management systems, proxy components, and authenticator networks to ensure that no single team can both authorize and decrypt credential material. Additionally, vendor diversity strategies may be implemented that distribute authentication authority across multiple technology vendors and service providers to prevent single-vendor dependencies and reduce supply-chain attack risks.

The zero trust access architecture 1300 includes a quorum authentication manager 1322 that may coordinate authentication across multiple independent authenticators and enforce threshold requirements for credential release through comprehensive quorum management and consensus mechanisms. The quorum authentication manager 1322 may implement weighted quorum protocols that assign different trust levels to authenticators based on their assurance capabilities and authentication mechanisms while coordinating threshold satisfaction evaluation. Additionally, the quorum authentication manager 1322 may coordinate with distributed authenticator components to collect authentication approvals and evaluate whether cumulative authenticator weights satisfy threshold requirements specified in credential policies.

In some embodiments, the quorum authentication manager 1322 may support dynamic quorum adjustments that modify threshold requirements based on real-time risk assessment results and contextual factors that may indicate changing security conditions and threat levels.

Additionally, in other embodiments, the weighted quorum authentication mechanism may be implemented where each authenticator is assigned an integer weight representing its assurance level, and the credential management system determines satisfaction of threshold requirements when a cumulative assurance weight greater than or equal to a predetermined threshold value is achieved. The weighted approach may enable organizations to implement governance-aligned policies such as requiring "2× Security+1× Compliance" authenticator approval rather than simply counting authenticators equally, thereby reflecting the relative trust levels and assurance capabilities of different authentication mechanisms within the distributed validation framework.

The zero trust access architecture 1300 further includes a secret key share manager 1324 that may manage the distribution and protection of secret key shares used in threshold decryption processes through secure key management and distribution mechanisms. For example, the secret key share manager 1324 may implement threshold secret sharing algorithms that generate secret key shares and distribute them to authenticator components based on their assigned weights within the weighted quorum framework. In various embodiments, the secret key share manager 1324 may support key share rotation and renewal mechanisms that enable periodic updates of cryptographic material without disrupting authentication operations while maintaining threshold cryptography properties and weighted distribution requirements.

The zero trust access architecture 1300 includes a weighted authenticator registry 1326 that may maintain a registry of authenticators with assigned trust weights that reflect their assurance levels and authentication capabilities. The weighted authenticator registry 1326 may implement authenticator registration and management mechanisms that track authenticator capabilities, vendor information, and trust assignments while maintaining comprehensive metadata about authenticator characteristics and operational status. In some embodiments, the weighted authenticator registry 1326 may coordinate with policy management components to ensure that authenticator weights and assignments align with organizational security policies and compliance requirements.

The zero trust access architecture 1300 further includes a client application layer 1328 that may interface with client systems and coordinate credential handle operations through standardized client integration mechanisms and authentication protocols. For example, the client application layer 1328 may implement client-facing interfaces that enable applications to utilize credential handles and participate in authentication workflows while maintaining compatibility with existing API client implementations and development frameworks. In some embodiments, the client application layer 1328 may coordinate with credential handle storage systems to provide secure handle distribution and management capabilities for client applications.

The zero trust access architecture 1300 includes a credential handle store 1330 that may maintain opaque credential handles on client devices without exposing actual access credentials through secure handle storage and distribution mechanisms. For example, the credential handle store 1330 may implement handle generation and issuance processes that create opaque reference identifiers while maintaining secure associations with actual credentials stored within the credential management infrastructure. Additionally, policy management components may be used to ensure that handle issuance and distribution comply with access policies and security requirements.

The zero trust access architecture 1300 further includes a challenge response handler 1332 that may process authentication challenges and generate responses using device-bound cryptographic mechanisms and hardware-anchored authentication factors. For example, various challenge-response protocols may be implemented that utilize hardware security components including trusted platform modules, physical unclonable functions, and trusted execution environments to provide device-anchored authentication assurance. Additionally, distributed authenticator components may be used to receive authentication challenges and generate cryptographic responses that demonstrate device possession and client legitimacy. The challenge response handler 1332 may support multiple authentication factor types and challenge formats while maintaining compatibility with diverse hardware security platforms and authentication mechanisms.

In various embodiments, the system may implement advanced cryptographic mechanisms including threshold secret sharing schemes that mathematically prevent credential reconstruction without meeting specified threshold requirements, homomorphic encryption techniques that enable secure computation of credentials without exposing plaintext values, and secure multi-party computation protocols that distribute cryptographic operations across multiple independent parties while maintaining privacy and security properties throughout the computation process.

The zero trust access architecture 1300 includes external identity providers 1334 that may support federated authentication and identity verification processes through integration with enterprise identity management systems and third-party authentication platforms. For example, the external identity providers 1334 may implement standard federation protocols including SAML, OAuth2, and OpenID Connect that enable integration with existing identity infrastructure and single sign-on capabilities. In some embodiments, the external identity providers 1334 may support vendor diversity strategies that enable organizations to integrate multiple identity providers and authentication services while maintaining consistent policy enforcement and security properties across federated authentication scenarios. Additionally, the external identity providers 1334 may implement split governance mechanisms that distribute identity management responsibilities across multiple organizational boundaries and service providers while ensuring that federated authentication operations comply with access policies and security requirements.

In various embodiments, the system may support federated authentication scenarios where authentication operations integrate with external identity providers, enterprise authentication systems, and third-party security services to leverage existing identity infrastructure and provide comprehensive authentication assurance while maintaining the fundamental separation of credential possession from credential usage. The federated integration may enable organizations to utilize established single sign-on capabilities, multi-factor authentication systems, and identity federation protocols while extending Zero Trust principles to credential-level security through the distributed authentication and threshold decryption mechanisms.

The zero trust access architecture 1300 further includes an audit and compliance system 1336 that may provide comprehensive logging and monitoring capabilities through tamper-evident audit mechanisms and regulatory reporting frameworks. For example, the audit and compliance system 1336 may implement comprehensive event logging that captures authentication decisions, policy enforcement actions, and credential operations across all system components while maintaining cryptographic integrity and tamper-evidence properties.

The zero trust access architecture 1300 includes a tamper evident log store 1338 that may maintain cryptographically signed, append-only logs of authentication events, policy decisions, and credential usage through comprehensive tamper-evidence mechanisms and cryptographic integrity protection. In some embodiments, the tamper evident log store 1338 may implement cryptographic logging protocols that ensure audit records cannot be modified or deleted after creation while maintaining comprehensive audit trails of system operations and security events. Additionally, the tamper evident log store 1338 may coordinate with distributed system components to collect audit information and maintain tamper-evident records that support forensic analysis and compliance verification requirements.

The zero trust access architecture 1300 further includes a provenance tracker 1340 that may track the complete lineage of each access request, including which authenticators approved access, which key shares were used, and where credential reconstruction occurred through comprehensive provenance documentation and audit trail mechanisms. For example, a detailed lineage tracking may be implemented that documents the complete workflow of authentication events including policy evaluation results, authenticator participation, threshold satisfaction verification, and credential reconstruction operations. Further, the provenance tracker 1340 may coordinate with distributed system components to collect provenance information and maintain comprehensive records that support forensic analysis and compliance verification requirements.

In various embodiments, the system may provide comprehensive audit and provenance capabilities that track the complete lineage of each access request including which authenticators approved access, which secret key shares were utilized, where credential reconstruction occurred, and detailed timing information for all authentication events and coordination activities. The provenance tracking may implement cryptographically signed audit records, hash-chained tamper-evident logs, and comprehensive forensic capabilities that support incident response, compliance verification, and security investigation requirements across distributed authentication infrastructure deployments.

The policy-driven coordination implemented by the zero trust access architecture 1300 may establish comprehensive governance frameworks that distribute operational authority across distinct organizational teams and technology platforms while maintaining consistent policy enforcement and security assurance throughout the credential management infrastructure. The policy decision point 1304 may coordinate with the ABAC policy engine 1308 and the risk assessment module 1310 to provide comprehensive policy evaluation that considers multiple contextual factors and dynamic security conditions while maintaining audit trails of policy decisions and evaluation results. The policy enforcement point 1312 may coordinate with the credential handle validator 1314, the threshold decryption coordinator 1316, and the just-in-time injector 1318 to implement policy decisions through operational enforcement mechanisms that maintain separation of duties and prevent single-component control over credential access operations.

The distributed trust coordination may enable organizations to implement vendor diversity strategies that distribute authentication authority across multiple technology platforms and service providers while maintaining consistent security properties and policy enforcement capabilities throughout the authentication infrastructure. For example, the distributed trust fabric 1320 may coordinate with the quorum authentication manager 1322, the secret key share manager 1324, and the weighted authenticator registry 1326 to implement heterogeneous authenticator deployments that combine different authentication technologies and vendor solutions while maintaining operational separation and governance controls. The split governance mechanisms may ensure that distinct operators manage different components of the authentication infrastructure including the credential management system, proxy components, and authenticator networks while preventing single-team control over both authorization and decryption operations.

The comprehensive audit and compliance coordination may provide tamper-evident documentation of all system operations and security decisions while supporting regulatory reporting and forensic analysis requirements across distributed system components and organizational boundaries. The audit and compliance system 1336 may coordinate with the tamper evident log store 1338 and the provenance tracker 1340 to maintain comprehensive audit trails that document authentication events, policy enforcement actions, and credential operations while ensuring cryptographic integrity and tamper-evidence properties throughout the audit infrastructure. The vendor-diverse audit capabilities may collect audit information from multiple technology platforms and service providers while maintaining consistent audit standards and enabling independent verification of split governance and operational separation requirements.

Figure 14:
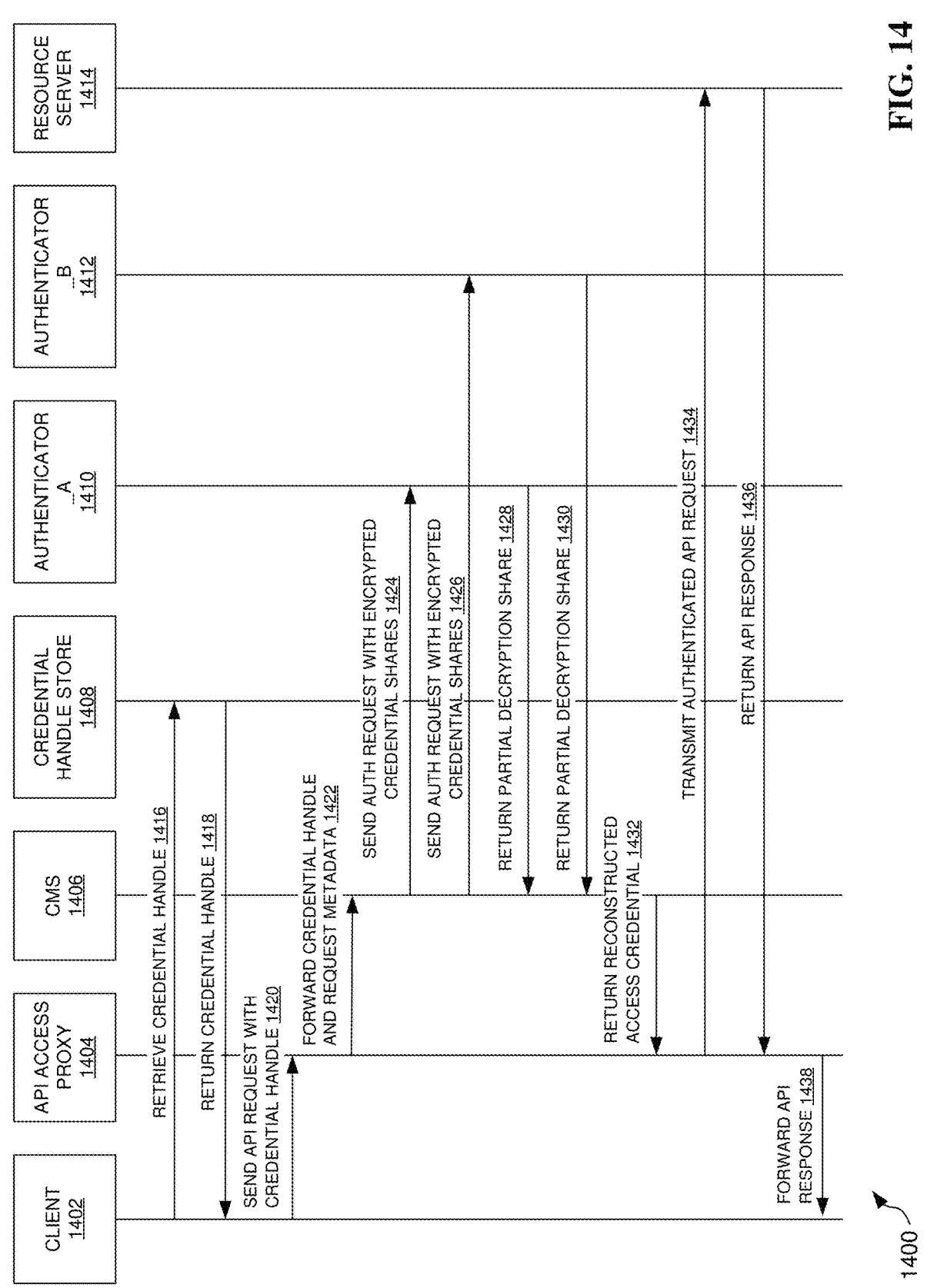
FIG. 14 illustrates a sequence diagram representing an API access control process utilizing credential handle proxying and distributed authentication, according to aspects of the present disclosure.

FIG. 14 illustrates a sequence diagram 1400 representing an API access control process utilizing credential handle proxying and distributed authentication, in accordance with one embodiment. As an option, the sequence diagram 1400 may be implemented in the context of any one or more of the embodiments set forth in any previous and/or subsequent Figures and/or description thereof. Of course, however, the sequence diagram 1400 may be implemented in the context of any desired environment. Further, the aforementioned definitions may equally apply to the description below.

As shown, the sequence diagram 1400 represents an API access control process utilizing credential handle proxying and distributed authentication. The diagram includes several main entities: a client 1402 that initiates API access requests using credential handles, an API access proxy 1404 that serves as an intermediary component coordinating authentication and credential injection operations, a CMS 1406 that manages credential storage and orchestrates distributed authentication processes, a credential handle store 1408 that maintains opaque reference identifiers for client applications, an authenticator A 1410 and authenticator B 1412 that perform independent client validation operations and contribute partial decryptions to threshold reconstruction processes, and a resource server 1414 that receives authenticated API requests and provides responses through standard server-side processing mechanisms. It is to be appreciated that other entities (including any number of authenticators) may be included as desired.

The operational flow begins with the client 1402 performing a retrieve credential handle step 1416 to obtain a credential handle from the credential handle store 1408, which responds with a return credential handle step 1418 providing the opaque handle to the client 1402. The client 1402 then initiates a send API request step 1420, transmitting an API request containing the credential handle to the API access proxy 1404, which executes a forward credential handle step 1422 by sending the credential handle and associated request metadata to the CMS 1406. The CMS 1406 coordinates distributed authentication by performing a send auth request step 1424 to authenticator A 1410 and a send auth request step 1426 to authenticator B 1412, with each authenticator validating the client according to credential policies and performing threshold decryption operations. The authenticator A 1410 responds with a return partial decryption share step 1428, while authenticator B 1412 responds with a return partial decryption share step 1430, providing their respective partial decryption shares to the CMS 1406. The CMS 1406 combines these partial decryption shares to reconstruct the plaintext access credential and executes a return reconstructed access credential step 1432, providing the reconstructed credential to the API access proxy 1404. The API access proxy 1404 injects the reconstructed access credential into the API request and performs a transmit authenticated API request step 1434, forwarding the authenticated request to the resource server 1414, which processes the request and executes a return API response step 1436 back to the API access proxy 1404. Finally, the API access proxy 1404 performs a forward API response step 1438, relaying the response to the client 1402, completing the distributed authentication and credential injection workflow while ensuring the client 1402 never possesses the actual access credential throughout the entire process.

The temporal sequence coordination implemented by the sequence diagram 1400 may establish a comprehensive workflow that maintains strict separation between credential possession and credential usage while enabling seamless API access operations through distributed authentication and threshold decryption mechanisms. The initial credential handle retrieval through the retrieve credential handle step 1416 and the return credential handle step 1418 may establish the foundation for subsequent authentication workflows by providing the client 1402 with opaque handles that enable API access without exposing sensitive credential material. The API request submission through the send API request step 1420 and the forward credential handle step 1422 may initiate distributed authentication coordination that triggers comprehensive client validation across multiple independent authenticators.

The parallel authentication processing through the send auth request step 1424 and the send auth request step 1426 may enable simultaneous evaluation of client requests by the authenticator A 1410 and the authenticator B 1412 while maintaining independence and preventing single points of failure in the authentication decision process. The partial decryption collection through the return partial decryption share step 1428 and the return partial decryption share step 1430 may enable threshold satisfaction evaluation where the CMS 1406 combines weighted contributions from multiple authenticators to determine whether authentication requirements are satisfied. The credential reconstruction through the return reconstructed access credential step 1432 may complete the distributed authentication process by combining partial decryptions within secure processing boundaries to generate plaintext credentials for just-in-time injection.

The authenticated request processing through the transmit authenticated API request step 1434, the return API response step 1436, and the forward API response step 1438 may complete the API access workflow by enabling standard server-side processing while maintaining the separation of credential possession from credential usage throughout the entire temporal sequence.

As such, the sequence diagram 1400 may demonstrate how distributed authentication and threshold decryption mechanisms may be coordinated across multiple system components to provide comprehensive security assurance while maintaining operational compatibility with existing API infrastructure and client implementations. The temporal coordination may ensure that actual credentials exist in plaintext form only within secure processing boundaries of the CMS 1406 and the API access proxy 1404 during the brief periods required for threshold reconstruction and credential injection operations.

The distributed authentication coordination may provide enhanced security through threshold mechanisms that require successful validation from multiple independent authenticators before credential reconstruction and release while maintaining comprehensive audit trails of authentication events and credential operations. The partial decryption collection and combination process may ensure that no single authenticator possesses sufficient cryptographic authority to independently reconstruct complete access credentials while enabling weighted contributions that reflect the relative assurance levels of different authentication mechanisms. The temporal sequence may enable organizations to implement zero-trust principles for API access while maintaining compatibility with existing client applications and server infrastructure through transparent credential handle substitution and just-in-time credential injection mechanisms that preserve standard API request and response protocols.

Figure 15:
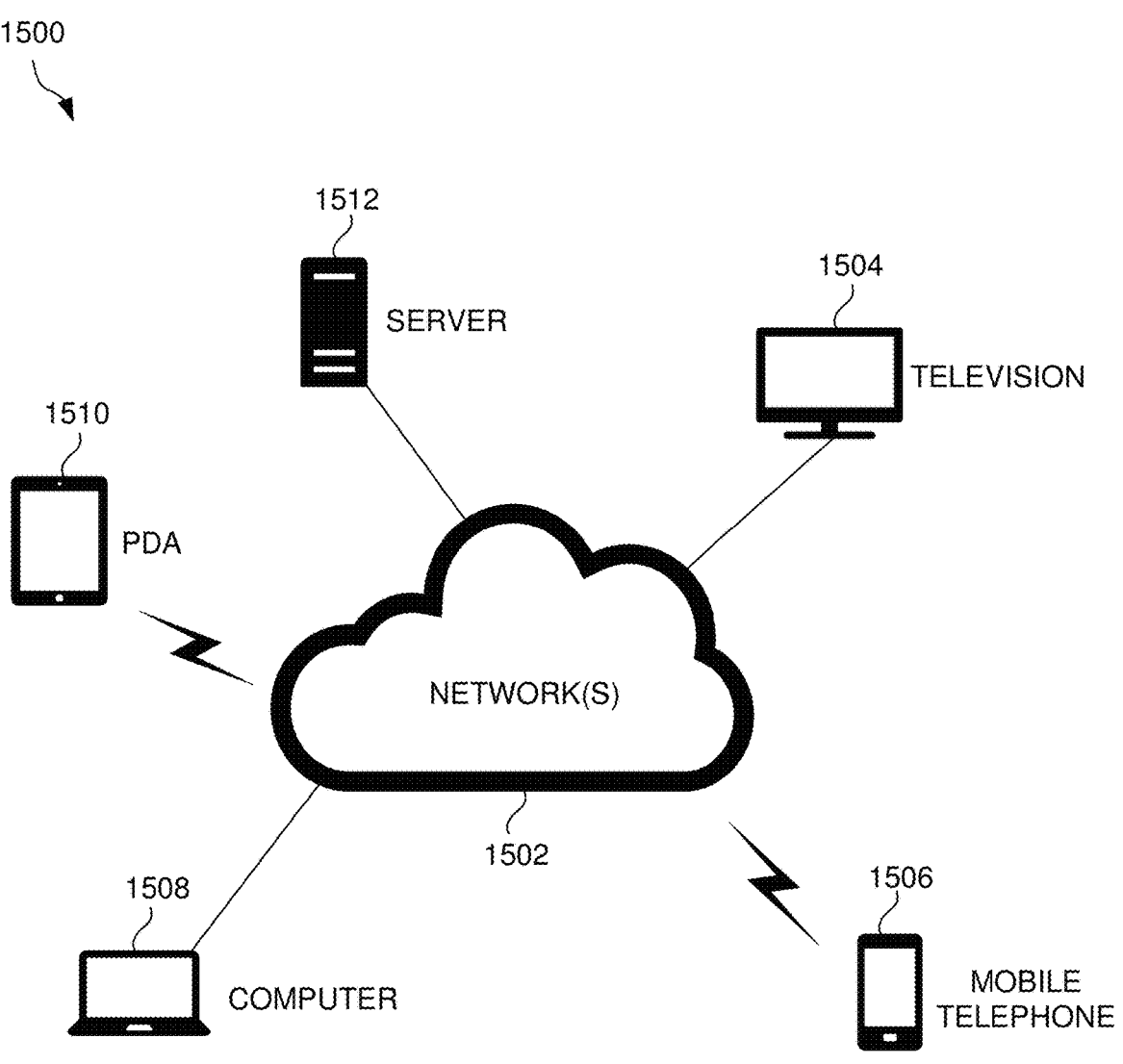
FIG. 15 illustrates a network system configured for distributed communication and resource access across multiple device types, according to aspects of the present disclosure.

FIG. 15 illustrates a network system 1500 configured for distributed communication and resource access across multiple device types, in accordance with one embodiment. As an option, the network system 1500 may be implemented in the context of any one or more of the embodiments set forth in any previous and/or subsequent Figures and/or description thereof. Of course, however, the network system 1500 may be implemented in the context of any desired environment. Further, the aforementioned definitions may equally apply to the description below.

As shown, the network system 1500 includes a network 1502 that serves as a central communication infrastructure connecting various client devices and servers while supporting credential handle proxying operations across heterogeneous deployment environments. Additionally, this network infrastructure represents one or more interconnected networks including local area networks, wide area networks, the Internet, and cloud-based network infrastructure that enable distributed credential management and authentication coordination. In some embodiments, the network 1502 implements secure communication protocols and network segmentation mechanisms that protect credential handle operations and authentication workflows during network transit.

The communication infrastructure facilitates interaction between diverse client device types and backend infrastructure components while supporting the credential handle architecture and proxy-based authentication mechanisms described in the present disclosure. Furthermore, network-level security controls including traffic encryption, access control lists, and network monitoring capabilities complement the credential handle security mechanisms implemented by application-level components. The network 1502 supports various network topologies and deployment configurations while maintaining consistent security properties for credential handle operations and distributed authentication workflows across geographically dispersed locations and diverse infrastructure environments.

The network system 1500 includes a television 1504 that represents a smart television device, set-top box, and other display device capable of network communication and API access through credential handle-based authentication mechanisms. In some embodiments, the television 1504 stores credential handles rather than actual access credentials, thereby eliminating the risk of credential theft from consumer electronics devices that may have limited security capabilities and update mechanisms. Additionally, this device participates in credential handle proxying operations by submitting API requests containing opaque handles to access streaming services, content delivery networks, and interactive applications while remaining unaware of the underlying distributed authentication and credential reconstruction processes.

Smart television devices operate within the heterogeneous device environment supported by the network system 1500 while maintaining compatibility with existing smart TV applications and content delivery protocols through transparent credential handle substitution mechanisms. Moreover, these devices implement lightweight client-side components that enable participation in challenge-response authentication workflows when required by credential policies while maintaining the user experience expectations associated with consumer electronics devices. Still yet, the television 1504 benefits from the enhanced security provided by credential handle architecture while supporting various streaming protocols and interactive services that require authenticated access to protected content and personalized features.

The network system 1500 further includes a mobile telephone 1506 that represents a smartphone, cellular device, and other mobile computing device capable of wireless communication and credential handle-based API access operations. In some embodiments, the mobile telephone 1506 stores only opaque credential handles within mobile applications and device storage systems, thereby eliminating the risk of credential theft through mobile malware, device loss, and unauthorized access to mobile storage systems. Additionally, mobile devices participate in distributed authentication workflows that leverage device-specific hardware security features including trusted execution environments, secure elements, and biometric authentication capabilities.

The network system 1500 includes a computer 1508 that represents a desktop computer, laptop, workstation, and other general-purpose computing device capable of comprehensive API access operations through credential handle-based authentication mechanisms. It is recognized that computing systems implement comprehensive client-side authentication capabilities including cryptographic challenge-response protocols, hardware attestation, and multi-factor authentication mechanisms that contribute to distributed authentication decisions through weighted quorum participation. Moreover, these devices support various development and deployment scenarios including software development, system administration, and enterprise application access while maintaining credential handle security properties across diverse computing environments.

The network system 1500 further includes a PDA 1510 that represents a handheld computing device, tablet, and other portable electronic device capable of network communication and credential handle-based authentication operations. In some embodiments, portable devices participate in authentication workflows that consider the unique characteristics and constraints associated with portable computing devices including battery life, processing capabilities, and network connectivity limitations.

The network system 1500 includes a server 1512 that represents a backend server, application server, resource server, and other server infrastructure component that receives authenticated API requests through the credential handle proxying architecture. For example, the server 1512 implements conventional authentication and authorization mechanisms without requiring modifications to accommodate the credential handle architecture and distributed authentication framework implemented by client devices and proxy components. Additionally, backend infrastructure processes API requests containing injected credentials in the same manner as requests received directly from clients in traditional authentication models while benefiting from the enhanced security provided by the credential handle architecture.

Server infrastructure represents various types of backend services including cloud APIs, database servers, web applications, microservices, and enterprise systems that require authenticated access for protected operations and resource access. Furthermore, these systems maintain audit logs of access attempts and implement server-side security controls while remaining unaware of the credential handle architecture and proxy-based authentication mechanisms implemented by upstream components.

The heterogeneous device support implemented by the network system 1500 may enable credential handle proxying operations across diverse client device types including consumer electronics, mobile devices, general-purpose computers, portable computing devices, and specialized hardware platforms while maintaining consistent security properties and authentication assurance. The network 1502 may facilitate communication between diverse client device types and backend infrastructure components while supporting various communication protocols, network topologies, and deployment configurations that accommodate the operational requirements and constraints associated with different device categories. The credential handle architecture may provide enhanced security benefits across all supported device types by eliminating client-side credential storage while maintaining compatibility with existing applications and authentication protocols through transparent credential handle substitution mechanisms.

The distributed authentication coordination implemented by the network system 1500 may enable comprehensive client validation across heterogeneous device environments while leveraging device-specific authentication capabilities including hardware security features, biometric authentication, and device attestation mechanisms that contribute to weighted quorum decisions. The television 1504, mobile telephone 1506, computer 1508, and PDA 1510 may each contribute different authentication factors and assurance levels to the distributed authentication process while maintaining operational independence and preventing single points of failure across the heterogeneous device environment. The server 1512 may receive authenticated API requests from diverse client device types through consistent credential injection mechanisms that maintain compatibility with existing server-side authentication infrastructure while providing enhanced security assurance through the distributed authentication framework.

The network system 1500 may implement comprehensive data governance capabilities through analysis operations performed on API requests and responses that traverse the network infrastructure and credential handle proxying mechanisms. The access proxy components within the network system 1500 may perform analysis on returned information for data discovery and classification purposes, enabling organizations to implement comprehensive data governance across both request and response flows. The data analysis capabilities may identify sensitive information, classify data types, and enforce data handling policies while maintaining the security benefits provided by credential handle architecture and distributed authentication mechanisms.

The data governance analysis may operate on API responses received from the server 1512 and other backend infrastructure components to identify data classification requirements, regulatory compliance obligations, and organizational data handling policies that apply to the accessed information. The analysis operations may implement data discovery mechanisms that automatically identify sensitive data types including personally identifiable information, financial data, healthcare records, and intellectual property while applying appropriate classification labels and access controls. The data governance capabilities may coordinate with policy enforcement mechanisms to ensure that data access and handling operations comply with organizational policies and regulatory requirements while maintaining comprehensive audit trails of data access patterns and classification decisions.

In various embodiments, the system may implement comprehensive data governance and analysis capabilities that perform operations on API requests and responses traversing the network infrastructure and credential handle proxying mechanisms to identify sensitive information, classify data types, and enforce data handling policies. The data governance analysis may operate on API responses received from backend infrastructure components to identify data classification requirements, regulatory compliance obligations, and organizational data handling policies while implementing data discovery mechanisms that automatically identify sensitive data types and apply appropriate classification labels and access controls.

The comprehensive data governance framework may enable organizations to implement unified data protection policies across heterogeneous device environments and diverse API access scenarios while maintaining the security assurance provided by credential handle architecture and distributed authentication mechanisms. The data analysis and classification operations may support various data governance frameworks including data loss prevention, privacy protection, and regulatory compliance while providing real-time monitoring and enforcement capabilities that adapt to changing data governance requirements and policy updates. The network system 1500 may provide comprehensive data governance visibility and control across the entire API access workflow from credential handle-based authentication through data access and response analysis while maintaining operational efficiency and user experience across diverse client device types and backend service integrations.

Figure 16:
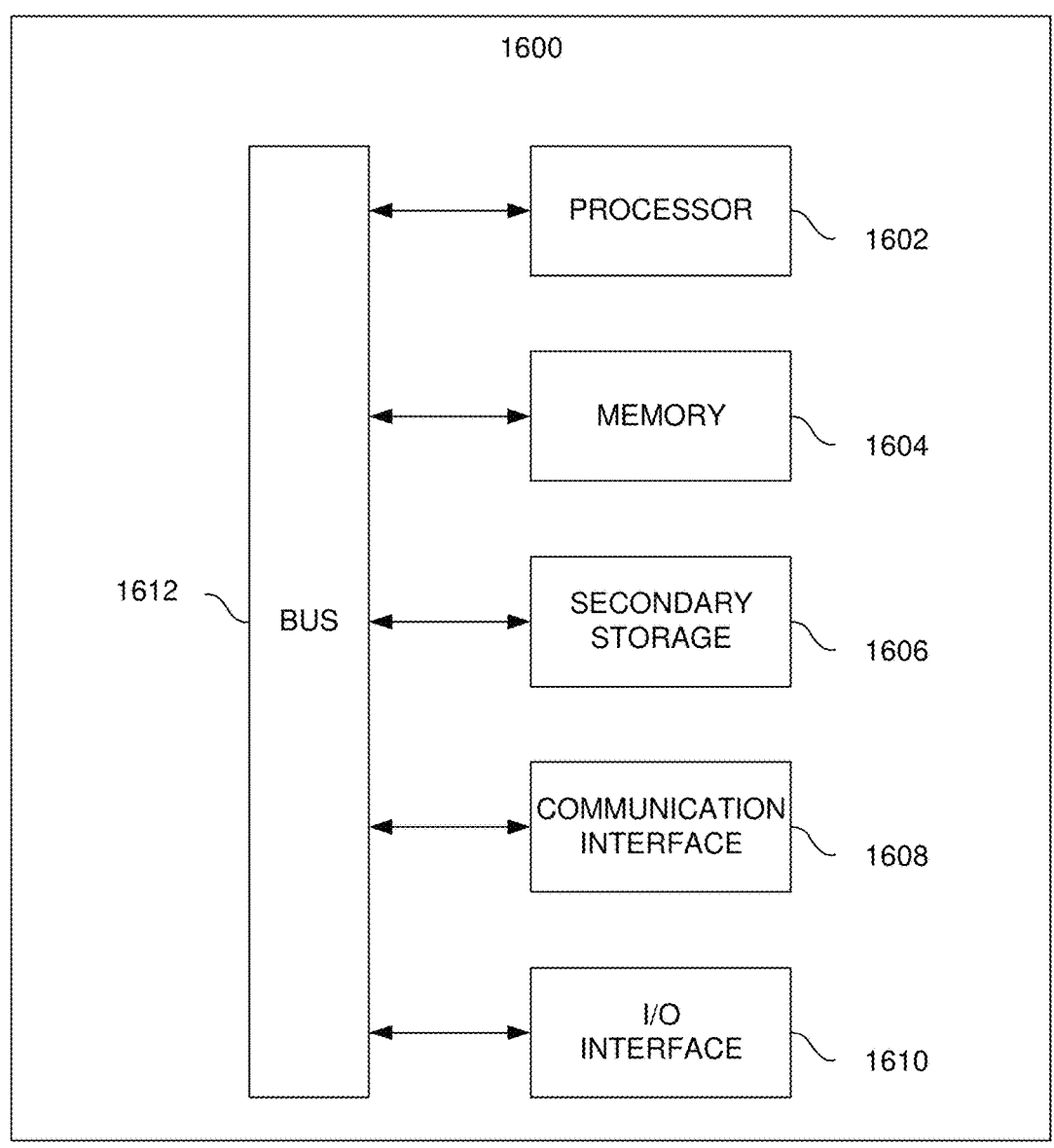
FIG. 16 illustrates a block diagram of a computing device that may be utilized to implement various components of the Zero Trust Access Fabric architecture, according to an embodiment of the present disclosure.

FIG. 16 illustrates a computing device 1600 that may be utilized to implement various components of the Zero Trust Access Fabric architecture, in accordance with one embodiment. As an option, the computing device 1600 may be implemented in the context of any one or more of the embodiments set forth in any previous and/or subsequent Figures and/or description thereof. Of course, however, the computing device 1600 may be implemented in the context of any desired environment. Further, the aforementioned definitions may equally apply to the description below.

The computing device 1600 includes a processor 1602 that executes instructions and performs computational operations for implementing credential management, authentication, and proxy-based access control functions within the Zero Trust Access Fabric architecture. For example, the processor 1602 coordinates with other system components to implement credential management system operations including threshold decryption coordination, policy evaluation, and distributed authentication workflows. Additionally, this processing unit executes authentication algorithms and cryptographic operations that enable weighted quorum mechanisms and partial decryption coordination across multiple independent authenticators while maintaining secure processing boundaries for sensitive credential operations.

In some embodiments, the central processing unit implements machine learning algorithms that analyze client behavior patterns and request characteristics to enhance passive validation mechanisms and detect anomalous access attempts within the distributed authentication framework.

The computing device 1600 further includes a memory 1604 that stores program instructions, credential handles, policy data, and temporary processing information during API access control operations and distributed authentication workflows. Additionally, this storage component may maintain authentication policies, threshold requirements, and weighted quorum configurations that define how clients are authenticated and authorized before credential release through distributed authenticator networks.

The computing device 1600 includes a secondary storage 1606 that provides persistent storage capabilities for credential policies, audit logs, and system configuration data while supporting the extended credential custody scenarios implemented by the Zero Trust Access Fabric architecture.

The computing device 1600 further includes a communication interface 1608 that enables network connectivity and data exchange with client devices, resource servers, and other components within the Zero Trust Access Fabric architecture while supporting various communication protocols and deployment scenarios. In some embodiments, the communication interface 1608 implements secure communication channels for credential handle transmission and challenge-response exchanges between distributed system components including authenticators, proxy components, and credential management systems.

The computing device 1600 includes an I/O interface 1610 that facilitates interaction between system administrators, client applications, and external devices participating in the credential management architecture while supporting various interface technologies and integration scenarios. For example, the I/O interface 1610 supports administrative interfaces that enable credential provisioning, policy configuration, and system management activities while maintaining appropriate access controls and audit capabilities for administrative operations.

In some embodiments, interface systems support various interface technologies including peripheral connections, display interfaces, and hardware security module interfaces that enable integration with diverse authentication mechanisms and security hardware platforms. Furthermore, these components coordinate with the processor 1602 to implement challenge-response authentication workflows that leverage hardware-based authentication factors while maintaining compatibility with existing client applications and user experience expectations.

In various embodiments, one or more authenticators may be hardware-anchored using at least one of a Physical Unclonable Function, Trusted Platform Module, or Trusted Execution Environment to provide immutable hardware-based trust foundations. The hardware-anchored authenticators may generate cryptographic attestations and device-bound authentication factors that prevent authentication from unauthorized, cloned, or compromised devices.

The computing device 1600 further includes a bus 1612 that interconnects the processor 1602, the memory 1604, the secondary storage 1606, the communication interface 1608, and the I/O interface 1610 to enable coordinated operation and data exchange between system components during credential validation processes and challenge-response operations. For example, the bus 1612 implements interconnect technologies that provide data transfer capabilities between system components while maintaining secure communication channels and access control mechanisms that protect sensitive credential operations and authentication workflows. Additionally, system interconnects coordinate high-speed data transfer operations that enable real-time authentication processing and machine learning-based behavioral analysis while maintaining system performance and responsiveness.

Interconnection systems enable coordinated operation between the processor 1602, the memory 1604, and the secondary storage 1606 to implement comprehensive credential management capabilities that extend beyond API credentials to encompass password authentication scenarios and other credential types within the unified Zero Trust Access Fabric architecture. Furthermore, these communication pathways facilitate coordination between the communication interface 1608 and other system components to enable distributed authentication workflows and real-time behavioral analysis coordination across multiple system boundaries and organizational domains. Still yet, the bus 1612 supports secure data transfer operations that maintain cryptographic isolation and operational separation between different credential types and authentication mechanisms while enabling unified policy enforcement and audit capabilities.

The coordinated hardware operation implemented by the computing device 1600 may enable comprehensive credential management capabilities that span API credentials, password authentication, and other credential types while maintaining consistent security properties and policy enforcement mechanisms across diverse authentication scenarios. The processor 1602 may coordinate with the memory 1604 and the secondary storage 1606 to implement password handle generation and management operations that provide the same security benefits as API credential handles while maintaining compatibility with existing password-based authentication systems and user workflows.

The machine learning integration implemented by the computing device 1600 may provide enhanced authentication assurance through behavioral analysis capabilities that automatically adapt authentication requirements based on client behavior patterns and risk assessment results while maintaining privacy protection and data minimization principles. The processor 1602 may coordinate with the memory 1604 to implement machine learning algorithms that analyze access frequency patterns, geographic consistency, device characteristics, and temporal behavior to establish behavioral baselines and detect anomalous activities that may indicate credential compromise and unauthorized access attempts.

In various embodiments, the machine learning-based behavioral analysis may address business information and metadata confidentiality concerns rather than consumer privacy regulations, as enterprise API use cases typically involve protecting proprietary business data and operational metadata rather than personal consumer information. The system may leverage privacy-enhancing technologies including zero-knowledge proofs, secure multi-party computation, differential privacy, and homomorphic encryption to enable machine learning training and inference operations while protecting sensitive business data and API call metadata from unauthorized disclosure during the behavioral analysis process. These advanced cryptographic techniques may allow the behavioral analysis algorithms to detect anomalous access patterns and credential compromise indicators without exposing plaintext business information, operational details, or sensitive API usage patterns to the machine learning processing components, thereby maintaining business confidentiality while enabling comprehensive security monitoring and adaptive authentication capabilities.

The computing device 1600 may operate as a hardware platform for implementing the credential management system through coordinated interactions between the processor 1602, the memory 1604, the secondary storage 1606, the communication interface 1608, the I/O interface 1610, and the bus 1612 to provide comprehensive credential custody capabilities that extend across multiple credential types and authentication scenarios. The computing device 1600 may serve as a hardware platform for implementing the API access proxy through configurations that optimize the processor 1602, the memory 1604, and the communication interface 1608 for API request processing, credential injection operations, and real-time behavioral analysis coordination. The computing device 1600 may function as a client device platform that coordinates with the credential management system and the API access proxy to implement credential handle storage, authentication processes, and behavioral analysis participation within client applications and user workflows.

The extended credential custody capabilities implemented by the computing device 1600 may demonstrate how the Zero Trust Access Fabric architecture may be applied to comprehensive credential management scenarios that encompass both API credentials and password authentication while maintaining consistent security properties and operational characteristics across diverse authentication mechanisms. The password handle architecture may provide the same security benefits as API credential handles by eliminating client-side password storage while enabling seamless integration with existing password-based authentication systems through transparent password handle substitution and just-in-time password reconstruction operations. The machine learning-enhanced authentication capabilities may provide adaptive security assurance that automatically responds to changing threat conditions and client behavior patterns while maintaining operational efficiency and user experience across diverse authentication scenarios and credential types.

Use Case Scenario

By way of a use-case scenario, and in various embodiments, a healthcare organization implements the Zero Trust Access Fabric system to protect patient medical records and comply with HIPAA regulations across their electronic health record (EHR) system and telemedicine platforms. The healthcare industry faces unique challenges where patient data breaches can result in severe regulatory penalties, loss of patient trust, and potential harm to individuals whose sensitive medical information is exposed, making credential security paramount for protecting both organizational reputation and patient privacy. When a healthcare provider attempts to access a patient's medical history, the system validates multiple contextual factors including biometric authentication, location verification within authorized healthcare facilities, and time-based access controls during approved working hours to ensure that only legitimate healthcare providers can access sensitive patient data during appropriate circumstances. This comprehensive validation approach addresses the healthcare industry's need for stringent access controls while maintaining the operational efficiency required for emergency medical situations and routine patient care, where delayed access to critical medical information could impact patient outcomes. The system ensures that database access credentials never reside on potentially vulnerable mobile devices or workstations that healthcare providers frequently use in diverse environments including hospitals, clinics, and remote consultation settings, thereby eliminating the risk of credential exposure through device theft, malware infections, or unauthorized access that could compromise entire patient databases and violate HIPAA compliance requirements.

By way of a use-case scenario, and in various embodiments, an e-commerce organization implements the Zero Trust Access Fabric system to protect customer payment processing and personal data access across their web application and mobile shopping platforms. The e-commerce industry operates in a high-threat environment where payment credential theft can result in immediate financial losses, regulatory violations under PCI DSS standards, and permanent damage to customer trust that directly impacts revenue and market position, necessitating robust protection mechanisms that prevent credential exposure without disrupting the seamless shopping experience customers expect. When a customer attempts to complete a purchase transaction through their web browser, the system validates device characteristics, behavioral patterns, and geographic consistency to detect potentially fraudulent transactions while ensuring legitimate customers can complete purchases without friction, addressing the e-commerce industry's dual requirements for security and user experience optimization. This approach is particularly critical for e-commerce platforms because payment credentials stored in browser environments are vulnerable to sophisticated attacks including cross-site scripting, malicious browser extensions, and client-side code injection that can compromise thousands of customer payment methods simultaneously, potentially resulting in massive financial losses and regulatory sanctions. The system ensures that sensitive payment credentials never reside in browser storage or client-side code where they could be accessed by malicious scripts or compromised through supply chain attacks targeting popular e-commerce frameworks and third-party integrations.

By way of a use-case scenario, and in various embodiments, a government agency implements the Zero Trust Access Fabric system to protect classified document access and maintain security clearance compliance across their document management system and remote access infrastructure. Government agencies handling classified information face national security implications where credential compromise could enable foreign adversaries to access sensitive intelligence, military plans, or diplomatic communications, making credential protection a matter of national security that requires the highest levels of assurance and audit capabilities. When an analyst attempts to access classified intelligence reports through their secure workstation, the system validates government-issued identity credentials, security clearance levels, and physical location within secure facilities to ensure that only properly cleared personnel can access classified materials under appropriate security conditions. This multi-layered validation approach addresses the government sector's stringent security requirements while supporting the operational needs of intelligence analysts, military personnel, and diplomatic staff who require timely access to classified information for national security decision-making and threat assessment activities. The system ensures that database credentials never reside on workstations where they could be compromised through insider threats, advanced persistent threats, or physical device compromise that could provide adversaries with persistent access to classified information systems and enable long-term intelligence gathering operations against national security interests.

By way of a use-case scenario, and in various embodiments, a cloud service provider implements the Zero Trust Access Fabric system to protect multi-tenant infrastructure access and maintain customer data isolation across their platform-as-a-service offerings and administrative interfaces. Cloud service providers face unique challenges in maintaining strict tenant isolation while supporting thousands of customers on shared infrastructure, where credential compromise could enable unauthorized cross-tenant access that violates customer trust, regulatory compliance requirements, and contractual data protection obligations that form the foundation of cloud service business models. When a customer's application attempts to access their dedicated database instance through the cloud platform, the system validates container integrity, tenant isolation boundaries, and resource usage limits to ensure that applications can only access their authorized resources while preventing potential security breaches that could affect multiple customers simultaneously. This comprehensive validation approach addresses the cloud industry's critical need for robust tenant isolation and resource management while maintaining the scalability and performance characteristics that customers expect from cloud platforms, where any security incident affecting multiple tenants could result in widespread customer defection and regulatory scrutiny. The system ensures that database credentials never reside in customer application code or container images where they could be compromised through container escape vulnerabilities, supply chain attacks targeting popular container images, or customer-side security breaches that could provide attackers with access to cloud infrastructure credentials and enable lateral movement across the provider's multi-tenant environment.

Improvements Over Existing Systems

The present disclosure addresses significant challenges in API security and credential management that have long plagued existing systems. Prior art solutions have struggled to effectively protect access credentials from theft and unauthorized use, as conventional approaches require clients to store and handle bearer tokens, API keys, and other authentication materials directly on client systems. These systems also struggle with implementing comprehensive zero-trust principles, as they often rely on implicit trust based on network location or prior authentication state rather than requiring explicit verification for each access request. Additionally, existing attribute-based access control implementations are predominantly passive and vendor-centric, lacking standardized protocols and comprehensive challenge-response mechanisms that can provide device-anchored authentication, resulting in systems that cannot adequately prevent credential theft and replay attacks across distributed client populations.

The disclosed system overcomes these deficiencies through a novel credential custody architecture that fundamentally separates credential possession from credential usage through proxy-based authentication mechanisms. By storing actual access credentials within a dedicated credential management system while providing clients only with opaque credential handles that lack cryptographic value, the system eliminates the primary attack vector of client-side credential theft that has been the root cause of numerous mass data breaches. The API access proxy validates clients through configurable authentication mechanisms including challenge-response pairs generated by Physical Unclonable Functions, immutable root-of-trust, or Trusted Execution Environments, ensuring device-anchored security that operates transparently without user friction while preventing unauthorized access even if credential handles are compromised. This innovative approach incorporates a flexible policy-driven authentication framework that supports both passive telemetry-based validation and active challenge-response mechanisms, enabling organizations to implement true zero-trust principles with comprehensive client verification for each access request. The system maintains compatibility with existing OAuth2, JWT, and API key standards while requiring minimal or no refactoring of existing client and server software, effectively resolving the longstanding issues of credential exposure and inadequate authentication mechanisms that have plagued prior art systems while providing centralized lifecycle control for credential rotation and revocation across distributed deployment environments.

Beyond ensuring that access credentials are used only by rightful clients, the disclosed system also validates that credentials are utilized within expected contextual parameters including appropriate time windows, authorized IP addresses, approved protocols, and other environmental factors that provide comprehensive usage verification. Additionally, the system provides security benefits even in minimal configuration scenarios where no authenticator validation is deployed, as attackers with stolen credential handles cannot directly make API calls but must route requests through the proxy infrastructure, creating an additional security barrier and monitoring point that does not exist in conventional systems. Furthermore, the Zero Trust Access Fabric architecture implements continuous verification by checking every client authentication call to servers, providing true zero-trust principles where each access request undergoes validation regardless of previous authentication state or network location assumptions.

System Implementation Embodiments

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVDTM), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A system for secure Application Programming Interface (API) access control, the system comprising:

a proxy configured to receive a resource access request from a client, the resource access request including a credential reference;

a credential management system (CMS) comprising one or more processors and memory storing instructions that, when executed by the one or more processors, cause the CMS to manage lifecycle of an access credential corresponding to the credential reference and coordinate with one or more authenticators to validate the client according to a credential policy;

the one or more authenticators, each authenticator comprising one or more processors and memory storing instructions that, when executed by the one or more processors, cause the authenticator to independently evaluate the client using at least one of passive validation or active challenge-response mechanisms and perform threshold decryption of the access credential upon successful validation of the client;

the CMS further configured to receive decrypted parts of the access credential and combine the decrypted parts into a cohesive decrypted access credential;

the CMS further configured to transmit the cohesive decrypted access credential to the proxy; and the proxy further configured to provide the cohesive decrypted access credential to a target resource, wherein the proxy operates as an intermediary that maintains exclusive access to the access credential during an injection process, and wherein the proxy is configured to provide the cohesive decrypted access credential to the target resource without transmitting the access credential to the client.

2. The system of claim 1, wherein the credential reference is an opaque identifier that lacks cryptographic value and cannot be independently used for API access.

3. The system of claim 1, wherein the active challenge-response mechanisms comprise proof of possession of a challenge-response pair generated by at least one of:

a Physical Unclonable Function (PUF) embedded in the client or a designated PUF response system; or an immutable root-of-trust embedded in the client or a designated immutable root-of-trust response system.

4. The system of claim 3, wherein the Physical Unclonable Function produces a device-unique response derived from inherent physical variations in hardware of the client.

5. The system of claim 1, wherein the passive validation comprises validating the client using telemetry-based attributes including at least one of IP address, time of day, call frequency, application protocol, client software version, or configuration.

6. The system of claim 1, wherein:

the credential policy defines throttling enforcement parameters that limit data volume access for the client; and the proxy is further configured to measure volume of response data for throttling enforcement.

7. The system of claim 1, wherein the CMS is further configured to rotate the credential reference upon expiration or renewal of the access credential.

8. The system of claim 7, wherein:

the CMS maintains audit logs of credential reference usage and validation events; and failed client validations cause automatic revocation of the credential reference.

9. The system of claim 1, wherein each authenticator is assigned an integer weight representing its assurance level, and the CMS determines satisfaction of a threshold policy when a cumulative assurance weight greater than or equal to a predetermined threshold is achieved.

10. The system of claim 9, wherein the threshold decryption requires combining partial decryptions from at least t authenticators out of n available authenticators, where t and n are configurable based on the credential policy.

11. The system of claim 1, wherein the access credential is governed by an attribute-based access control policy specifying contextual attributes including at least one of identity, device integrity, geolocation, IP reputation score, behavioral history, and environmental and client telemetry.

12. The system of claim 1, wherein one or more authenticators are hardware-anchored using at least one of a Physical Unclonable Function, Trusted Platform Module, immutable root-of-trust, or Trusted Execution Environment.

13. The system of claim 1, wherein the CMS dynamically adjusts authentication requirements based on real-time risk indicators including at least one of device drift, network anomalies, or behavioral deviation.

14. The system of claim 1, wherein:

the access credential remains encrypted at rest within the CMS; and the access credential is decrypted only transiently within secure memory of a protected execution boundary during the combine time by the CMS after successfully completing the threshold decryption process.

15. The system of claim 14, wherein the protected execution boundary comprises at least one of a Trusted Execution Environment or a Hardware Security Module.

16. The system of claim 1, wherein:

all authentication approvals and decryption events are cryptographically signed and hash-chained to form a tamper-evident audit log; and the CMS maintains provenance tracking that records which authenticators approved access and which key shares were used for each credential reconstruction.

17. The system of claim 1, wherein the proxy presents the cohesive decrypted access credential to the target resource in standard protocol formats compatible with existing backend services without requiring modifications to the target resource.

18. The system of claim 1, wherein:

the system remains functional despite failure or unavailability of authenticators whose combined weight falls below the threshold requirement, where each authenticator has a weight greater than or equal to 1 and validation succeeds when the total weight of available authenticators is greater than or equal to threshold t; and operational control of the CMS, proxy, and authenticators is distributed among distinct administrative domains to prevent single points of control.

19. The system of claim 1, wherein one or more authenticators include add-on authenticators, including user-developed and third-party authenticators, that are configured to be registered and executed as part of the client authentication process.

\* \* \* \* \*